US012470831B2

United States Patent
Henley et al.

(10) Patent No.: US 12,470,831 B2
(45) Date of Patent: Nov. 11, 2025

(54) VARIABLE IMAGE SENSOR SETTINGS ON A PER-FRAME BASIS

(71) Applicant: Cilag GmbH International, Zug (CH)

(72) Inventors: Jeremiah D. Henley, Fair Oaks, CA (US); Preston Manwaring, Farmington, UT (US)

(73) Assignee: Cilag GmbH International, Zug (CH)

( * ) Notice: Subject to any disclaimer, the term of this patent is extended or adjusted under 35 U.S.C. 154(b) by 113 days.

(21) Appl. No.: 18/454,475

(22) Filed: Aug. 23, 2023

(65) Prior Publication Data

US 2025/0071429 A1 Feb. 27, 2025

(51) Int. Cl.
*H04N 23/74* (2023.01)
*A61B 1/00* (2006.01)
*A61B 1/04* (2006.01)
*A61B 1/045* (2006.01)
*A61B 1/06* (2006.01)
*A61B 5/00* (2006.01)

(52) U.S. Cl.
CPC ......... *H04N 23/74* (2023.01); *A61B 1/00006* (2013.01); *A61B 1/000096* (2022.02); *A61B 1/043* (2013.01); *A61B 1/045* (2013.01); *A61B 1/0638* (2013.01); *A61B 1/0655* (2022.02); *A61B 5/0035* (2013.01); *A61B 5/0086* (2013.01)

(58) Field of Classification Search
CPC ................ H04N 23/74; A61B 1/00006; A61B 1/000096; A61B 1/043; A61B 1/045; A61B 1/0638; A61B 1/0655; A61B 5/0035; A61B 5/0086
See application file for complete search history.

(56) References Cited

U.S. PATENT DOCUMENTS

| 9,462,234 B2 | 10/2016 | Blanquart et al. |
| 9,492,060 B2 | 11/2016 | Blanquart |
| 9,509,917 B2 | 11/2016 | Blanquart et al. |
| 9,516,239 B2 | 12/2016 | Blanquart et al. |
| 9,621,817 B2 | 4/2017 | Blanquart et al. |
| 9,641,815 B2 | 5/2017 | Richardson et al. |

(Continued)

FOREIGN PATENT DOCUMENTS

WO WO2019221306 A1 5/2021

OTHER PUBLICATIONS

The International Search Report and the Written Opinion of the International Searching Authority, International Application No. PCT/IB2024/058073, dated Dec. 10, 2024.

(Continued)

*Primary Examiner* — Nasim N Nirjhar
(74) *Attorney, Agent, or Firm* — Techlaw Ventures, PLLC; Terrence J. Edwards

(57) ABSTRACT

Video visualization systems with customizable image sensor specifications on a per-frame basis. A system includes an image sensor comprising a pixel array that reads out a plurality of data frames over a plurality of frame periods, wherein each of the plurality of frame periods comprises a blanking period and a readout period. The system includes a controller that synchronizes operations of the image sensor with a variable pulse cycle of an emitter. The controller calculates register values for an applied gain for the image sensor on a per-frame basis. The controller calculates a duration of each of the plurality of frame periods on a per-frame basis.

20 Claims, 29 Drawing Sheets

(56) References Cited

U.S. PATENT DOCUMENTS

| | | |
|---|---|---|
| 9,762,879 B2 | 9/2017 | Blanquart et al. |
| 9,777,913 B2 | 10/2017 | Talbert et al. |
| 10,075,626 B2 | 9/2018 | Blanquart et al. |
| 10,165,195 B2 | 12/2018 | Blanquart et al. |
| 10,205,877 B2 | 2/2019 | Richardson et al. |
| 10,206,561 B2 | 2/2019 | Wichern et al. |
| 10,251,530 B2 | 4/2019 | Henley et al. |
| 10,277,875 B2 | 4/2019 | Blanquart et al. |
| 10,299,732 B2 | 5/2019 | Henley et al. |
| 10,341,588 B2 | 7/2019 | Richardson et al. |
| 10,341,593 B2 | 7/2019 | Blanquart et al. |
| 10,362,240 B2 | 7/2019 | Richardson et al. |
| 10,477,127 B2 | 11/2019 | Blanquart |
| 10,506,142 B2 | 12/2019 | Talbert et al. |
| 10,517,469 B2 | 12/2019 | Blanquart et al. |
| 10,561,302 B2 | 2/2020 | Henley et al. |
| 10,568,496 B2 | 2/2020 | Blanquart et al. |
| 10,670,248 B2 | 6/2020 | Talbert et al. |
| 10,695,003 B2 | 6/2020 | Henley et al. |
| 10,701,254 B2 | 6/2020 | Blanquart et al. |
| 10,742,895 B2 | 8/2020 | Blanquart et al. |
| 10,750,933 B2 | 8/2020 | Blanquart |
| 10,785,461 B2 | 9/2020 | Blanquart et al. |
| 10,855,942 B2 | 12/2020 | Blanquart |
| 10,881,272 B2 | 1/2021 | Blanquart |
| 10,917,562 B2 | 2/2021 | Richardson et al. |
| 10,952,619 B2 | 3/2021 | Talbert et al. |
| 10,958,852 B2 | 3/2021 | Fukumoto |
| 10,972,690 B2 | 4/2021 | Blanquart et al. |
| 10,980,406 B2 | 4/2021 | Blanquart et al. |
| 11,070,779 B2 | 7/2021 | Blanquart et al. |
| 11,082,627 B2 | 8/2021 | Blanquart et al. |
| 11,083,367 B2 | 8/2021 | Blanquart et al. |
| 11,089,192 B2 | 8/2021 | Blanquart et al. |
| 11,096,565 B2 | 8/2021 | Talbert et al. |
| 11,115,610 B2 | 9/2021 | Richardson et al. |
| 11,134,832 B2 | 10/2021 | Talbert et al. |
| 11,185,213 B2 | 11/2021 | Henley et al. |
| 11,196,904 B2 | 12/2021 | Talbert et al. |
| 11,206,340 B2 | 12/2021 | Talbert et al. |
| 11,213,194 B2 | 1/2022 | Talbert et al. |
| 11,237,270 B2 | 2/2022 | Talbert et al. |
| 11,240,426 B2 | 2/2022 | Talbert et al. |
| 11,253,139 B2 | 2/2022 | Blanquart |
| 11,266,305 B2 | 3/2022 | Wichern et al. |
| 11,284,785 B2 | 3/2022 | Talbert et al. |
| 11,294,062 B2 | 4/2022 | Talbert et al. |
| 11,344,189 B2 | 5/2022 | Blanquart et al. |
| 11,389,066 B2 | 7/2022 | Talbert et al. |
| 11,399,717 B2 | 8/2022 | Talbert et al. |
| 11,425,322 B2 | 8/2022 | Blanquart et al. |
| 11,457,154 B2 | 9/2022 | Talbert et al. |
| 11,470,227 B2 | 10/2022 | Talbert et al. |
| 11,484,270 B2 | 11/2022 | Henley et al. |
| 11,516,387 B2 | 11/2022 | Talbert et al. |
| 11,531,112 B2 | 12/2022 | Talbert et al. |
| 11,539,880 B2 | 12/2022 | Richardson et al. |
| 11,574,412 B2 | 2/2023 | Talbert et al. |
| 11,575,811 B2 | 2/2023 | Talbert et al. |
| 11,622,677 B2 | 4/2023 | Talbert et al. |
| 2012/0071718 A1 | 3/2012 | On |
| 2014/0275764 A1 | 9/2014 | Shen et al. |
| 2019/0191974 A1 | 6/2019 | Talbert et al. |
| 2019/0191975 A1 | 6/2019 | Talbert et al. |
| 2019/0191976 A1 | 6/2019 | Talbert et al. |
| 2019/0191977 A1 | 6/2019 | Talbert et al. |
| 2019/0191978 A1 | 6/2019 | Talbert et al. |
| 2019/0356867 A1 | 11/2019 | Richardson et al. |
| 2020/0178769 A1 | 6/2020 | Henley et al. |
| 2020/0292160 A1 | 9/2020 | Talbert et al. |
| 2020/0397246 A1 | 12/2020 | Talbert et al. |
| 2020/0397277 A1 | 12/2020 | Talbert et al. |
| 2020/0404131 A1 | 12/2020 | Talbert et al. |
| 2020/0404146 A1* | 12/2020 | Talbert ................. A61B 1/045 |
| 2021/0160444 A1 | 5/2021 | Blanquart |
| 2021/0344885 A1 | 11/2021 | Blanquart et al. |
| 2021/0360142 A1 | 11/2021 | Blanquart et al. |
| 2021/0361152 A1 | 11/2021 | Blanquart et al. |
| 2021/0368076 A1 | 11/2021 | Blanquart et al. |
| 2021/0378495 A1 | 12/2021 | Talbert et al. |
| 2021/0409627 A1 | 12/2021 | Richardson et al. |
| 2022/0047148 A1 | 2/2022 | Henley et al. |
| 2022/0095903 A1* | 3/2022 | McDowall ............. G16H 20/40 |
| 2022/0107418 A1 | 4/2022 | Talbert et al. |
| 2022/0109790 A1 | 4/2022 | Talbert et al. |
| 2022/0125285 A1 | 4/2022 | Talbert et al. |
| 2022/0175234 A1 | 6/2022 | Wichern et al. |
| 2022/0192474 A1 | 6/2022 | Talbert et al. |
| 2022/0236421 A1 | 7/2022 | Talbert et al. |
| 2022/0248941 A1 | 8/2022 | Blanquart |
| 2022/0287552 A1 | 9/2022 | Blanquart et al. |
| 2022/0321808 A1* | 10/2022 | Dwarakanath ....... H04N 25/531 |
| 2022/0330826 A1 | 10/2022 | Talbert et al. |
| 2022/0334061 A1 | 10/2022 | Talbert et al. |
| 2022/0378294 A1 | 12/2022 | Talbert et al. |
| 2022/0383453 A1 | 12/2022 | Talbert et al. |
| 2022/0394199 A1 | 12/2022 | Blanquart et al. |
| 2023/0028618 A1 | 1/2023 | Talbert et al. |
| 2023/0080490 A1 | 3/2023 | Henley et al. |
| 2023/0111981 A1 | 4/2023 | Talbert et al. |
| 2023/0130164 A1 | 4/2023 | Talbert et al. |
| 2023/0137694 A1 | 5/2023 | Richardson et al. |
| 2025/0016464 A1* | 1/2025 | Kaizu ............... H10H 20/8232 |

OTHER PUBLICATIONS

English translation of WO2019221306 prepared by Google Patent on Mar. 4, 2025 (https://patents.google.com/patent/JPWO2019221306A1/en?oq=WO+2019221306).

* cited by examiner

600

| Low Intensity EMR<br>Low Sensor Sensitivity | Lengthen Blanking Period<br>Increase Gain |
|---|---|
| Low Intensity EMR<br>High Sensor Sensitivity | Default Blanking Period<br>Default Gain |
| High Intensity EMR<br>Low Sensor Sensitivity | Lengthen Blanking Period<br>Default Gain |
| High Intensity EMR<br>High Sensor Sensitivity | Standard/Shortened Blanking Period<br>Moderately Increase Gain |

FIG. 6

Example Sequence
Color Video Stream Output At Overall Frame Rate Of 60 fps

| Color Data Frame 16.67 ms | | Color Data Frame 16.67 ms | | Color Data Frame 16.67 ms | | Color Data Frame 16.67 ms | | Color Data Frame 16.67 ms | | Color Data Frame 16.67 ms | |
|---|---|---|---|---|---|---|---|---|---|---|---|
| BP 8.67 ms | RP 8.0 ms | BP 8.67 ms | RP 8.0 ms | BP 8.67 ms | RP 8.0 ms | BP 8.67 ms | RP 8.0 ms | BP 8.67 ms | RP 8.0 ms | BP 8.67 ms | RP 8.0 ms |

FIG. 14A

Example Sequence
Color Video Stream Comprising Fluorescence Imaging Data Output At Overall Frame Rate Of 60 fps

| Color Data Frame 11.1 ms | | Fluorescence Data Frame 22.2 ms | | Color Data Frame 11.1 ms | | Fluorescence Data Frame 22.2 ms | | Color Data Frame 11.1 ms | | Fluorescence Data Frame 22.2 ms | |
|---|---|---|---|---|---|---|---|---|---|---|---|
| BP 3.1 ms | RP 8.0 ms | BP 14.2 ms | RP 8.0 ms | BP 3.1 ms | RP 8.0 ms | BP 14.2 ms | RP 8.0 ms | BP 3.1 ms | RP 8.0 ms | BP 14.2 ms | RP 8.0 ms |

FIG. 14B

Example Sequence
Color Video Stream Comprising Multispectral Imaging Data Output At Overall Frame Rate Of 70 fps

| Color Data Frame | Narrowband Visible Spectral Data Frame | Narrowband Near Infrared Spectral Data Frame | Color Data Frame | Narrowband Visible Spectral Data Frame | Narrowband Near Infrared Spectral Data Frame | Color Data Frame |
|---|---|---|---|---|---|---|
| 12.0 ms | 14.0 ms | 16.9 ms | 12.0 ms | 14.0 ms | 16.9 ms | 12.0 ms |
| BP 4.0 ms / RP 8.0 ms | BP 6.0 ms / RP 8.0 ms | BP 8.9 ms / RP 8.0 ms | BP 4.0 ms / RP 8.0 ms | BP 6.0 ms / RP 8.0 ms | BP 8.9 ms / RP 8.0 ms | BP 4.0 ms / RP 8.0 ms |

FIG. 14C

Example Sequence
Color Video Stream Comprising Fluorescence And Multispectral Imaging Data Output At Overall Frame Rate Of 70 fps

| Color Data Frame | Narrowband Visible Spectral Data Frame | Narrowband Near Infrared Spectral Data Frame | Fluorescence Data Frame | Color Data Frame | Narrowband Visible Spectral Data Frame | Narrowband Near Infrared Spectral Data Frame | Fluorescence Data Frame |
|---|---|---|---|---|---|---|---|
| 10.0 ms | 12.0 ms | 15.2 ms | 20.0 ms | 10.0 ms | 12.0 ms | 15.2 ms | 20.0 ms |
| BP 8.0 ms / RP 2.0 ms | BP 10.0 ms / RP 2.0 ms | BP 13.2 ms / RP 2.0 ms | BP 18.0 ms / RP 2.0 ms | BP 8.0 ms / RP 2.0 ms | BP 10.0 ms / RP 2.0 ms | BP 13.2 ms / RP 2.0 ms | BP 18.0 ms / RP 2.0 ms |

FIG. 14D

Example Sequence
Color Video Stream Comprising Advanced A Imaging Data Output At Overall Frame Rate Of 60 fps

| Color 30 fps | Advanced A 30 fps | Color 30 fps | Advanced A 30 fps | Color 30 fps | Advanced A 30 fps | Color 30 fps | Advanced A 30 fps |
|---|---|---|---|---|---|---|---|
| 16.67 ms | 16.67 ms | 16.67 ms | 16.67 ms | 16.67 ms | 16.67 ms | 16.67 ms | 16.67 ms |
| BP \| RP | BP \| RP | BP \| RP | BP \| RP | BP \| RP | BP \| RP | BP \| RP | BP \| RP |

{ One Pulse Cycle Pattern Sequence } { One Pulse Cycle Pattern Sequence } { One Pulse Cycle Pattern Sequence } { One Pulse Cycle Pattern Sequence }

| Total Color Data Frames Per Second: 30 | Total Advanced A Data Frames Per Second: 30 | Total Color Data Frames Per Second: 30 | Total Advanced A Data Frames Per Second: 30 | Total Color Data Frames Per Second: 30 | Total Advanced A Data Frames Per Second: 30 | Total Color Data Frames Per Second: 30 | Total Advanced A Data Frames Per Second: 30 |

FIG. 15A

Example Sequence
Color Video Stream Comprising Advanced A, Advanced B, And Advanced C Imaging Data
Output At Overall Frame Rate Of 90 fps

| Color | Advanced A | Advanced C | Color | Advanced A | Advanced B | Color | Advanced A | Advanced C |
|---|---|---|---|---|---|---|---|---|
| 11.1 ms | 11.1 ms | 11.1 ms | 11.1 ms | 11.1 ms | 11.1 ms | 11.1 ms | 11.1 ms | 11.1 ms |
| BP \| RP | BP \| RP | BP \| RP | BP \| RP | BP \| RP | BP \| RP | BP \| RP | BP \| RP | BP \| RP |

One Pulse Cycle Pattern Sequence

| Total Color Data Frames Per Second: 30 | Total Advanced A Data Frames Per Second: 30 | Total Advanced C Data Frames Per Second: 20 | Total Color Data Frames Per Second: 30 | Total Advanced A Data Frames Per Second: 30 | Total Advanced B Data Frames Per Second: 10 | Total Color Data Frames Per Second: 30 | Total Advanced A Data Frames Per Second: 30 | Total Advanced C Data Frames Per Second: 20 |

FIG. 15C

Bayer Pattern Array
1602

| B1 | G1 | B2 | G2 | B5 | G5 | B6 | G6 |
|---|---|---|---|---|---|---|---|
| g1 | R1 | g2 | R2 | g5 | R5 | g6 | R6 |
| B3 | G3 | B4 | G4 | B7 | G7 | B8 | G8 |
| g3 | R3 | g4 | R4 | g7 | R7 | g8 | R7 |
| B9 | G9 | B10 | G10 | B13 | G13 | B14 | G14 |
| g9 | R9 | g10 | R10 | g13 | R13 | g14 | R14 |
| B11 | G11 | B12 | G12 | B15 | G15 | B16 | G16 |
| g11 | R11 | g12 | R12 | g15 | R15 | g16 | R16 |

Binned Readout
1604

| B1, B2, B3, B4 | G1, G2, G3, G4 | B5, B6, B7, B8 | G5, G6, G7, G8 |
|---|---|---|---|
| g1, g2, g3, g4 | R1, R2, R3, R4 | g5, g6, g7, g8 | R5, R6, R7, R8 |
| B9, B10, B11, B12 | G9, G10, G11, G12 | B13, B14, B15, B16 | G13, G14, G15, G13 |
| g9, g10, g11, g12 | R9, R10, R11, R12 | g13, g14, g15, g16 | R13, R14, R15, R16 |

FIG. 16A

Quad Bayer Pattern Array
1612

| B1 | B1 | G1 | G1 | B2 | B2 | G2 | G2 |
|---|---|---|---|---|---|---|---|
| B1 | B1 | G1 | G1 | B2 | B2 | G2 | G2 |
| g1 | g1 | R1 | R1 | g2 | g2 | R2 | R2 |
| g1 | g1 | R1 | R1 | g2 | g2 | R2 | R2 |
| B3 | B3 | G3 | G3 | B4 | B4 | G4 | G4 |
| B3 | B3 | G3 | G3 | B4 | B4 | G4 | G4 |
| g3 | g3 | R3 | R3 | g4 | g4 | R4 | R4 |
| g3 | g3 | R3 | R3 | g4 | g4 | R4 | R4 |

Binned Readout
1614

| B1 | G1 | B2 | G2 |
|---|---|---|---|
| g1 | R1 | g2 | R2 |
| B3 | G3 | B4 | G4 |
| g3 | R3 | g4 | R4 |

FIG. 16B

VARIABLE IMAGE SENSOR SETTINGS ON A PER-FRAME BASIS

TECHNICAL FIELD

This disclosure is directed to advanced visualization and digital imaging systems and methods and, more particularly but not entirely, to variable image sensor settings.

BACKGROUND

Endoscopic surgical instruments are often preferred over traditional open surgical devices because the small incision tends to reduce post-operative recovery time and associated complications. In some instances of endoscopic visualization, it is desirable to view a space with high-definition color imaging and further with one or more advanced visualization techniques providing additional information that cannot be discerned with the human eye. However, the space constrained environment of an endoscope introduces numerous technical challenges when seeking to capture advanced visualization data in a light deficient environment.

Endoscopic visualization systems utilize which image sensors, which are electronic devices that convert photons into electrical signals, which are then processed to generate digital images. In most cases, image sensor specifications can be adjusted to capture images in different light conditions. For example, the applied gain of the image sensor can be adjusted to increase or decrease the amount of light accumulated by the image sensor, and thereby brighten or darken the exposure levels of the resultant image. Additionally, the duration of time the image sensor accumulates light can be optimized to adjust the exposure levels of resultant image frames.

There are numerous endoscopic visualization systems that seek to capture advanced visualization data, such as multispectral data, fluorescence data, and laser mapping data, while working within the space constrained environment of an endoscope. However, these endoscopic visualization systems do not adjust image sensor specifications on a per-frame basis to adjust exposure levels for different types of frames, specifically, color frames, multispectral frames, fluorescence frames, and mapping frames.

Traditional fluorescence visualization systems implementing time multiplexed illumination may pulse white light and fluorescence excitation light for equal durations and with equivalent image sensor specifications. In a traditional example implementation, a system instructs a white light source to emit white light for a defined duration and then instruct an image sensor to read out a pixel array. The system may then instruct a fluorescence light source to emit a fluorescence excitation light for the same defined duration, and then instruct the image sensor to read out the pixel array. Thus, in this traditional multiplexed visualization system, the white light source and the fluorescence light source are instructed to emit light at different times and for the same defined duration, and the image sensor is instructed to read out the color frame and the fluorescence frame with the same specification settings.

The traditional visualization system described above does not consider the disparity in brightness or energy output by the white light source and the fluorescence light source. The traditional visualization system further does not account for a pixel array inherently possessing varying sensitivity to different wavebands of light. In most cases, a fluorescence light source is relatively dim when compared with a white light source, and thus, the image sensor struggles to accumulate sufficient energy when exposed to the fluorescence excitation light. In the traditional visualization system, the image frames output in response to an emission by the fluorescence light source are dimmer and have lower accumulated energy levels when compared with the image frames output in response to an emission by the white light source. The traditional visualization system may attempt to correct for the energy disparity with digital post-processing of images but does not account for the energy disparity during image acquisition.

For example, commonly owned U.S. Patent Application Publication No. 2020/0404131, entitled "HYPERSPECTRAL AND FLUORESCENCE IMAGING WITH TOPOLOGY LASER SCANNING IN A LIGHT DEFICIENT ENVIRONMENT," filed on Oct. 24, 2019, which is incorporated by reference in its entirety, describes an endoscopic visualization system for color and "specialty" imaging. In this disclosure, an emitter is configured to emit red, green, blue, and specialty emissions of light, wherein the specialty emissions may include hyperspectral, fluorescence, or laser mapping emissions. However, this disclosure does not indicate the durations of light emissions, or the image sensor specifications, may be adjusted on a per-frame basis based on the pixel array's inherent sensitivities to different wavebands of electromagnetic radiation. Additionally, this disclosure does not indicate that multiple light sources may be emitted simultaneously to enable an image sensor to accumulate more energy from dimmer light sources.

Further for example, U.S. Pat. No. 10,958,852, entitled "IMAGING APPARATUS AND CONTROL METHOD HAVING A PLURALITY OF SYNCHRONIZED LIGHT SOURCE DEVICES," filed on Sep. 25, 2019, which is incorporated by reference in its entirety, describes an imaging apparatus with three image sensors that receive illumination from a white light source and an infrared laser. In this disclosure, the three image sensors are dedicated to sensing green, blue, or a combination of red and infrared light. The white light source and the infrared laser may be actuated according to various patterns, including wherein the infrared laser is shown continuously and the white light source is turned on and off. However, this disclosure does not indicate the durations of light emissions, or the image sensor specifications, may be adjusted on a per-frame basis based on the pixel array's inherent sensitivities to different wavebands of electromagnetic radiation.

Consequently, a significant need exists for a visualization system that can capture color, including high-definition color, multispectral, fluorescence, and laser mapping imaging data with consistent exposure from frame to frame despite energy disparities between white, multispectral, fluorescence, and laser mapping light sources. Specifically, there is a need to extend a duration of time an image sensor is exposed to weaker light sources without sacrificing the quality of resultant image frames.

In view of the foregoing, described herein are systems, methods, and devices for fluorescence, multispectral, and laser mapping imaging in a light deficient environment, frame durations and image sensor specification may be adjusted on a per-frame basis.

BRIEF DESCRIPTION OF THE DRAWINGS

Non-limiting and non-exhaustive implementations of the disclosure are described with reference to the following figures, wherein like reference numerals refer to like parts throughout the various views unless otherwise specified.

Advantages of the disclosure will become better understood with regard to the following description and accompanying drawings where:

FIG. 6 is a schematic diagram describing example adjustments to image sensor specification to account for different lighting characteristics;

FIG. 14A is a schematic diagram of an example pulsing and readout sequence for generating a color video stream;

FIG. 14B is a schematic diagram of an example pulsing and readout sequence for generating a color video stream comprising fluorescence imaging data;

FIG. 14C is a schematic diagram of an example pulsing and readout sequence for generating a color video stream comprising multispectral imaging data;

FIG. 14D is a schematic diagram of an example pulsing and readout sequence for generating a color video stream comprising fluorescence and multispectral imaging data;

FIG. 15A is a schematic diagram of an example frame cycle sequence for generating a color video stream comprising a single advanced imaging modality;

FIG. 15C is a schematic diagram of an example frame cycle sequence for generating a color video stream additionally comprising three advanced imaging modalities;

FIG. 16A is a schematic illustration of an example binning configuration for binning a Bayer pattern array pixel array;

FIG. 16B is a schematic illustration of an example binning configuration for binning a quad Bayer pattern pixel array;

DETAILED DESCRIPTION

Figure 1A:
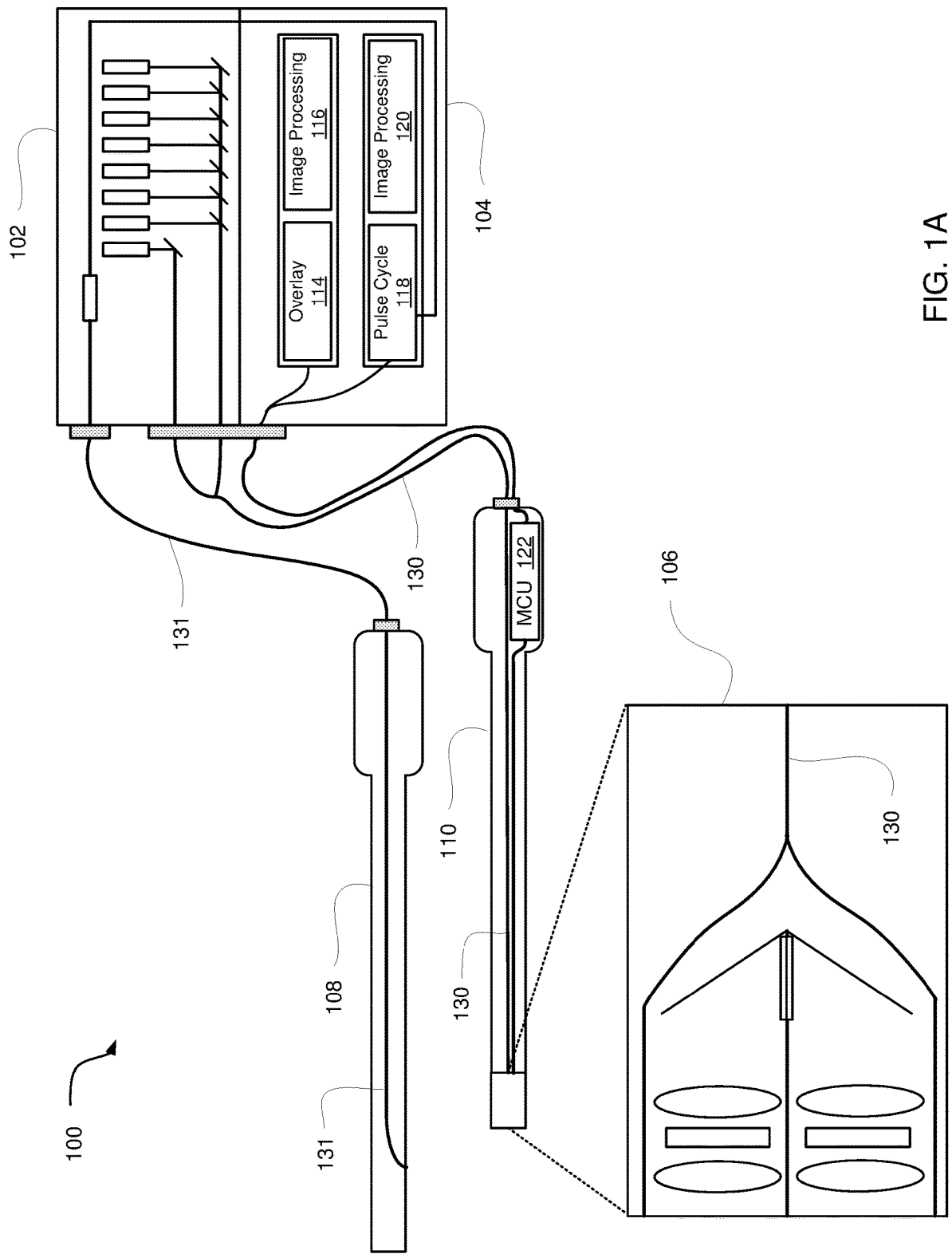
FIG. 1A is a schematic illustration of an example system for endoscopic visualization with color imaging and advanced imaging.

Disclosed herein are systems, methods, and devices for digital visualization that may be primarily suited to medical applications such as medical endoscopic imaging. An embodiment of the disclosure is an endoscopic system for color visualization and "advanced visualization" of a scene. The advanced visualization includes one or more of multispectral imaging, fluorescence imaging, or topographical mapping. Data retrieved from the advanced visualization may be processed by one or more algorithms configured to determine characteristics of the scene. The advanced visualization data may specifically be used to identify tissue structures within a scene, generate a three-dimensional topographical map of the scene, calculate dimensions of objects within the scene, identify margins and boundaries of different tissue types, generate false color overlays highlighting certain tissues within a scene, and so forth.

The systems, methods, and devices described herein are specifically optimized to account for variations between "stronger" electromagnetic radiation (EMR) sources and "weaker" EMR sources. In some cases, the stronger EMR sources are considered "stronger" based on the inherent qualities of a pixel array, e.g., if a pixel array is inherently more sensitive to detecting EMR emitted by the stronger EMR source, then the stronger EMR source may be classified as "stronger" when compared with another EMR source. Conversely, if the pixel array is inherently less sensitive to detecting EMR emitted by the weaker EMR source, then the weaker EMR source may be classified as "weaker" when compared with another EMR source. Additionally, a "stronger" EMR source may have a higher amplitude, greater brightness, greater intensity, or higher energy output when compared with a "weaker" EMR source. The present disclosure addresses the disparity between stronger EMR sources and weaker EMR sources by adjusting image sensor specifications, frame cycles, and pulsing durations on a per-frame basis to compensate for variations between stronger and weaker sources of EMR.

An embodiment of the disclosure is an endoscopic visualization system that includes an emitter, an image sensor, and a controller. The emitter includes a plurality of separate and independently actuatable sources of EMR that may be separately cycled on and off to illuminate a scene with pulses of EMR. The image sensor accumulates EMR and reads out data for generating a plurality of data frames. The controller synchronizes operations of the emitter and the image sensor to output a desired visualization scheme based on user input. The visualization scheme may include a selection of one or more of color imaging, multispectral imaging, fluorescence imaging, topographical mapping, or anatomical measurement.

The controller instructs the emitter and the image sensor to operate in a synchronized sequence to output a video stream that includes one or more types of visualization (i.e., color imaging, multispectral imaging, fluorescence imaging, topographical mapping, or anatomical measurement). The controller instructs the emitter to actuate one or more of the plurality of EMR sources to pulse according to a variable pulse cycle. The controller instructs the image sensor to accumulate EMR and read out data according to a variable sensor cycle that is synchronized in time with the variable pulse cycle. The synchronized sequence of the emitter and the image sensor enables the image sensor to read out data corresponding with a plurality of different visualization types. For example, the image sensor may read out a color frame in response to the emitter pulsing a white light or other visible EMR, the image sensor may readout a multispectral frame in response to the emitter pulsing a multispectral waveband of EMR, the image sensor may read out data for calculating a three-dimensional topographical map in response to the emitter pulsing EMR in a mapping pattern, and so forth.

The controller optimizes and adjusts a sensor cycle of an image sensor to output data frames for color imaging and/or advanced imaging at a sufficient frame rate, while ensuring the pixel array accumulates a sufficient amount of EMR for each data frame. The controller may instruct the image sensor to implement pixel binning on a per-frame basis, such that the image sensor implements pixel binning for some data frames and reads out all pixels for other data frames. In some cases, the controller instructs the image sensor to read out all pixels and thereby output a high-definition color data frame in response to the emitter pulsing white EMR. The controller may further instruct the image sensor to bin the pixel array and read out fewer pixels in response to the emitter pulsing EMR for advanced visualization, such as multispectral imaging, fluorescence imaging, or topographical mapping.

The controller may additionally optimize and adjust the variable pulse cycle in real-time based on user input, sufficient exposure of resultant data frames, and inherent properties of a corresponding pixel array. In some cases, a pixel array has varying sensitivities to different wavebands of EMR. In these cases, the pixel array is irradiated with EMR for shorter or longer durations of time depending on the type of illumination pulse to ensure the pixel array outputs data frames with consistent exposure levels. The controller adjusts the irradiation time of the pixel array and the pulsing duration of the emitter in real-time to compensate for the pixel array's varying efficiencies to diverse types of illumination.

The systems, methods, and devices described herein are implemented for color visualization and advanced visualization. The advanced visualization techniques described herein can be used to identify certain tissues, see through tissues in the foreground, calculate a three-dimensional topography of a scene, and calculate dimensions and distances for objects within the scene. The advanced visualization techniques described herein specifically include multispectral visualization, fluorescence visualization, and laser mapping visualization.

Multispectral Visualization

Spectral imaging uses multiple bands across the electromagnetic spectrum. This is different from conventional cameras that only capture light across the three wavelengths based in the visible spectrum that are discernable by the human eye, including the red, green, and blue wavelengths to generate an RGB image. Spectral imaging may use any wavelength bands in the electromagnetic spectrum, including infrared wavelengths, the visible spectrum, the ultraviolet spectrum, x-ray wavelengths, or any suitable combination of various wavelength bands. Spectral imaging may overlay imaging generated based on non-visible bands (e.g., infrared) on top of imaging based on visible bands (e.g., a standard RGB image) to provide additional information that is easily discernable by a person or computer algorithm.

The multispectral imaging techniques discussed herein can be used to "see through" layers of tissue in the foreground of a scene to identify specific types of tissue and/or specific biological or chemical processes. Multispectral imaging can be used in the medical context to quantitatively track the process of a disease and to determine tissue pathology. Additionally, multispectral imaging can be used to identify critical structures such as nerve tissue, muscle tissue, cancerous cells, blood vessels, and so forth. In an embodiment, multispectral partitions of EMR are pulsed and data is gathered regarding the spectral responses of diverse types of tissue in response to the partitions of EMR. A datastore of spectral responses can be generated and analyzed to assess a scene and predict which tissues are present within the scene based on the sensed spectral responses.

Multispectral imaging enables numerous advantages over conventional imaging. The information obtained by multispectral imaging enables medical practitioners and/or computer-implemented programs to precisely identify certain tissues or conditions that may not be possible to identify with RGB imaging. Additionally, multispectral imaging may be used during medical procedures to provide image-guided surgery that enables a medical practitioner to, for example, view tissues located behind certain tissues or fluids, identify atypical cancerous cells in contrast with typical healthy cells, identify certain tissues or conditions, identify critical structures, and so forth. Multispectral imaging provides specialized diagnostic information about tissue physiology, morphology, and composition that cannot be generated with conventional imaging.

Fluorescence Visualization

Fluorescence occurs when an orbital electron of a molecule, atom, or nanostructure is excited by light or other EMR, and then relaxes to its ground state by emitting a photon from the excited state. The specific frequencies of EMR that excite the orbital electron, or are emitted by the photon during relaxation, are dependent on the particular atom, molecule, or nanostructure. In most cases, the light emitted by the substance has a longer wavelength, and therefore lower energy, than the radiation that was absorbed by the substance.

Fluorescence imaging is particularly useful in biochemistry and medicine as a non-destructive means for tracking or analyzing biological molecules. The biological molecules, including certain tissues or structures, are tracked by analyzing the fluorescent emission of the biological molecules after being excited by a certain wavelength of EMR. However, relatively few cellular components are naturally fluorescent. In certain implementations, it may be desirable to visualize a certain tissue, structure, chemical process, or biological process that is not intrinsically fluorescent. In such an implementation, the body may be administered a dye or reagent that may include a molecule, protein, or quantum dot having fluorescent properties. The reagent or dye may then fluoresce after being excited by a certain wavelength of EMR. Different reagents or dyes may include different molecules, proteins, and/or quantum dots that will fluoresce at particular wavelengths of EMR. Thus, it may be necessary to excite the reagent or dye with a specialized band of EMR to achieve fluorescence and identify the desired tissue, structure, or process in the body.

The fluorescence imaging techniques described herein may be used to identify certain materials, tissues, components, or processes within a body cavity or other light deficient environment. Fluorescence imaging data may be provided to a medical practitioner or computer-implemented algorithm to enable the identification of certain structures or tissues within a body. Such fluorescence imaging data may be overlaid on black-and-white or RGB images to provide additional information and context.

The fluorescence imaging techniques described herein may be implemented in coordination with fluorescent reagents or dyes. Some reagents or dyes are known to attach to certain types of tissues and fluoresce at specific wavelengths of the electromagnetic spectrum. In an implementation, a reagent or dye is administered to a patient that is configured to fluoresce when activated by certain wavelengths of light. The visualization system disclosed herein is used to excite and fluoresce the reagent or dye. The fluorescence of the reagent or dye is detected by an image sensor to aid in the identification of tissues or structures in the body cavity. In an implementation, a patient is administered a plurality of reagents or dyes that are each configured to fluoresce at different wavelengths and/or provide an indication of different structures, tissues, chemical reactions, biological processes, and so forth. In such an implementation, the visualization system described herein emits each of the applicable wavelengths to fluoresce each of the applicable reagents or dyes. This may negate the need to perform individual imaging procedures for each of the plurality of reagents or dyes.

Laser Mapping Visualization

Laser mapping generally includes the controlled deflection of laser beams. Laser mapping can be implemented to generate one or more of a three-dimensional topographical map of a scene, calculate distances between objects within the scene, calculate dimensions of objects within the scene, track the relative locations of tools within the scene, and so forth.

Laser mapping combines controlled steering of laser beams with a laser rangefinder. By taking a distance measurement at every direction, the laser rangefinder can rapidly capture the surface shape of objects, tools, and landscapes. Construction of a full three-dimensional topography may include combining multiple surface models that are obtained from different viewing angles. Various measurement systems and methods exist in the art for applications in archaeology, geography, atmospheric physics, autonomous vehicles, and others. One such system includes light detection and ranging (LIDAR), which is a three-dimensional mapping system. LIDAR has been applied in navigation systems such as airplanes or satellites to determine position and orientation of a sensor in combination with other systems and sensors. LIDAR uses active sensors to illuminate an object and detect energy that is reflected off the object and back to a sensor.

As discussed herein, the term "laser mapping" includes laser tracking. Laser tracking, or the use of lasers for tool tracking, measures objects by determining the positions of optical targets held against those objects. Laser trackers can be accurate to the order of 0.025 mm over a distance of several meters. The visualization system described herein pulses EMR for use in conjunction with a laser tracking system such that the position of tools within a scene can be tracked and measured.

The endoscopic visualization system described herein implements laser mapping imaging to determine precise measurements and topographical outlines of a scene. In one implementation, mapping data is used to determine precise measurements between, for example, structures or organs in a body cavity, devices, or tools in the body cavity, and/or critical structures in the body cavity. As discussed herein, the term "mapping" encompasses technologies referred to as laser mapping, laser scanning, topographical scanning, three-dimensional scanning, laser tracking, tool tracking, and others. A mapping data frame as discussed herein includes data for calculating one or more of a topographical map of a scene, dimensions of objects or structures within a scene, distances between objects or structures within the scene, relative locations of tools or other objects within the scene, and so forth.

For the purposes of promoting an understanding of the principles in accordance with the disclosure, reference will now be made to the embodiments illustrated in the drawings and specific language will be used to describe the same. It will nevertheless be understood that no limitation of the scope of the disclosure is thereby intended. Any alterations and further modifications of the inventive features illustrated herein, and any additional applications of the principles of the disclosure as illustrated herein, which would normally occur to one skilled in the relevant art and having possession of this disclosure, are to be considered within the scope of the disclosure claimed.

Before the structure, systems, and methods are disclosed and described, it is to be understood that this disclosure is not limited to the particular structures, configurations, process steps, and materials disclosed herein as such structures, configurations, process steps, and materials may vary somewhat. It is also to be understood that the terminology employed herein is used for the purpose of describing particular embodiments only and is not intended to be limiting since the scope of the disclosure will be limited only by the appended claims and equivalents thereof.

In describing and claiming the subject matter of the disclosure, the following terminology will be used in accordance with the definitions set out below.

It must be noted that, as used in this specification and the appended claims, the singular forms "a," "an," and "the" include plural referents unless the context clearly dictates otherwise.

As used herein, the terms "comprising," "including," "containing," "characterized by," and grammatical equivalents thereof are inclusive or open-ended terms that do not exclude additional, unrecited elements or method steps.

As used herein, the phrase "consisting of" and grammatical equivalents thereof exclude any element or step not specified in the claim.

As used herein, the phrase "consisting essentially of" and grammatical equivalents thereof limit the scope of a claim to the specified materials or steps and those that do not materially affect the basic and novel characteristic or characteristics of the claimed disclosure.

As used herein, the term "proximal" shall refer broadly to the concept of a portion nearest an origin.

As used herein, the term "distal" shall generally refer to the opposite of proximal, and thus to the concept of a portion farther from an origin, or a farthest portion, depending upon the context.

As used herein, color sensors are sensors known to have a color filter array (CFA) thereon to filter the incoming EMR into its separate components. In the visual range of the electromagnetic spectrum, such a CFA may be built on a Bayer pattern or modification thereon to separate green, red, and blue spectrum components of visible EMR.

As used herein, a monochromatic sensor refers to an unfiltered imaging sensor comprising color-agnostic pixels.

Figure 1B:
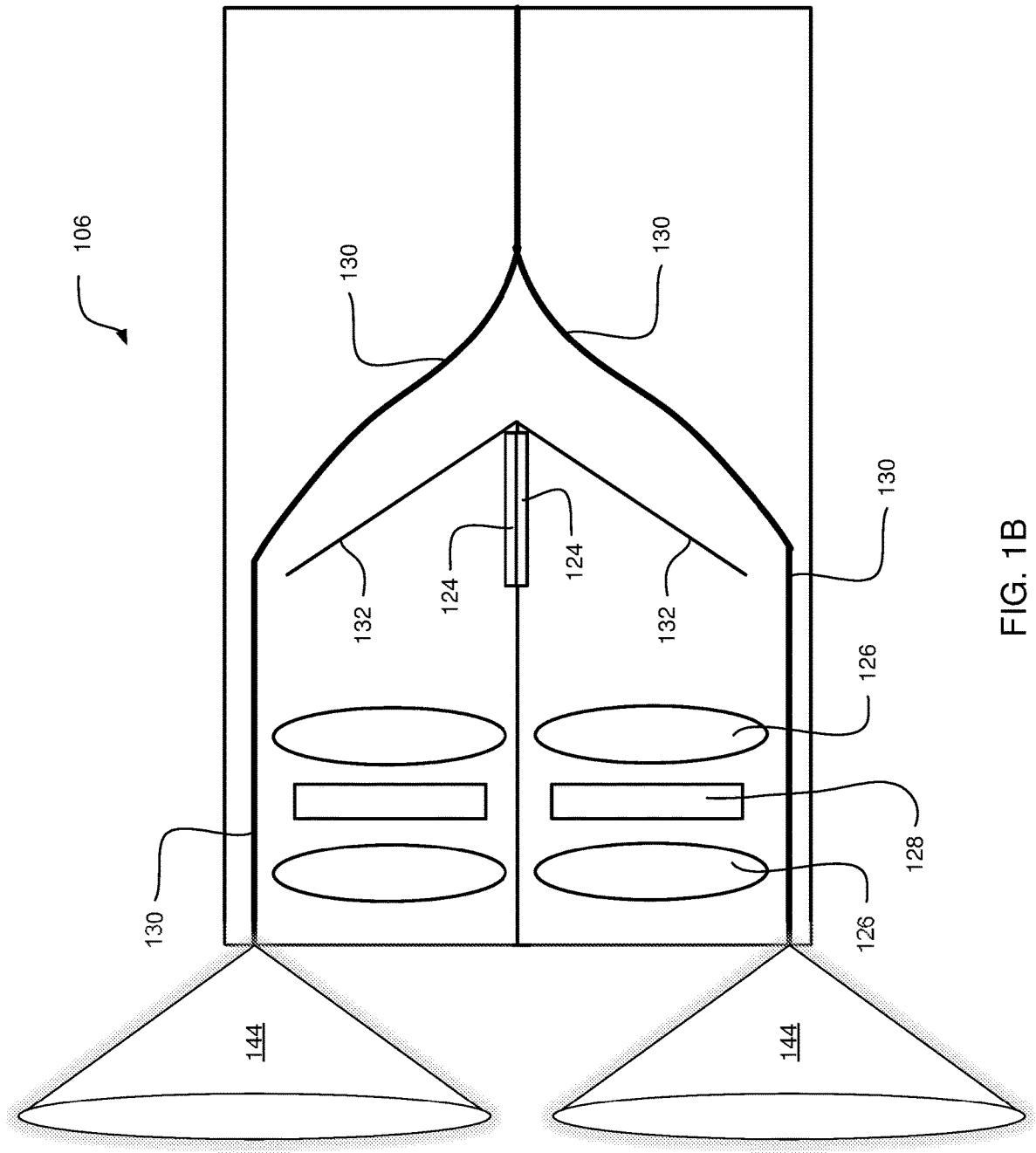
FIG. 1B is a schematic illustration of an example image pickup portion of a system for endoscopic visualization with color imaging and advanced imaging.
Figure 1C:
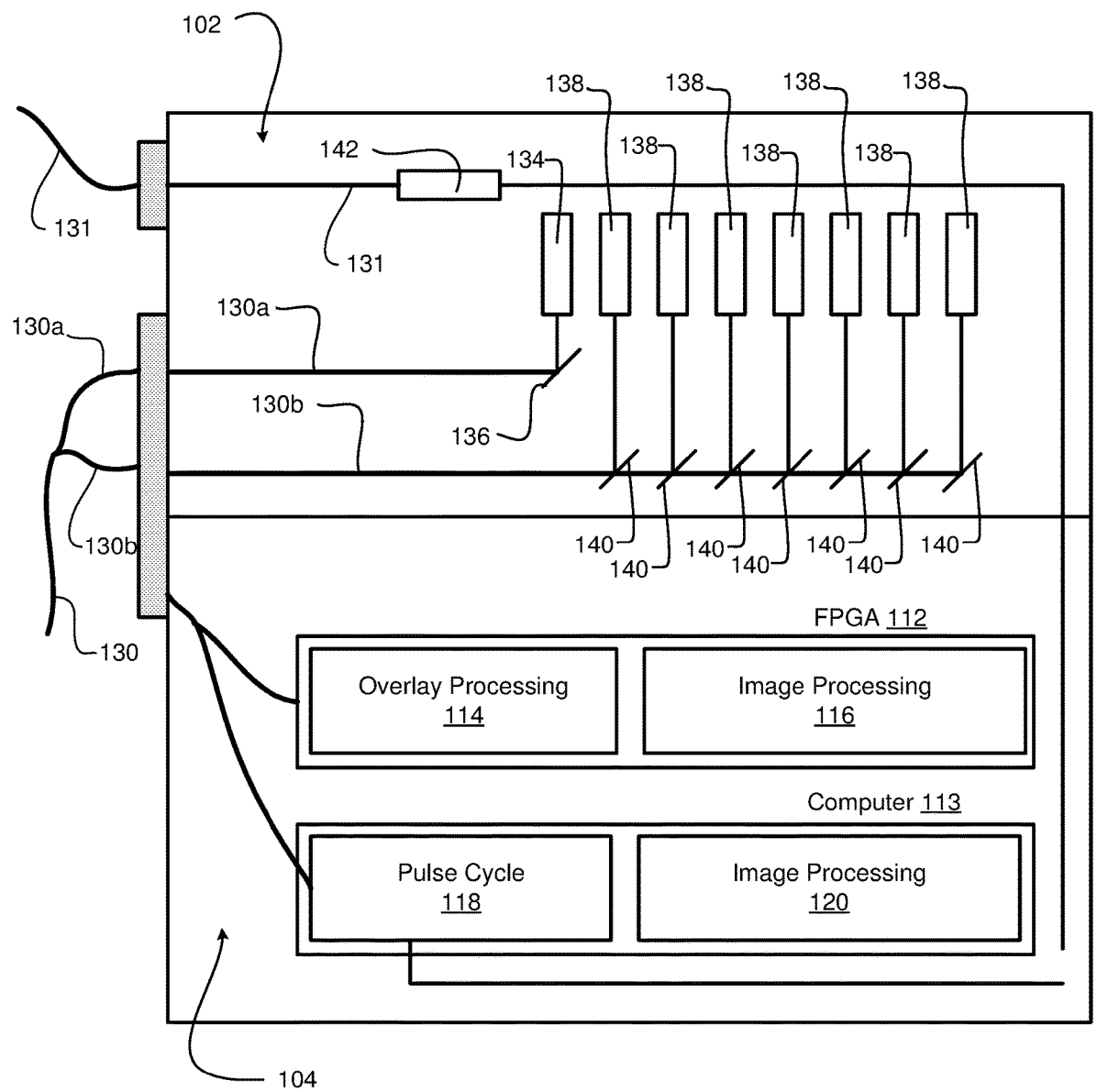
FIG. 1C is a schematic illustration of an example emitter and controller of a system for endoscopic visualization with color imaging and advanced imaging.

Referring now to the figures, FIGS. 1A-1C illustrate schematic diagrams of a system 100 for endoscopic visualization. The system 100 includes an emitter 102, a controller 104, and an optical visualization system 106. The system 100 includes one or more tools 108, which may include endoscopic tools such as forceps, brushes, scissors, cutters, burs, staplers, ligation devices, tissue staplers, suturing systems, and so forth. The system 100 includes one or more endoscopes 110 such as arthroscopes, bronchoscopes, colonoscopes, colposcopes, cystoscopes, esophagoscope, gastroscopes, laparoscopes, laryngoscopes, neuroendoscopes, proctoscopes, sigmoidoscopes, thoracoscopes, and so forth.

The optical visualization system 106 may be disposed at a distal end of a lumen of an endoscope 110. Alternatively, one or more components of the optical visualization system 106 may be disposed at a proximal end of the lumen of the endoscope 110 or in another region of the endoscope 110. The optical visualization system 106 may include one or more image sensors 124 that each include a pixel array (see pixel array 125 first illustrated in FIG. 2A). The optical visualization system 106 may include one or more lenses 126 and filters 128 and may further include one or more prisms 132 for reflecting EMR on to the pixel array 125 of the one or more image sensors 124. The system 100 may include a waveguide 130 configured to transmit EMR from the emitter 102 to a distal end of the endoscope 110 to illuminate a light deficient environment for visualization. The system 100 may further include a waveguide 131 configured to transmit EMR from the emitter 102 to a termination point on the tool 108, which may specifically be actuated for laser mapping imaging and tool tracking as described herein.

The optical visualization system 106 may specifically include two lenses 126 dedicated to each image sensor 124 to focus EMR on to a rotated image sensor 124 and enable a depth view. The filter 128 may include a notch filter configured to block unwanted reflected EMR. In a particular use-case, the unwanted reflected EMR may include a fluorescence excitation wavelength that was pulsed by the emitter 102, wherein the system 100 wishes to only detect a fluorescence relaxation wavelength emitted by a fluorescent reagent or tissue.

The image sensor 124 includes one or more image sensors, and the example implementation illustrated in FIGS. 1A-1B illustrates an optical visualization system 106 comprising two image sensors 124. The image sensor 124 may include a CMOS image sensor and may specifically include a high-resolution image sensor configured to read out data according to a rolling readout scheme. The image sensors 124 may include a plurality of different image sensors that are tuned to collect different wavebands of EMR with varying efficiencies. In an implementations, the image sensors 124 include separate image sensors that are optimized for color imaging, fluorescence imaging, multispectral imaging, and/or topographical mapping.

In most cases, the two image sensors 124 output data frames simultaneously, and these simultaneous data frames are used for stereoscopic visualization. Stereoscopic visualization (also known as stereoscopy) is a technique used to create the illusion of depth in a two-dimensional image or video. The two image sensors 124 are arranged to capture images of the scene from slightly different angles. The controller 104 (or another computing resource in communication with the controller 104) generates a depth map of the scene using pixel matching between the stereoscopic pairs of simultaneous images.

The emitter 102 includes one or more EMR sources, which may include, for example, lasers, laser bundles, light emitting diodes (LEDs), electric discharge sources, incandescence sources, electroluminescence sources, and so forth. In some implementations, the emitter 102 includes at least one white EMR source 134 (may be referred to herein as a white light source). The emitter 102 may additionally include one or more EMR sources 138 that are tuned to emit a certain waveband of EMR. The EMR sources 138 may specifically be tuned to emit a waveband of EMR that is selected for multispectral or fluorescence visualization. The emitter 102 may additionally include one or more mapping sources 142 that are configured to emit EMR in a mapping pattern such as a grid array or dot array selected for capturing data for topographical mapping or anatomical measurement.

The one or more white EMR sources 134 emit EMR into a dichroic mirror 136 that feeds the white EMR into a waveguide 130. The white EMR source 134 may specifically feed into a first waveguide 130a dedicated to white EMR. The EMR sources 138 emit EMR into independent dichroic mirrors 140 that each feed EMR into the waveguide 130 and may specifically feed into a second waveguide 130b. The first waveguide 130a and the second waveguide 130b later merge into a waveguide 130 that transmits EMR to a distal end of the endoscope 110 to illuminate a scene with an emission of EMR 144.

The one or more EMR sources 138 that are tuned to emit a waveband of EMR may specifically be tuned to emit EMR that is selected for multispectral or fluorescence visualization. In some cases, the EMR sources 138 are finely tuned to emit a central wavelength of EMR with a tolerance threshold not exceeding ±5 nm, ±4 nm, ±3 nm, ±2 nm, or ±1 nm. The EMR sources 138 may include lasers or laser bundles that are separately cycled on and off by the emitter 102 to pulse the emission of EMR 144 and illuminate a scene with a finely tuned waveband of EMR.

The one or more mapping sources 142 are configured to pulse EMR in a mapping pattern, which may include a dot array, grid array, vertical hashing, horizontal hashing, pin grid array, and so forth. The mapping pattern is selected for laser mapping imaging to determine one or more of a three-dimensional topographical map of a scene, a distance between two or more objects within a scene, a dimension of an object within a scene, a location of a tool 108 within the scene, and so forth. The EMR pulsed by the mapping source 142 is diffracted to spread the energy waves according to the desired mapping pattern. The mapping source 142 may specifically include a device that splits the EMR beam with quantum-dot-array diffraction grafting. The mapping source 142 may be configured to emit low mode laser light.

The controller 104 (may be referred to herein as a camera control unit or CCU) may include a field programmable gate array (FGPA) 112 and a computer 113. The FGPA 112 may be configured to perform overlay processing 114 and image processing 116. The computer 113 may be configured to generate a pulse cycle 118 for the emitter 102 and to perform further image processing 120. The FGPA 112 receives data from the image sensor 124 and may combine data from two or more data frames by way of overlay processing 114 to output an overlay image frame. The computer 113 may provide data to the emitter 102 and the image sensor 124. Specifically, the computer 113 may calculate and adjust a variable pulse cycle to be emitted by the emitter 102 in real-time based on user input. Additionally, the computer 113 may receive data frames from the image sensor 124 and perform further image processing 120 on those data frames.

The controller 104 may be in communication with a network, such as the Internet, and automatically upload data to the network for remote storage. The MCU 122 and image sensors 124 maybe exchanged and updated and continue to communicate with an established controller 104. In some cases, the controller 104 is "out of date" with respect to the MCU 122 but will still successfully communicate with the MCU 122. This may increase the data security for a hospital or other healthcare facility because the existing controller 104 may be configured to undergo extensive security protocols to protect patient data.

The controller 104 may reprogram the image sensor 124 for each data frame to set a required blanking period duration and/or readout period duration for a subsequent frame period. One frame period includes a blanking period and a readout period. Generally speaking, the pixel array 125 accumulates EMR during the blanking period and reads out pixel data during the readout period. It will be understood that a blanking period corresponds to a time between a readout of a last row of active pixels in the pixel array of the image sensor and a beginning of a next subsequent readout of active pixels in the pixel array. Additionally, the readout period corresponds to a duration of time when active pixels in the pixel array are being read. Further, the controller 104 may write correct registers to the image sensor 124 to adjust the duration of one or more of the blanking period or the readout period for each frame period on a frame-by-frame basis within the sensor cycle as needed.

The endoscope 110 includes a microcontroller unit (MCU) 122 disposed therein. The MCU 122 may specifically be disposed within a handpiece portion of the endoscope 110 and communicate with electronic circuitry (such as the image sensor 124) disposed within a distal end of a lumen of the endoscope 110. The MCU 122 receives instructions from the controller 104, including an indication of the pulse cycle 118 provided to the emitter 102 and the corresponding sensor cycle timing for the image sensor 124. The MCU 122 executes a common Application Program Interface (API). The controller 104 communicates with the MCU 122, and the MCU 122 executes a translation function that translates instructions received from the controller 104 into the correct format for each type of image sensor 124. In some cases, the system 100 may include multiple different image sensors that each operate according to a different "language" or formatting, and the MCU 122 is configured to translate instructions from the controller 104 into each of the appropriate data formatting languages. The common API on the MCU 122 passes information by the scene, including, for example parameters pertaining to gain, exposure, white balance, setpoint, and so forth. The MCU 122 runs a feedback algorithm to the controller 104 for any number of parameters depending on the type of visualization.

The MCU 122 stores operational data and images captured by the image sensors 124. In some cases, the MCU 122 does not need to continuously push data up the data chain to the controller 104. The data may be set once on the microcontroller 122, and then only critical information may be pushed through a feedback loop to the controller 104. The MCU 122 may be set up in multiple modes, including a primary mode (may be referred to as a "master" mode when referring to a primary/secondary device communication protocol). The MCU 122 ensures that all downstream components (i.e., distal components including the image sensors 124, which may be referred to as "slaves" in the primary/secondary device communication protocol) are apprised of the configurations for upcoming data frames. The upcoming configurations may include, for example, gain, exposure duration, readout duration, pixel binning configuration, and so forth.

The MCU 122 includes internal logic for executing triggers to coordinate different devices, including, for example multiple image sensors 124. The MCU 122 provides instructions for upcoming frames and executes triggers to ensure that each image sensor 124 begins to capture data the same time. In some cases, the image sensors 124 may automatically advance to a subsequent data frame without receiving a unique trigger from the MCU 122.

In some cases, the endoscope 110 includes two or more image sensors 124 that detect EMR and output data frames simultaneously. The simultaneous data frames may be used to output a three-dimensional image and/or output imagery with increased definition and dynamic range. The pixel array of the image sensor 124 may include active pixels and optical black ("OB") or optically blind pixels. The optical black pixels may be read during a blanking period of the pixel array when the pixel array is "reset" or calibrated. After the optical black pixels have been read, the active pixels are read during a readout period of the pixel array. The active pixels accumulate EMR that is pulsed by the emitter 102 during the blanking period of the image sensor 124. The pixel array 125 may include monochromatic or "color agnostic" pixels that do not comprise any filter for selectively receiving certain wavebands of EMR. The pixel array may include a color filter array (CFA), such as a Bayer pattern CFA, that selectively allows certain wavebands of EMR to pass through the filters and be accumulated by the pixel array.

The image sensor 124 is instructed by a combination of the MCU 122 and the controller 104 working in a coordinated effort. Ultimately, the MCU 122 provides the image sensor 124 with instructions on how to capture the upcoming data frame. These instructions include, for example, an indication of the gain, exposure, white balance, exposure duration, readout duration, pixel binning configuration, and so forth for the upcoming data frame. When the image sensor 124 is reading out data for a current data frame, the MCU 122 is rewriting the correct registers for the next data frame. The MCU 122 and the image sensor 124 operate in a back-and-forth data flow, wherein the image sensor 124 provides data to the MCU 122 and the MCU 122 rewrites correct registers to the image sensor 124 for each upcoming data frame. The MCU 122 and the image sensor 124 may operate according to a "ping pong buffer" in some configurations.

The image sensor 124, MCU 122, and controller 104 engage in a feedback loop to continuously adjust and optimize configurations for upcoming data frames based on output data. The MCU 122 continually rewrites correct registers to the image sensor 124 depending on the type of upcoming data frame (i.e., color data frame, multispectral data frame, fluorescence data frame, topographical mapping data frame, and so forth), configurations for previously output data frames, and user input. In an example implementation, the image sensor 124 outputs a multispectral data frame in response to the emitter 102 pulsing a multispectral waveband of EMR. The MCU 122 and/or controller 104 determines that the multispectral data frame is underexposed and cannot successfully be analyzed by a corresponding machine learning algorithm. The MCU 122 and/or controller 104 than adjusts configurations for upcoming multispectral data frames to ensure that future multispectral data frames are properly exposed. The MCU 122 and/or controller 104 may indicate that the gain, exposure duration, pixel binning configuration, etc. must be adjusted for future multispectral data frames to ensure proper exposure. All image sensor 124 configurations may be adjusted in real-time based on previously output data processed through the feedback loop, and further based on user input.

The waveguides 130, 131 include one or more optical fibers. The optical fibers may be made of a low-cost material, such as plastic to allow for disposal of one or more of the waveguides 130, 131. In some implementations, one or more of the waveguides 130, 131 include a single glass fiber having a diameter of 500 microns. In some implementations, one or more of the waveguides 130, 131 include a plurality of glass fibers.

Figure 2A:
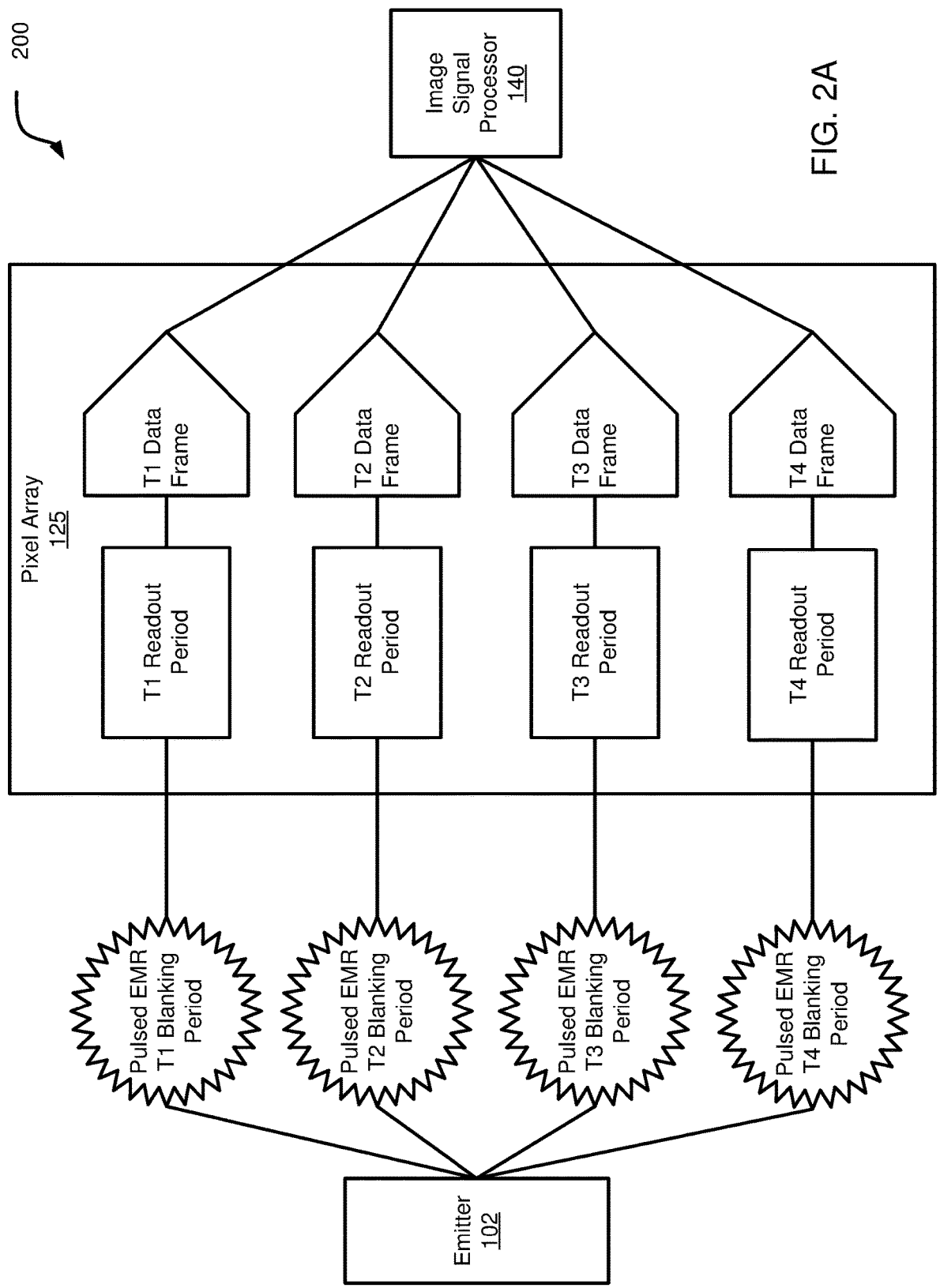
FIG. 2A is a schematic block diagram of an example data flow for a time-sequenced visualization system.
Figure 2B:
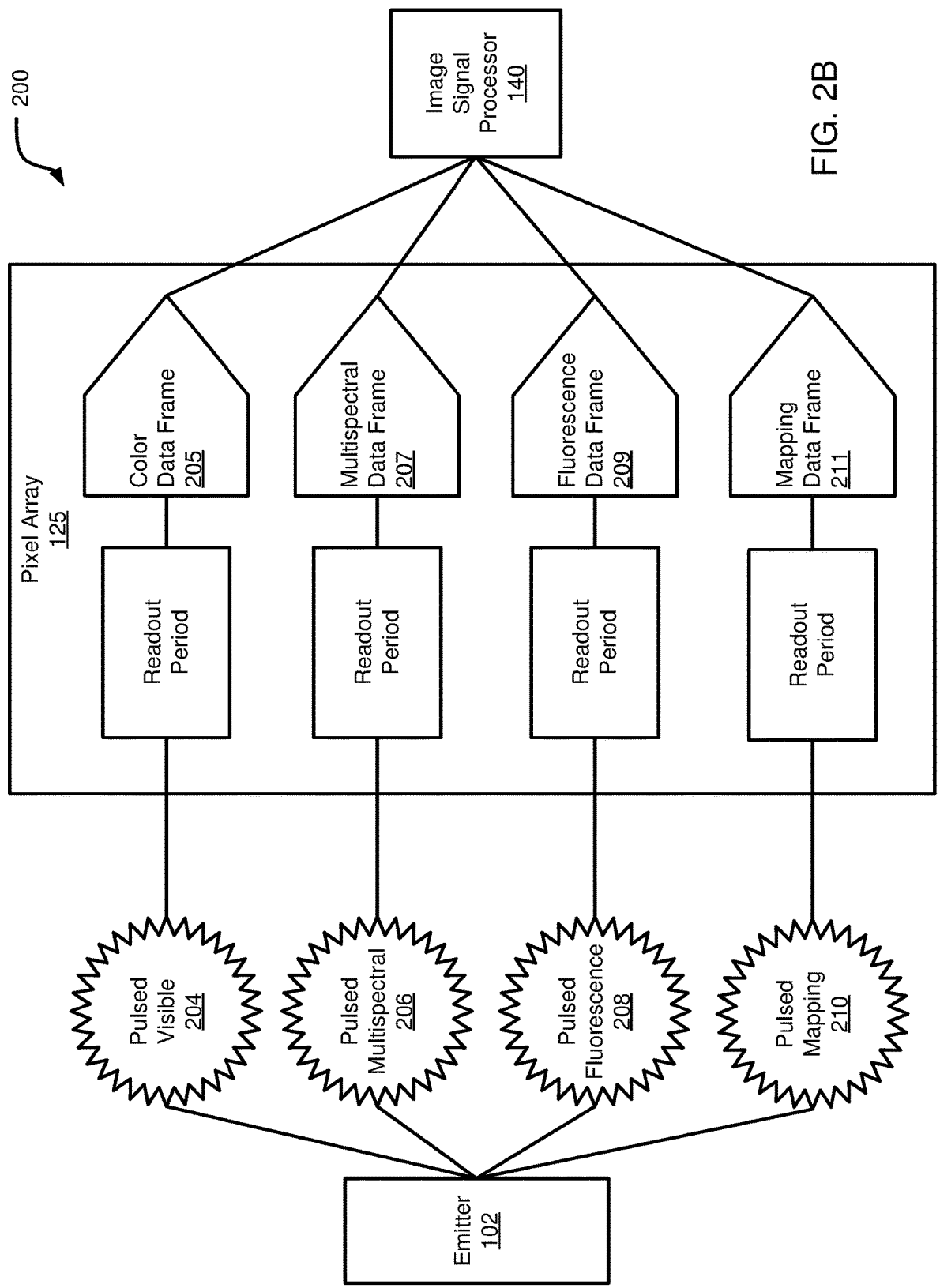
FIG. 2B is a schematic block diagram of an example data flow for a time-sequenced visualization system.

FIGS. 2A and 2B each illustrate a schematic diagram of a data flow 200 for time-sequenced visualization of a light deficient environment. The data flow 200 illustrated in FIGS. 2A-2B may be implemented by the system 100 for endoscopic visualization illustrated in FIGS. 1A-1C. FIG. 2A illustrates a generic implementation that may be applied to any type of illumination or wavelengths of EMR. FIG. 2B illustrates an example implementation wherein the emitter 102 actuates visible, multispectral, fluorescence, and mapping EMR sources.

The data flow 200 includes an emitter 102, a pixel array 125 of an image sensor 124 (not shown), and an image signal processor 140. The image signal processor 140 may include one or more of the image processing 116, 120 modules illustrated in FIGS. 1A and 1C. The emitter 102 includes a plurality of separate and independently actuatable EMR sources (see, e.g., 134, 138 illustrated in FIGS. 1A and 1C). Each of the EMR sources can be cycled on and off to emit a pulse of EMR with a defined duration and magnitude. The pixel array 125 of the image sensor 124 may include a color filter array (CFA) or an unfiltered array comprising color-agnostic pixels. The emitter 102 and the pixel array 125 are each in communication with a controller 104 (not shown in FIGS. 2A-2B) that instructs the emitter 102 and the pixel array 125 to synchronize operations to generate a plurality of data frames according to a desired visualization scheme.

The controller 104 instructs the emitter 102 to cycle the plurality of EMR sources according to a variable pulse cycle. The controller 104 calculates the variable pulse cycle based at least in part upon a user input indicating the desired visualization scheme. For example, the desired visualization scheme may indicate the user wishes to view a scene with only color imaging. In this case, the variable pulse cycle may include only pulses of white EMR. In an alternative example, the desired visualization scheme may indicate the user wishes to be notified when nerve tissue can be identified in the scene and/or when a tool within the scene is within a threshold distance from the nerve tissue. In this example, the variable pulse cycle may include pulses of white EMR and may further include pulses of one or more multispectral wavebands of EMR that elicit a spectral response from the nerve tissue and/or "see through" non-nerve tissues by penetrating those non-nerve tissues. Additionally, the variable pulse cycle may include pulses of EMR in a mapping pattern configured for laser mapping imaging to determine when the tool is within the threshold distance from the nerve tissue. The controller 104 may reconfigure the variable pulse cycle in real-time in response to receiving a revised desired visualization scheme from the user.

FIGS. 2A and 2B each illustrate a schematic diagram of a data flow 200 for time-sequenced visualization of a light deficient environment. The data flow 200 illustrated in FIGS. 2A-2B may be implemented by the system 100 for endoscopic visualization illustrated in FIGS. 1A-1C. FIG. 2A illustrates a generic implementation that may be applied to any type of illumination or wavelengths of EMR. FIG. 2B illustrates an example implementation wherein the emitter 102 actuates visible, multispectral, fluorescence, and mapping EMR sources.

The data flow 200 includes an emitter 102, a pixel array 125 of an image sensor 124 (not shown), and an image signal processor 140. The image signal processor 140 may include one or more of the image processing 116, 120 modules illustrated in FIGS. 1A and 1C. The emitter 102 includes a plurality of separate and independently actuatable EMR sources (see, e.g., 134, 138 illustrated in FIGS. 1A and 1C). Each of the EMR sources can be cycled on and off to emit a pulse of EMR with a defined duration and magnitude. The pixel array 125 of the image sensor 124 may include a color filter array (CFA) or an unfiltered array comprising color-agnostic pixels. The emitter 102 and the pixel array 125 are each in communication with a controller 104 (not shown in FIGS. 2A-2B) that instructs the emitter 102 and the pixel array 125 to synchronize operations to generate a plurality of data frames according to a desired visualization scheme.

The controller 104 instructs the emitter 102 to cycle the plurality of EMR sources according to a variable pulse cycle. The controller 104 calculates the variable pulse cycle based at least in part upon a user input indicating the desired visualization scheme. For example, the desired visualization scheme may indicate the user wishes to view a scene with only color imaging. In this case, the variable pulse cycle may include only pulses of broad spectrum visible EMR. In an alternative example, the desired visualization scheme may indicate the user wishes to be notified when nerve tissue can be identified in the scene and/or when a tool within the scene is within a threshold distance from the nerve tissue. In this example, the variable pulse cycle may include pulses of white EMR and may further include pulses of one or more multispectral wavebands of EMR that elicit a spectral response from the nerve tissue and/or "see through" non-nerve tissues by penetrating those non-nerve tissues. Additionally, the variable pulse cycle may include pulses of EMR in a mapping pattern configured for laser mapping imaging to determine when the tool is within the threshold distance from the nerve tissue. The controller 104 may reconfigure the variable pulse cycle in real-time in response to receiving a revised desired visualization scheme from the user.

FIG. 2A illustrates wherein the emitter cycles one or more EMR sources on and off to emit a pulse of EMR during each of a plurality of separate blanking periods of the pixel array 125. Specifically, the emitter 102 emits pulsed EMR during each of a T1 blanking period, T2 blanking period, T3 blanking period, and T4 blanking period of the pixel array 125. The pixel array 125 accumulates EMR during its blanking periods and reads out data during its readout periods.

Specifically, the pixel array 125 accumulates EMR during the T1 blanking period and reads out the T1 data frame during the T1 readout period, which follows the T1 blanking period. Similarly, the pixel array 125 accumulates EMR during the T2 blanking period and reads out the T2 data frame during the T2 readout period, which follows the T2 blanking period. The pixel array 125 accumulates EMR during the T3 blanking period and reads out the T3 data frame during the T3 readout period, which follows the T3 blanking period. The pixel array 125 accumulates EMR during the T4 blanking period and reads out the T4 data frame during the T4 readout period, which follows the T4 blanking period. Each of the T1 data frame, the T2 data frame, the T3 data frame, and the T4 data frame is provided to the image signal processor 140.

The contents of each of the T1-T4 data frames is dependent on the type of EMR that was pulsed by the emitter 102 during the preceding blanking period. For example, if the emitter 102 pulses white light during the preceding blanking period, then the resultant data frame may include a color data frame (if the pixel array 125 includes a color filter array for outputting red, green, and blue image data). Further for example, if the emitter 102 pulses a multispectral waveband of EMR during the preceding blanking period, then the resultant data frame is a multispectral data frame comprising information for identifying a spectral response by one or more objects within the scene and/or information for "seeing through" one or more structures within the scene. Further for example, if the emitter 102 pulses a fluorescence excitation waveband of EMR during the preceding blanking period, then the resultant data frame is a fluorescence data frame comprising information for identifying a fluorescent reagent or autofluorescence response by a tissue within the scene. Further for example, if the emitter 102 pulses EMR in a mapping pattern during the preceding blanking period, then the resultant data frame is a mapping data frame comprising information for calculating one or more of a three-dimensional topographical map of the scene, a dimension of one or more objects within the scene, a distance between two or more objects within the scene, and so forth.

Some "machine vision" or "computer vision" data frames, including multispectral data frames, fluorescence data frames, and mapping data frames may be provided to a corresponding algorithm or neural network configured to evaluate the information therein. A multispectral algorithm may be configured to identify one or more tissue structures within a scene based on how those tissue structures respond to one or more different wavebands of EMR selected for multispectral imaging. A fluorescence algorithm may be configured to identify a location of a fluorescent reagent or auto-fluorescing tissue structure within a scene. A mapping algorithm may be configured to calculate one or more of a three-dimensional topographical map of a scene, a depth map, a dimension of one or more objects within the scene, and/or a distance between two or more objects within the scene based on the mapping data frame.

FIG. 2B illustrates an example wherein the emitter 102 cycles separate visible, multispectral, fluorescence, and mapping EMR sources to emit pulsed visible 204, pulsed multispectral 206, pulsed fluorescence 208, and pulsed EMR in a mapping pattern 210. It should be appreciated that FIG. 2B is illustrative only, and that the emissions 204, 206, 208, 210 may be emitted in any order, may be emitted during a single visualization session as shown in FIG. 2B, and may be emitted during separate visualization sessions.

The pixel array 125 reads out a color data frame 205 in response to the emitter 102 pulsing the pulsed visible 204 EMR. The pulsed visible 204 EMR may specifically include a pulse of white light. The pixel array 125 reads out a multispectral data frame 207 in response to the emitter 102 pulsing the multispectral 206 waveband of EMR. The pulsed multispectral 206 waveband of EMR may specifically include one or more of EMR within a waveband from about 513-545 nanometers (nm), 565-585 nm, 770-790 nm, and/or 900-1000 nm. It will be appreciated that the pulsed multispectral 206 waveband of EMR may include various other wavebands used to elicit a spectral response. The pixel array 125 reads out a fluorescence data frame 209 in response to the emitter 102 pulsing the fluorescence 208 waveband of EMR. The pulsed fluorescence 208 waveband of EMR may specifically include one or more of EMR within a waveband from about 770-795 nm and/or 790-815 nm. The pixel array 125 reads out a mapping data frame 211 in response to the emitter 102 pulsing EMR in a mapping pattern 210. The pulsed mapping pattern 210 may include one or more of vertical hashing, horizontal hashing, a pin grid array, a dot array, a raster grid of discrete points, and so forth. Each of the color data frame 205, the multispectral data frame 207, the fluorescence data frame 209, and the mapping data frame 211 is provided to the image signal processor 140.

In an implementation, the emitter 102 separately pulses red, green, and blue visible EMR. In this implementation, the pixel array 125 may include a monochromatic (color agnostic) array of pixels. The pixel array 125 may separately read out a red data frame, a green data frame, and a blue data frame in response to the separate pulses of red, green, and blue visible EMR.

In an implementation, the emitter 102 separately pulses wavebands of visible EMR that are selected for capturing luminance ("Y") imaging data, red chrominance ("Cr") imaging data, and blue chrominance ("Cb") imaging data. In this implementation, the pixel array 125 may separately read out a luminance data frame (comprising only luminance imaging information), a red chrominance data frame, and a blue chrominance data frame.

Figure 2C:
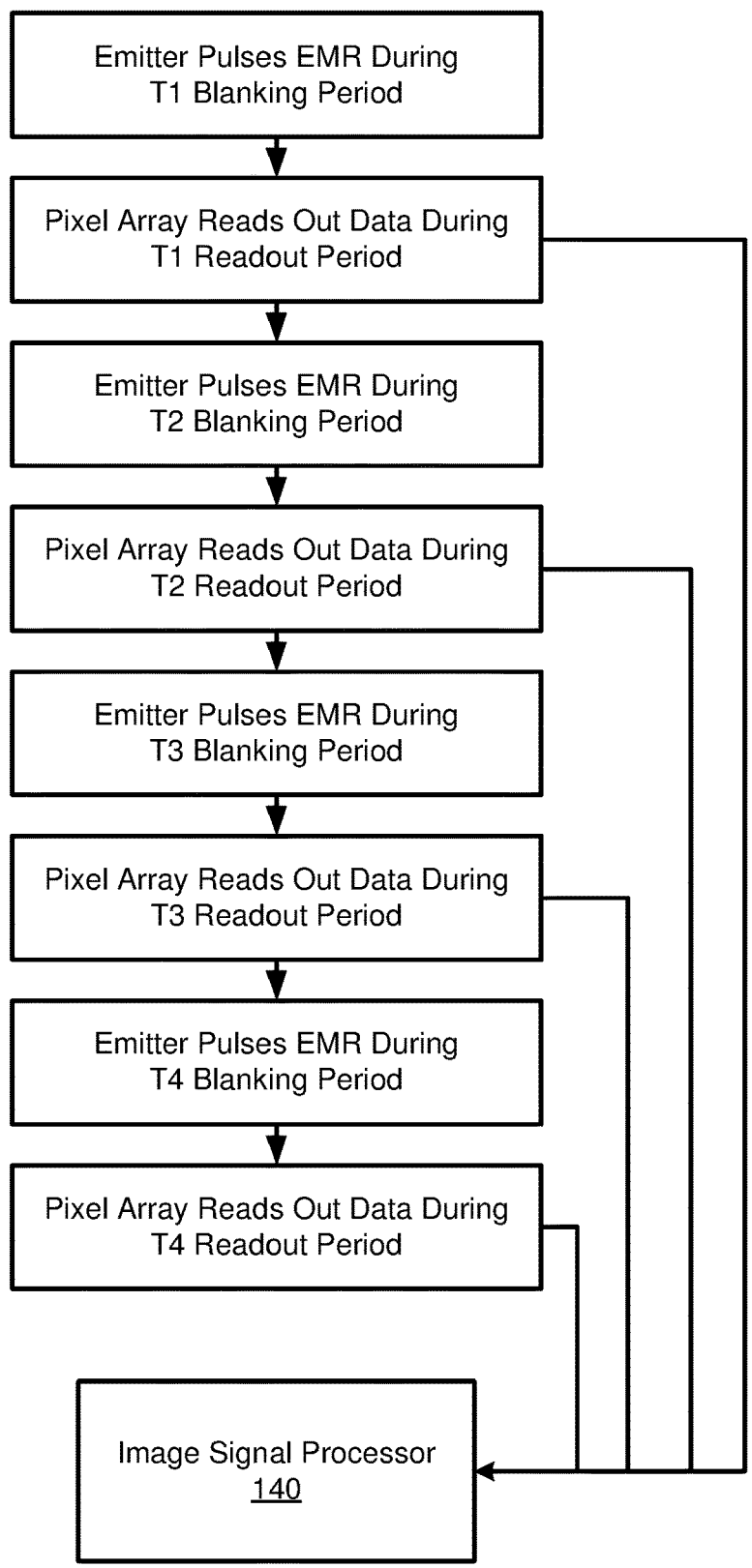
FIG. 2C is a schematic flow chart diagram of a data flow for capturing and reading out data for a time-sequenced visualization system.

FIG. 2C illustrates a schematic flow chart diagram of a process flow for synchronizing operations of the emitter 102 and the pixel array 125. The process flow corresponds with the schematic diagram illustrated in FIG. 2A. The process flow includes the controller 104 instructing the emitter 102 to pulse EMR during a T1 blanking period of the pixel array 125 and then instructing the pixel array 125 to read out data during a T1 readout period following the T1 blanking period. Similarly, the controller 104 instructs the emitter to pulse EMR during each of the T2 blanking period, the T3 blanking period, and the T4 blanking period. The controller 104 instructs the emitter to read out data during each of the T2 readout period, the T3 readout period, and the T4 readout period that follow the corresponding blanking periods. Each of the output data frames are provided to the image signal processor 140.

The emitter 102 pulses according to a variable pulse cycle that includes one or more types of EMR. The variable pulse cycle may include visible EMR, which may include a white light emission, red light emission, green light emission, blue light emission, or some other waveband of visible EMR. The white light emission may be pulsed with a white light emitting diode (LED) or other light source and may alternatively be pulsed with a combination of red, green, and blue light sources pulsing in concert. The variable pulse cycle may include one or more wavebands of EMR that are selected for multispectral imaging or fluorescence imaging. The variable pulse cycle may include one or more emissions of EMR in a mapping pattern selected for three-dimensional topographical mapping or calculating dimensions within a scene. In some cases, several types of EMR are represented in the variable pulse cycle with different regularity than other types of EMR. This may be implemented to emphasize and de-emphasize aspects of the recorded scene as desired by the user.

The controller 104 adjusts the variable pulse cycle in real-time based on the visualization objectives. The system enables a user to input one or more visualization objectives and to change those objectives while using the system. For example, the visualization objective may indicate the user wishes to view only color imaging data, and in this case, the variable pulse cycle may include pulsed or constant emissions of white light (or other visible EMR). The visualization objective may indicate the user wishes to be notified when a scene includes one or more types of tissue or conditions that may be identified using one or more of color imaging, multispectral imaging, or fluorescence imaging. The visualization objective may indicate that a patient has been administered a certain fluorescent reagent or dye, and that fluorescence imaging should continue while the reagent or dye remains active. The visualization objective may indicate the user wishes to view a three-dimensional topographical map of a scene, receive information regarding distances or dimensions within the scene, receive an alert when a tool comes within critical distance from a certain tissue structure, and so forth.

The variable pulse cycle may include one or more finely tuned partitions of the electromagnetic spectrum that are selected to elicit a fluorescence response from a reagent, dye, or auto-fluorescing tissue. The fluorescence excitation wavebands of EMR include one or more of the following: 400±50 nm, 450±50 nm, 500±50 nm, 550±50 nm, 600±50 nm, 650±50 nm, 700±50 nm, 710±50 nm, 720±50 nm, 730±50 nm, 740±50 nm, 750±50 nm, 760±50 nm, 770±50 nm, 780±50 nm, 790±50 nm, 800±50 nm, 810±50 nm, 820±50 nm, 830±50 nm, 840±50 nm, 850±50 nm, 860±50 nm, 870±50 nm, 880±50 nm, 890±50 nm, or 900±50 nm. The aforementioned wavebands may be finely tuned such that the emitter pulses the central wavelength with a tolerance threshold of ±100 nm, ±90 nm, ±80 nm, ±70 nm, ±60 nm, ±50 nm, ±40 nm, ±30 nm, ±20 nm, ±10 nm, ±8 nm, ±6 nm, ±5 nm, ±4 nm, ±3 nm, ±2 nm, ±1 nm, and so forth. In some cases, the emitter includes a plurality of laser bundles that are each configured to pulse a particular wavelength of EMR with a tolerance threshold not greater than ±5 nm, ±4 nm, ±3 nm, or ±2 nm.

The variable pulse cycle may include one or more wavebands of EMR that are tuned for multispectral imaging. These wavebands of EMR are selected to elicit a spectral response from a certain tissue or penetrate through a certain tissue (such that substances disposed behind that tissue may be visualized). The multispectral wavebands of EMR include one or more of the following: 100±50 nm, 150±50 nm, 200±50 nm, 250±50 nm, 300±50 nm, 350±50 nm, 400±50 nm, 450±50 nm, 400±50 nm, 410±50 nm, 420±50 nm, 430±50 nm, 440±50 nm, 450±50 nm, 460±50 nm, 470±50 nm, 480±50 nm, 490±50 nm, 500±50 nm, 510±50 nm, 520±50 nm, 530±50 nm, 540±50 nm, 550±50 nm, 560±50 nm, 570±50 nm, 580±50 nm, 590±50 nm, 600±50 nm, 610±50 nm, 620±50 nm, 630±50 nm, 640±50 nm, 650±50 nm, 660±50 nm, 670±50 nm, 680±50 nm, 690±50 nm, 700±50 nm, 710±50 nm, 720±50 nm, 730±50 nm, 740±50 nm, 750±50 nm, 760±50 nm, 770±50 nm, 780±50 nm, 790±50 nm, 800±50 nm, 810±50 nm, 820±50 nm, 830±50 nm, 840±50 nm, 850±50 nm, 860±50 nm, 870±50 nm, 880±50 nm, 890±50 nm, 900±50 nm, 910±50 nm, 920±50 nm, 930±50 nm, 940±50 nm, 950±50 nm, 960±50 nm, 970±50 nm, 980±50 nm, 990±50 nm, 1000±50 nm, 900±100 nm, 950±100 nm, or 1000±100 nm. The aforementioned wavebands may be finely tuned such that the emitter pulses the central wavelength with a tolerance threshold of ±100 nm, ±90 nm, ±80 nm, ±70 nm, ±60 nm, ±50 nm, ±40 nm, ±30 nm, ±20 nm, ±10 nm, ±8 nm, ±6 nm, ±5 nm, ±4 nm, ±3 nm, ±2 nm, ±1 nm, and so forth. In some cases, the emitter includes a plurality of laser bundles that are each configured to pulse a particular wavelength of EMR with a tolerance threshold not greater than ±5 nm, ±4 nm, ±3 nm, or ±2 nm.

Certain multispectral wavelengths pierce through tissue and enable a medical practitioner to "see through" tissues in the foreground to identify chemical processes, structures, compounds, biological processes, and so forth that are located behind the foreground tissues. The multispectral wavelengths may be specifically selected to identify a specific disease, tissue condition, biological process, chemical process, type of tissue, and so forth that is known to have a certain spectral response.

The variable pulse cycle may include one or more emissions of EMR that are optimized for mapping imaging, which includes, for example, three-dimensional topographical mapping, depth map generation, calculating distances between objects within a scene, calculating dimensions of objects within a scene, determining whether a tool or other object approaches a threshold distance from another object, and so forth. The pulses for laser mapping imaging include EMR formed in a mapping pattern, which may include one or more of vertical hashing, horizontal hashing, a dot array, and so forth.

The controller 104 optimizes the variable pulse cycle to accommodate various imaging and video standards. In most use-cases, the system outputs a video stream comprising at least 30 frames per second (fps). The controller 104 synchronizes operations of the emitter and the image sensor to output data at a sufficient frame rate for visualizing the scene and further for processing the scene with one or more advanced visualization techniques. A user may request a real-time color video stream of the scene and may further request information based on one or more of multispectral imaging, fluorescence imaging, or laser mapping imaging (which may include topographical mapping, calculating dimensions and distances, and so forth). The controller 104 causes the image sensor to separately sense color data frames, multispectral data frames, fluorescence data frames, and mapping data frames based on the variable pulse cycle of the emitter.

In some cases, a user requests more data types than the system can accommodate while maintaining a smooth video frame rate. The system is constrained by the image sensor's ability to accumulate a sufficient amount of electromagnetic energy during each blanking period to output a data frame with sufficient exposure. In some cases, the image sensor outputs data at a rate of 60-120 fps and may specifically output data at a rate of 60 fps. In these cases, for example, the controller 104 may devote 24-30 fps to color visualization and may devote the other frames per second to one or more advanced visualization techniques.

The controller 104 calculates and adjusts the variable pulse cycle of the emitter 102 in real-time based at least in part on the known capabilities of the pixel array 125. The controller 104 may access data stored in memory indicating how long the pixel array 125 must be exposed to a certain waveband of EMR for the pixel array 125 to accumulate a sufficient amount of EMR to output a data frame with sufficient exposure. In most cases, the pixel array 125 is inherently more or less sensitive to different wavebands of EMR. Thus, the pixel array 125 may require a longer or shorter blanking period duration for some wavebands of EMR to ensure that all data frames output by the image sensor 124 comprise sufficient exposure levels.

Figure 3A:
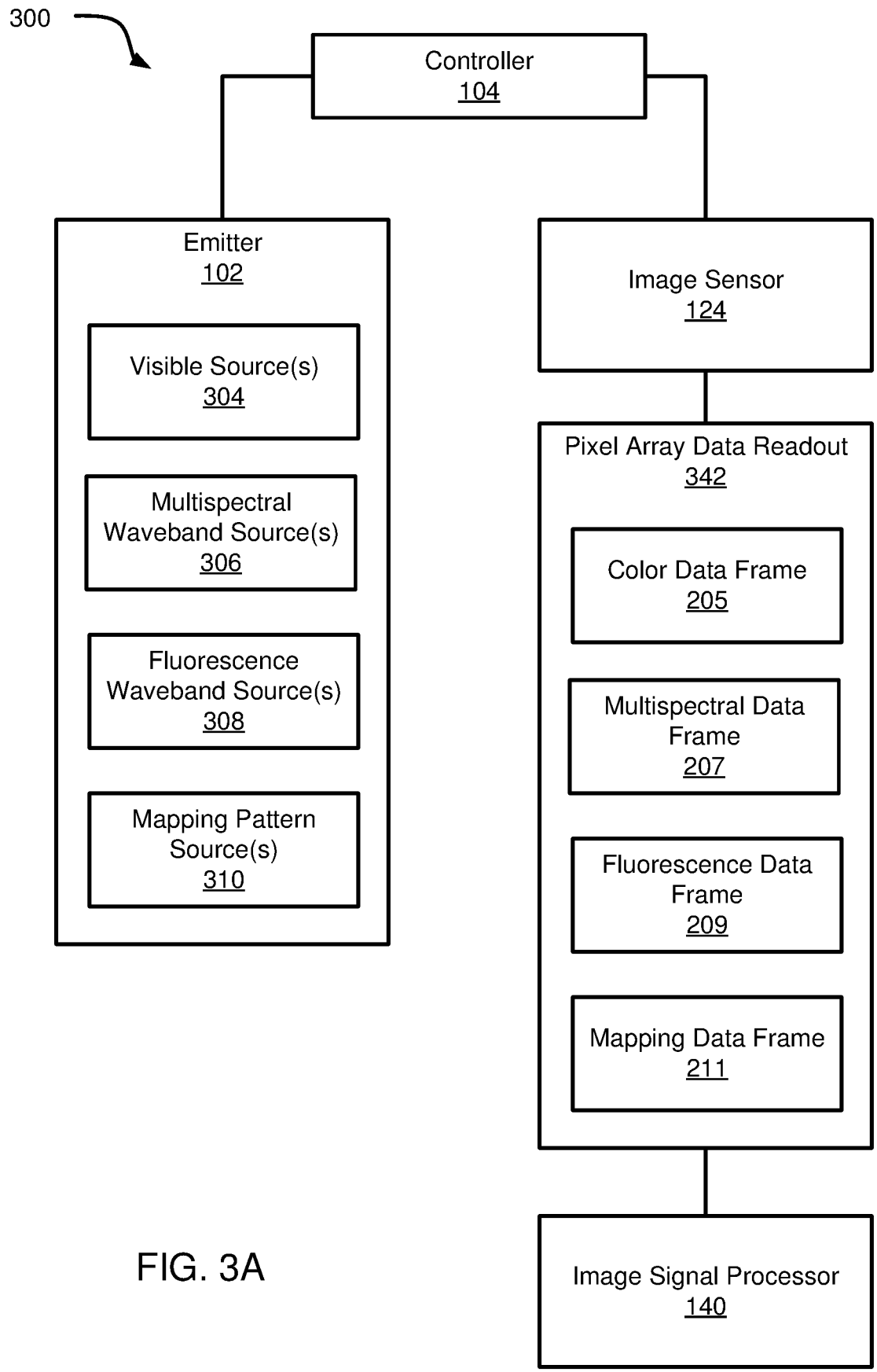
FIG. 3A is a schematic block diagram of an example system for processing data output by an image sensor with a controller in communication with an emitter and the image sensor.
Figure 3B:
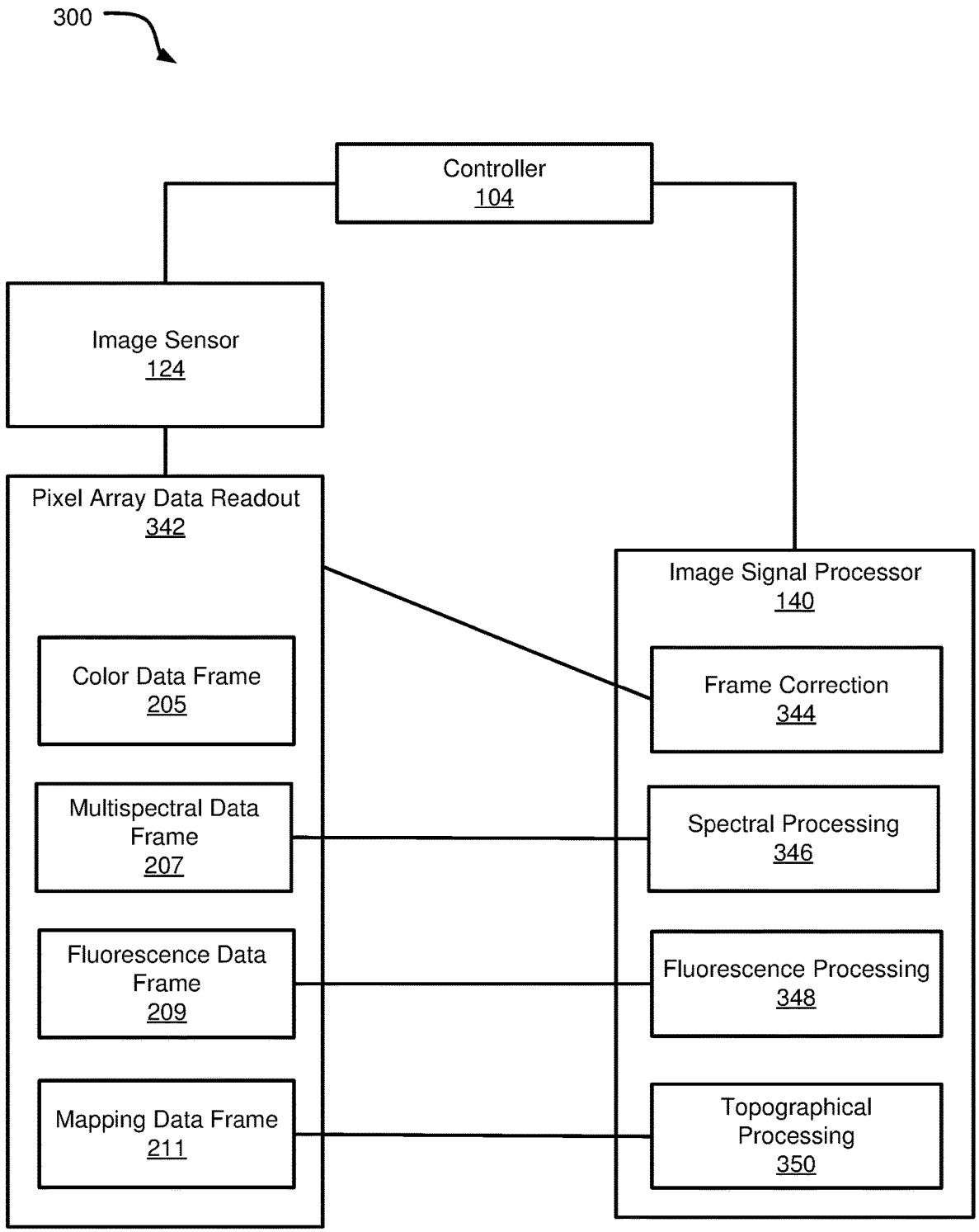
FIG. 3B is a schematic block diagram of an example system for processing data output by an image sensor to generate color imaging data and advanced imaging data.

The controller 104 determines the data input requirements for various advanced visualization algorithms (see, e.g., the algorithms 346, 348, 350 first described in FIG. 3B). For example, the controller 104 may determine that certain advanced visualization algorithms do not require a data input at the same regularity as a color video stream output of 30 fps. In these cases, the controller 104 may optimize the variable pulse cycle to include white light pulses at a more frequent rate than pulses for advanced visualization such as multispectral, fluorescence, or laser mapping imaging. Additionally, the controller 104 determines whether certain algorithms may operate with lower resolution data frames that are read out by the image sensor using a pixel binning configuration. In some cases, the controller 104 ensures that all color frames provided to a user are read out in high-resolution (without pixel binning). However, some advanced visualization algorithms (see e.g., 346, 348, 350) may execute with lower resolution data frames.

The system 100 may include a plurality of image sensors 124 that may have different or identical pixel array configurations. For example, one image sensor 124 may include a monochromatic or "color agnostic" pixel array with no filters, another image sensor 124 may include a pixel array with a Bayer pattern CFA, and another image sensor 124 may include a pixel array with a different CFA. The multiple image sensors 124 may be assigned to detect EMR for a certain imaging modality, such as color imaging, multispectral imaging, fluorescence imaging, or laser mapping imaging. Further, each of the image sensors 124 may be configured to simultaneously accumulate EMR and output a data frame, such that all image sensors are capable of sensing data for all imaging modalities.

The controller 104 prioritizes certain advanced visualization techniques based on the user's ultimate goals. In some cases, the controller 104 prioritizes outputting a smooth and high-definition color video stream to the user above other advanced visualization techniques. In other cases, the controller 104 prioritizes one or more advanced visualization techniques over color visualization, and in these cases, the output color video stream may appear choppy to a human eye because the system outputs fewer than 30 fps of color imaging data.

For example, a user may indicate that a fluorescent reagent has been administered to a patient. If the fluorescent reagent is time sensitive, then the controller 104 may ensure that a sufficient ratio of frames is devoted to fluorescence imaging to ensure the user receives adequate fluorescence imaging data while the reagent remains active. In another example, a user requests a notification whenever the user's tool comes within a threshold distance of a certain tissue, such as a blood vessel, nerve fiber, cancer tissue, and so forth. In this example, the controller 104 may prioritize laser mapping visualization to constantly determine the distance between the user's tool and the surrounding structures and may further prioritize multispectral or fluorescence imaging that enables the system to identify the certain tissue. The controller 104 may further prioritize color visualization to ensure the user continues to view a color video stream of the scene.

Figure 3C:
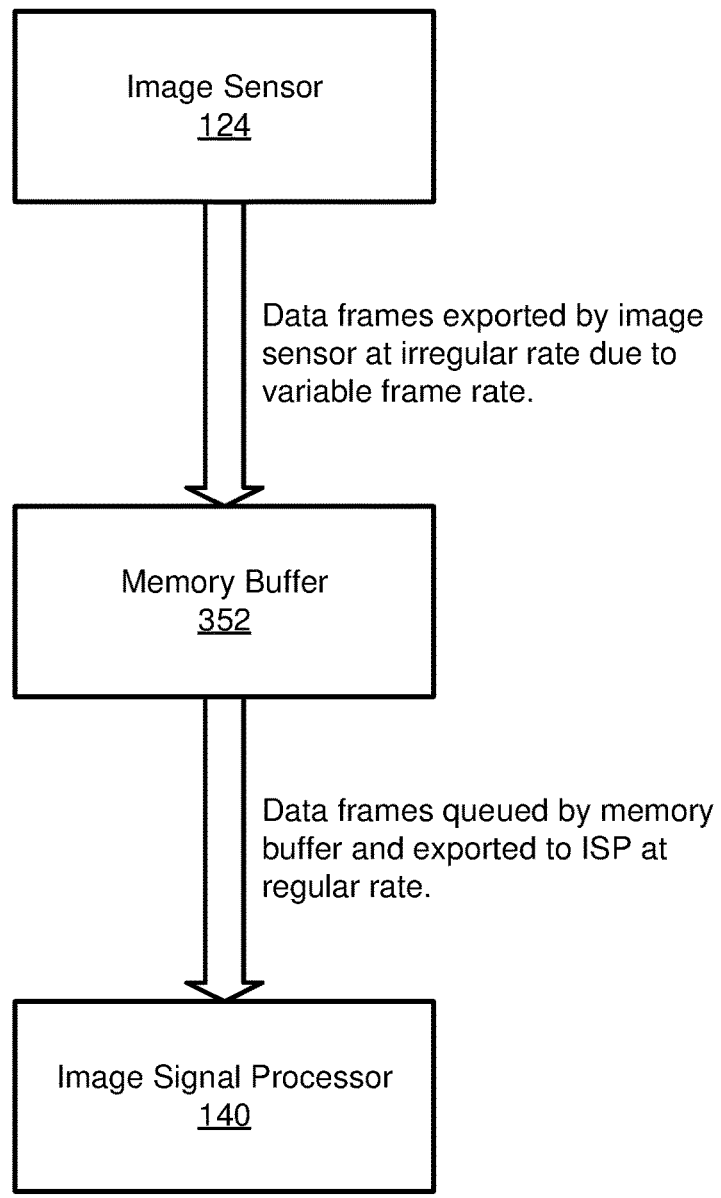
FIG. 3C is a schematic block diagram of an example system for processing data through a memory buffer to provide data frames to an image signal processor at regular intervals.

FIGS. 3A-3C illustrate schematic diagrams of a system 300 for processing data output by an image sensor 124 comprising the pixel array 125. The system 300 includes a controller 104 in communication with each of the emitter 102 and the image sensor 124 comprising the pixel array 125. The emitter 102 includes one or more visible sources 304, multispectral waveband sources 306, fluorescence waveband sources 308, and mapping pattern sources 310 of EMR. The pixel array data readout 342 of the image sensor 124 includes one or more of the color data frames 205, multispectral data frames 207, fluorescence data frames 209, and mapping data frames 211 as discussed in connection with FIG. 2B.

As illustrated in FIG. 3B, all data read out by the pixel array may undergo frame correction 344 processing by the image signal processor 140. In various implementations, one or more of the color data frame 205, the multispectral data frame 207, the fluorescence data frame 209, and the mapping data frame 211 undergoes frame correction 344 processes. The frame correction 344 includes one or more of sensor correction, white balance, color correction, or edge enhancement.

The multispectral data frame 207 may undergo spectral processing 346 that is executed by the image signal processor 140 and/or another processor that is external to the system 300. The spectral processing 346 may include a machine learning algorithm and may be executed by a neural network configured to process the multispectral data frame 207 to identify one or more tissue structures within a scene based on whether those tissue structures emitted a spectral response.

The fluorescence data frame 209 may undergo fluorescence processing 348 that is executed by the image signal processor 140 and/or another processor that is external to the system 300. The fluorescence processing 348 may include a machine learning algorithm and may be executed by a neural network configured to process to fluorescence data frame 209 and identify an intensity map wherein a fluorescence relaxation wavelength is detected by the pixel array.

The mapping data frame 211 may undergo topographical processing 350 that is executed by the image signal processor 140 and/or another processor that is external to the system 300. The topographical processing 350 may include a machine learning algorithm and may be executed by a neural network configured to assess time-of-flight information to calculate a depth map representative of the scene. The topographical processing 350 includes calculating one or more of a three-dimensional topographical map of the scene, a dimension of one or more objects within the scene, a distance between two or more objects within the scene, a distance between a tool and a certain tissue structure within the scene, and so forth.

FIG. 3C illustrates a schematic diagram of a system 300 and process flow for managing data output at an irregular rate. The image sensor 124 operates according to a sensor cycle that includes blanking periods and readout periods. The image sensor 124 outputs a data frame at the conclusion of each readout period that includes an indication of the amount of EMR the pixel array accumulated during the preceding accumulation period or blanking period.

Each frame period in the sensor cycle is adjustable on a frame-by-frame basis to optimize the output of the image sensor and compensate for the pixel array 125 having varying degrees of sensitivity to different wavebands of EMR. The duration of each blanking period may be shortened or lengthened to customize the amount of EMR the pixel array 125 can accumulate. Additionally, the duration of each readout period may be shortened or lengthened by implementing a pixel binning configuration or causing the image sensor to read out each pixel within the pixel array 125. Thus, the image sensor 124 may output data frames at an irregular rate due to the sensor cycle comprising a variable frame rate. The system 300 includes a memory buffer 352 that receives data frames from the image sensor 124. The memory buffer 352 stores the data frames and then outputs each data frame to the image signal processor 140 at a regular rate. This enables the image signal processor 140 to process each data frame in sequence at a regular rate.

Figure 4:
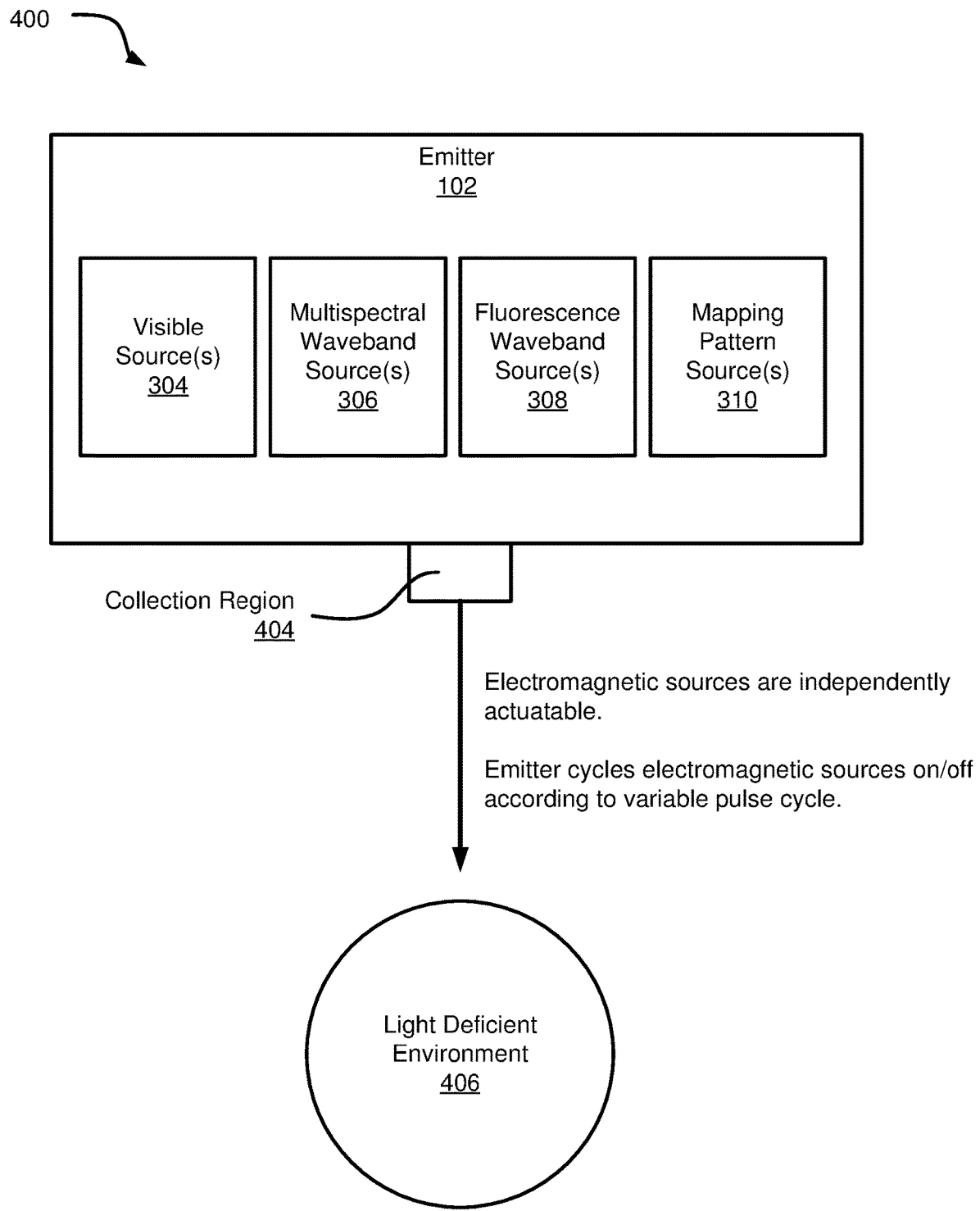
FIG. 4 is a schematic diagram of an illumination system for illuminating a light deficient environment according to a variable pulse cycle.

FIG. 4 is a schematic diagram of an illumination system 400 for illuminating a light deficient environment 406 such as an interior of a body cavity. In most cases, the emitter 102 is the only source of illumination within the light deficient environment 406 such that the pixel array of the image sensor does not detect any ambient light sources. The emitter 102 includes a plurality of separate and independently actuatable sources of EMR, which may include visible source(s) 304, multispectral waveband source(s) 306, fluorescence waveband source(s) 308, and mapping pattern source(s) 310. The emitter may cycle a selection of the sources on and off to pulse according to the variable pulse cycle received from the controller 104. Each of the EMR sources feeds into a collection region 404 of the emitter 102. The collection region 404 may then feed into a waveguide (see e.g., 130 in FIG. 1A) that transmits the pulsed EMR to a distal end of an endoscope within the light deficient environment 406.

Figure 5:
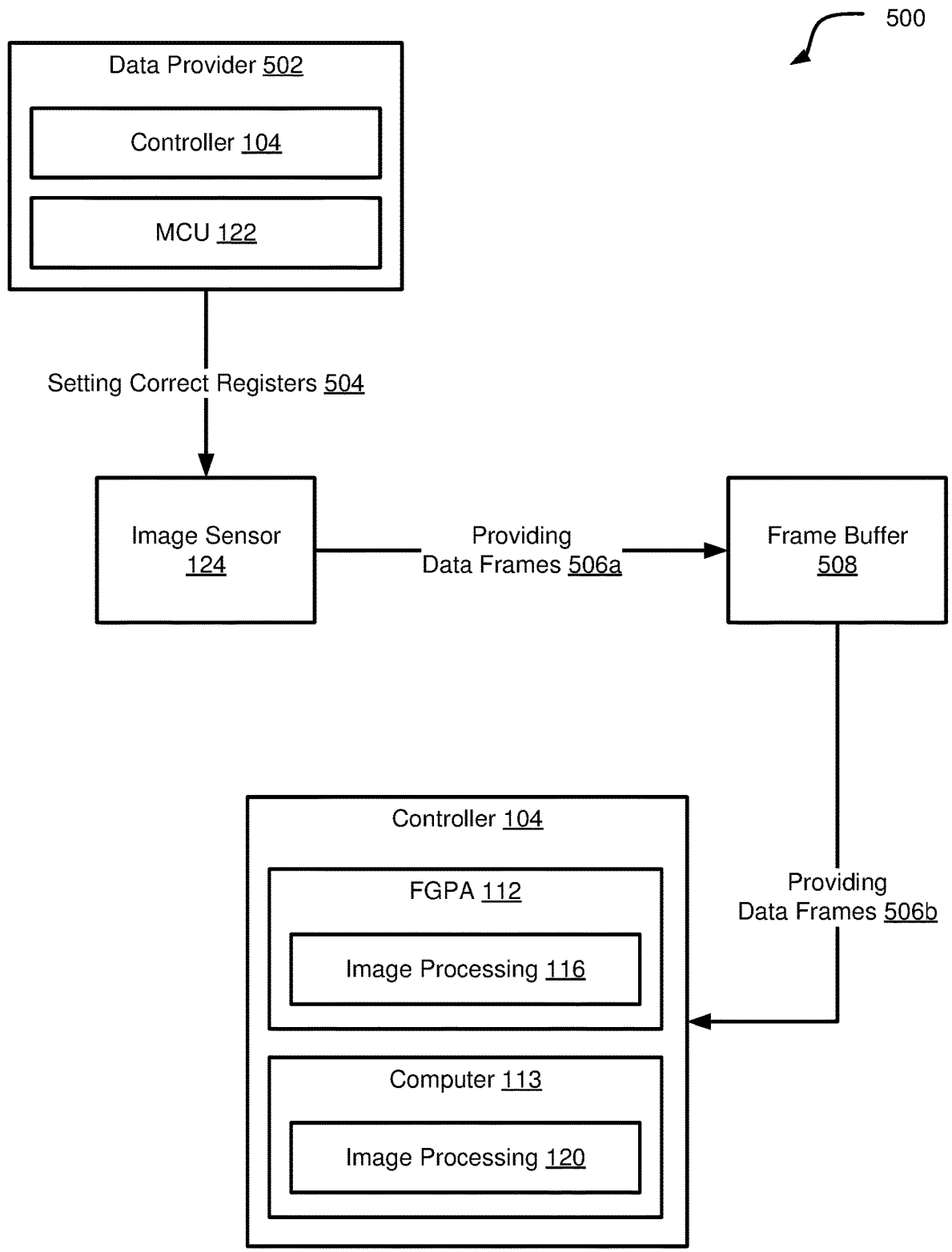
FIG. 5 is a schematic diagram of a system and process flow for outputting data frames at an irregular frame rate and then providing data frames to an image signal processing pipeline at a regular frame rate.

FIG. 5 is a schematic block diagram of a system and process flow 500 for data communications between an image sensor 124 and one or more processors. The system includes a data provider 502 that communicates with the image sensor 124 and sets correct registers for the image sensor 124. The data provider 502 includes one or more of the controller 104 or the MCU 122. The system further includes a frame buffer 508, which is memory allocated to storing and buffering a stream of data frames output by the image sensor 124. The frame buffer 508 provides data frames to the controller 104 at regular intervals.

As discussed herein, the data provider 502 (i.e., one or more of the controller 104 or the MCU 122) communicates with the image sensor 124 to set correct registers 504 for the image sensor 124. The data provider 502 may set correct registers 504 on a per-frame basis such that revised registers may be provided to the image sensor 124 for each data frame. The process of setting the correct registers for the image sensor 124 depends on the image sensor manufacturing specifications and the intended use case. However, in general, setting correct registers 504 includes determining the specifications for an upcoming data frame to be read out by the image sensor 124, including, for example, resolution, frame rate, binning configurations, frame duration, exposure time, and gain. The process further includes identifying the registers to set based on the desired specifications. The process includes setting the correct register 504 using a software tool installed on the controller 104 and/or the MCU 122 to write the desired values to the identified registers. The register values depend on the specifications of the image sensor and the desired image quality.

The specifications for the image sensor are adjusted continuously and in real-time based on a feedback loop processed by the controller 104. For example, if the controller 104 determines that data frames are underexposed (i.e., the pixel array 125 did not accumulate enough EMR), then the controller 104 may determine the exposure duration (i.e., blanking period) should be lengthened and/or the gain should be increased in future data frames. Further for example, if the controller 104 determines that data frames exceed a threshold degree of noise, have dynamic range outside a threshold range, or have significant color inaccuracy, then the controller 104 may adjust the image sensor 124 specifications for future data frames, and thus, the data provider 502 will adapt the register values based on these updated specifications.

The controller 104 synchronizes the variable pulse cycle of the emitter 102 with the sensor cycle of the image sensor 124. This includes determining the frame rate for the image sensor 124, the pulsing durations for the emitter 102, which EMR sources will be actuated by the emitter 102 and in which order, the blanking period durations and readout period durations for the image sensor 124, whether the image sensor must be binned, whether specifications for the image sensor should be adapted based on the type of EMR pulsed by the emitter 102, and so forth. The controller 104 continuously calculates and fine-tunes the register values for the image sensor 124 in real-time based on the pulsing sequence of the emitter 102 and the capabilities of the image sensor 124. The image sensor 124 receives updated register values from the data provider 502 on a per-frame basis such that the image sensor 124 could operate with different specifications for each data frame.

The image sensor 124 may provide data frames 506a to the frame buffer 508 at irregular intervals depending on the configurations of the sensor cycle and pulse cycle. The total frame duration (i.e., the combination of one blanking period and one readout period) may vary from frame to frame, and thus, the image sensor 124 may output data frames at irregular intervals. Additionally, the image sensor 124 may be constructed to bin the pixel array 125 for some data frames and then read out the entire pixel array 125 for other data frames, and this can cause the image sensor 124 to output data frames 506a to the frame buffer 508 at irregular intervals.

The frame buffer 508 receives the data frames output by the image sensor 124 and provides those data frames 506b to the controller 104 at regular intervals. Thus, data frames may be output by the image sensor 124 at irregular intervals but still provided to the controller 104 for processing at regular intervals.

FIG. 6 is a block diagram of example specifications 600 for adjusting image sensor 124 register values based on a corresponding emission by the emitter 102. The controller (may include components of the controller 104 or the MCU 122) selects operational cycles for the emitter 102 and the image sensor 124 based on relative "strengths" of the different EMR sources actuated by the emitter 102 and/or based on the pixel array's 125 natural variation in sensitivity to different wavebands of EMR. In some cases, a visible EMR source is considered "stronger" based on inherent qualities of a pixel array, e.g., if a pixel array is inherently more sensitive to detecting EMR emitted by a white light source, then the white light source is classified as "stronger" when compared with some "advanced" EMR sources (i.e., EMR sources selected for fluorescence, multispectral, or laser mapping visualization). Further, if the pixel array is inherently less sensitive to detecting EMR emitted by an advanced EMR source, then the advanced EMR source may be classified as "weaker" when compared with the white light source (or other visible EMR source). It should be understood that different image sensors produced by different manufacturers, or produced with different specifications, may have different inherent sensitivities to different partitions of the electromagnetic spectrum. Thus, the relative "weaker" and "stronger" classifications for diverse sources of EMR may vary depending on the specifications of the image sensor being used. Additionally, a "stronger" EMR source may have a higher amplitude, greater brightness, or higher energy output when compared with a "weaker" EMR source.

The controller may adjust the pulse cycle of the emitter 102 in real-time based on the relative strengths of different EMR sources and further based on the exposure levels of resultant data frames. Additionally, the controller may adjust the specifications for the image sensor 124 on a per-frame basis to correspond with the pulse cycle of the emitter 102.

In an example implementation, a user requests color imaging and fluorescence imaging. The controller determines the near infrared fluorescence excitation source is relatively weak when compared with the white light source. The fluorescence source may be relatively weak based on inherent characteristics of the pixel array.

For example, the pixel array may be less sensitive to detecting the near infrared EMR emitted by the emitter, or the fluorescence relaxation wavelength emitted by a fluorescing tissue or reagent within a scene. Additionally, the fluorescence source may be relatively weak because the fluorescence emission comprises a lower amplitude, lower brightness, lower intensity, and/or lower energy output when compared with the white light source. In response to determining the fluorescence source is "weak" compared with the white light source, the controller may select a synchronized cycle that extends the illumination time for the fluorescence source. Additionally, the controller may adjust the register values for the image sensor 124 on a per-frame basis to increase the applied gain when the image sensor 124 is sensing or reading out fluorescence imaging data. The controller may adjust and optimize the synchronized cycle in real-time to ensure that all resultant data frames are sufficiently exposed.

FIG. 6 illustrates example responses to compensate for varying intensities in the EMR sources, and further for compensating for the pixel array's 125 inherent varying sensitivities to different wavebands of EMR. For example, if the emitter 102 will pulse low intensity EMR, and the image sensor 124 has low sensitivity to that EMR, then the controller 104 may lengthen the blanking period for the image sensor 124 and/or increase the gain specifications for the image sensor 124. An example of low intensity/low sensitivity EMR is near infrared fluorescence response in a tissue or reagent excited by near infrared EMR.

Further for example, if the emitter 102 will pulse low intensity EMR, and the image sensor 124 is highly sensitive to that EMR, then the controller 104 may instruct the image sensor 124 to operate with a "default" blanking period and/or a "default" gain specification. It should be understood that "default" settings as described herein will be dependent on several factors, including, for example, image sensor 124 manufacturer specifications, desired frame rate, user preferences, and so forth. An example of low intensity/high sensitivity EMR is narrowband visible EMR, which may be selected for multispectral visualization of a scene. Some narrowband EMR is effective for identifying the spectral signatures of certain tissue structures, such as nervous tissue, blood tissue, ureter tissue, cancer tissue, and so forth.

Further for example, if the emitter 102 will pulse high intensity EMR, and the image sensor 124 has low sensitivity to that EMR, then the controller 104 may instruct the image sensor 124 to lengthen the blanking period and/or operate with "default" gain specifications. An example of high intensity/low sensitivity EMR is narrowband near infrared EMR selected for multispectral visualization. Some narrowband EMR is effective for identifying the spectral signatures of certain tissue structures, such as nervous tissue, blood tissue, ureter tissue, cancer tissue, and so forth.

Further for example, if the emitter 102 will pulse high intensity EMR, and the image sensor 124 is highly sensitive to that EMR, then the controller 104 may instruct the image sensor 124 to operate with a shortened blanking period and/or with a moderately increased gain specification. An example of high intensity/high sensitivity EMR is broadband visible EMR, and specifically white light.

FIGS. 7-12 are schematic diagrams of example synchronized cycles 700, 800, 900, 1000, 1100, 1200 including a sensor cycle of the image sensor 124 and a pulse cycle of the emitter 102. FIGS. 7-12 depict the sequence of data frames output by the image sensor 124 and the operational cycle of the image sensor 124, including the blanking periods wherein EMR is accumulated by the pixel array 125, and the rolling readout sequences wherein the pixel array 125 is read out. The rolling readout sequences are illustrated by the diagonal lines indicating that the pixel array 125 is read out over time. FIGS. 7-12 further illustrate the pulsing cycle of the emitter 102 and indicate wherein the pulses by the emitter 102 overlap with the blanking periods of the image sensor 124. Finally, FIGS. 7-12 illustrate wherein the gain applied to the image sensor 124 may be adjusted on a per-frame basis dependent on the type of illumination pulsed by the emitter 102.

Figure 7:
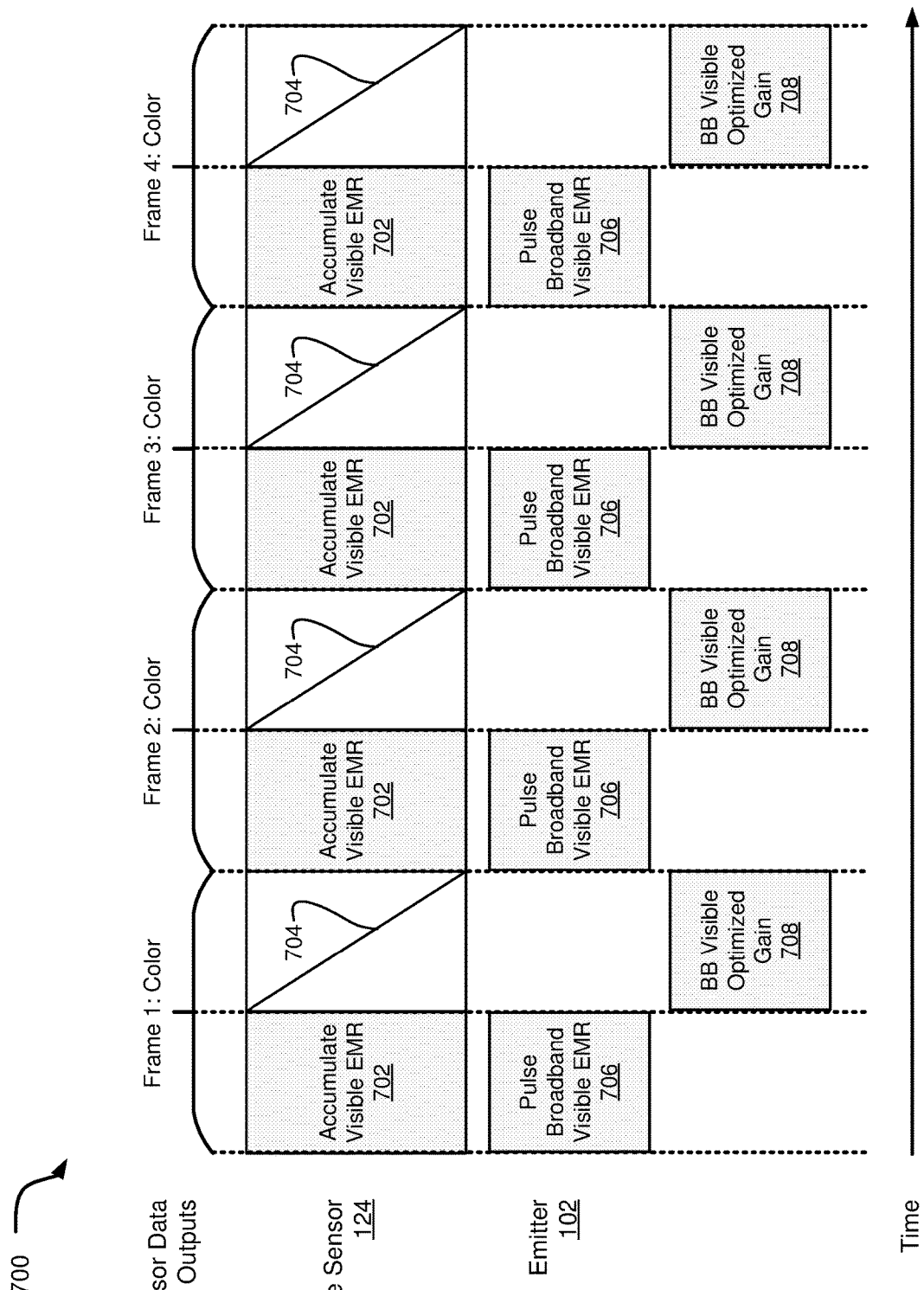
FIG. 7 is a schematic illustration of a synchronized operational cycle of an emitter and an image sensor for outputting a color video stream.
Figure 8:
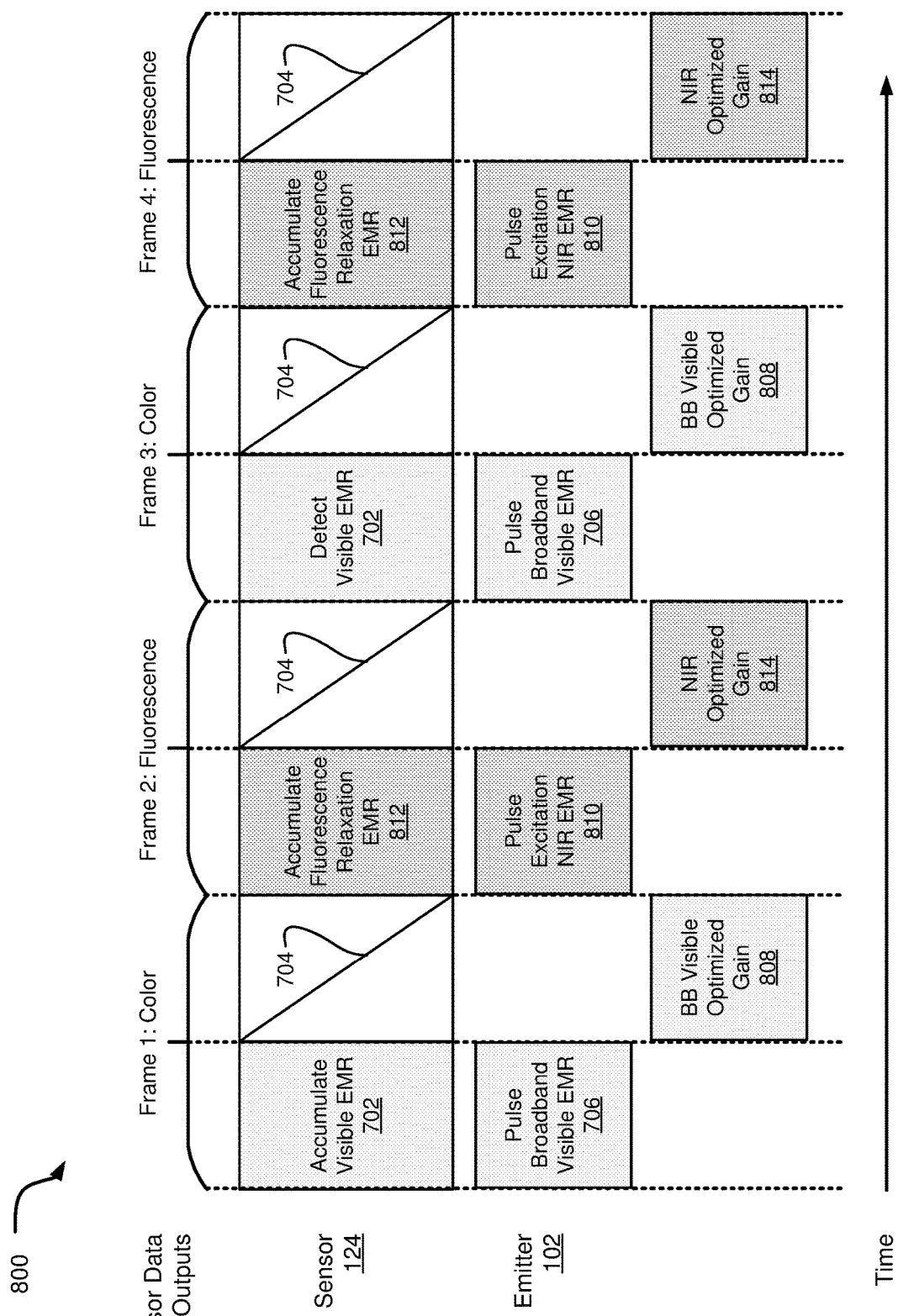
FIG. 8 is a schematic illustration of a synchronized operational cycle of an emitter and an image sensor for outputting a color video stream comprising fluorescence imaging data.
Figure 9:
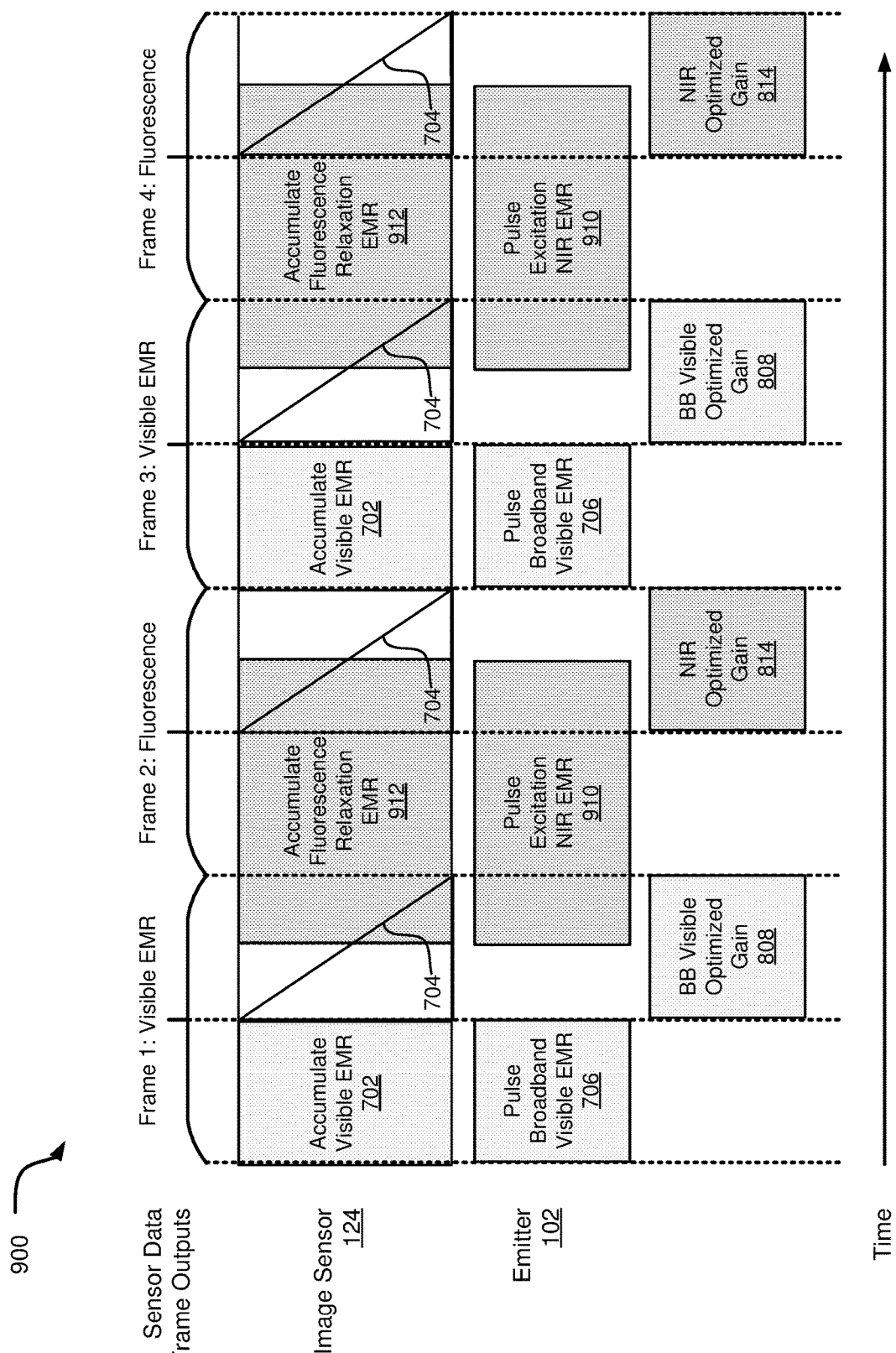
FIG. 9 is a schematic illustration of a synchronized operational cycle of an emitter and an image sensor for outputting a color video stream comprising fluorescence imaging data.
Figure 10:
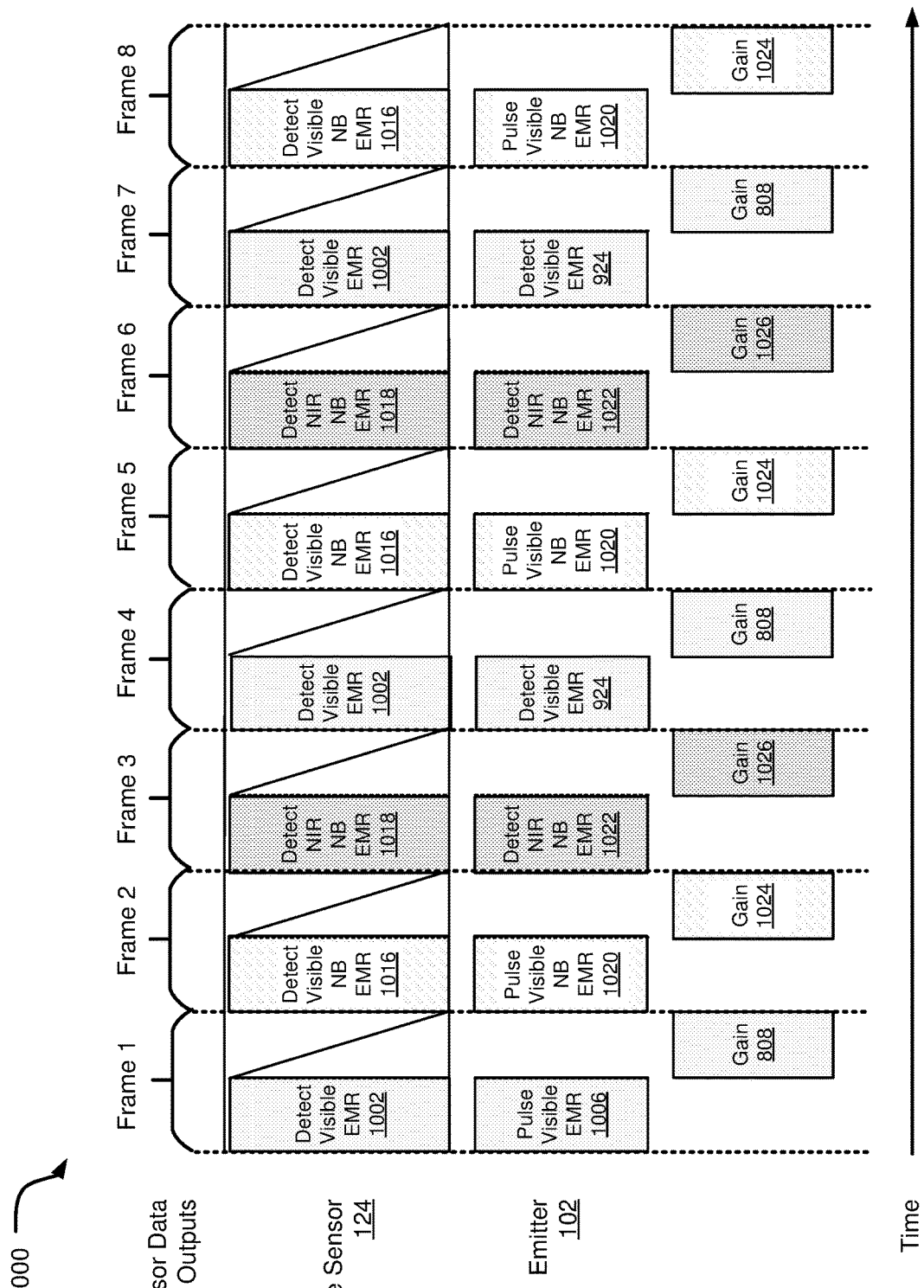
FIG. 10 is a schematic illustration of a synchronized operational cycle of an emitter and an image sensor for outputting a color video stream comprising multispectral imaging data.
Figure 11:
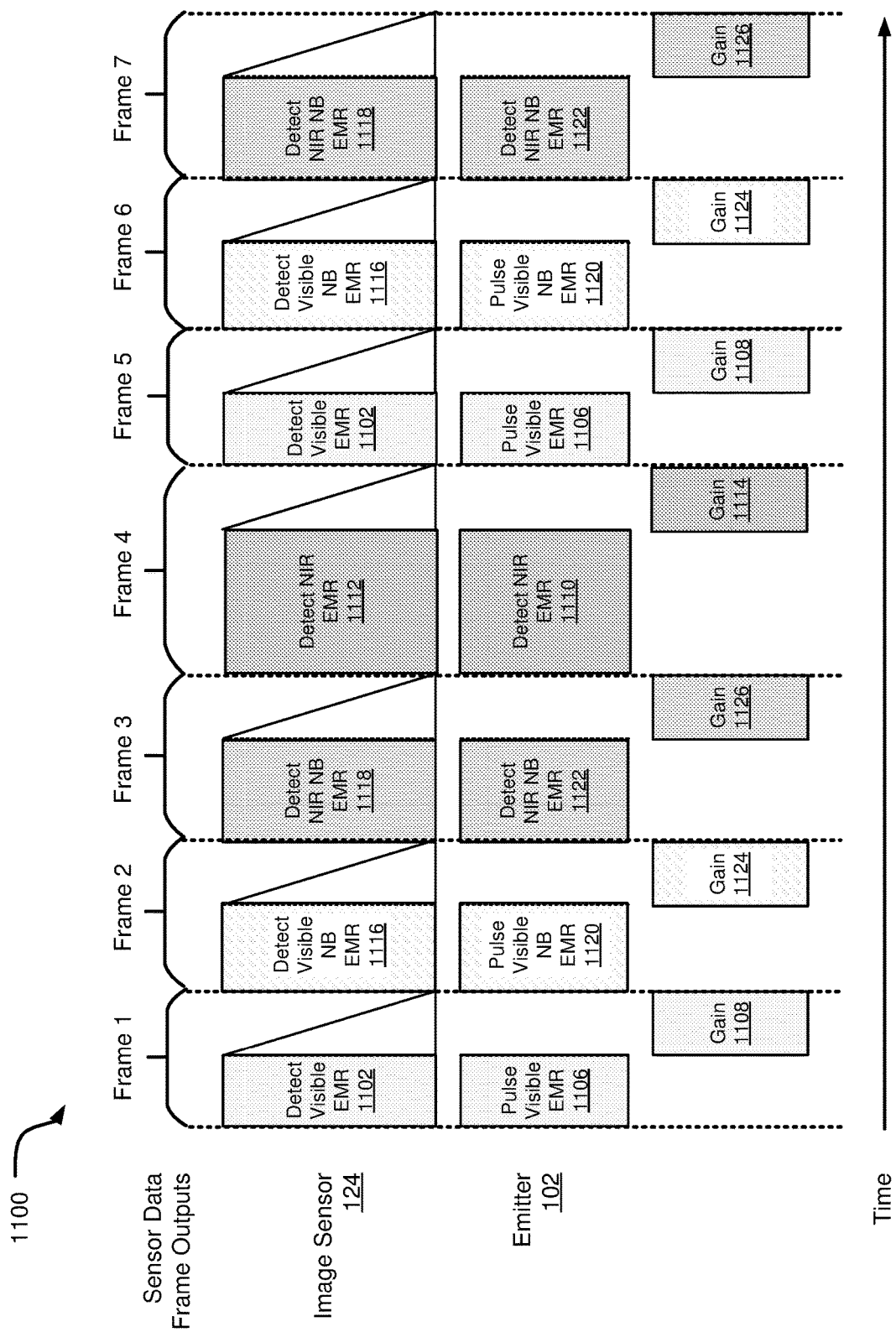
FIG. 11 is a schematic illustration of a synchronized operational cycle of an emitter and an image sensor for outputting a color video stream comprising multispectral imaging data and fluorescence imaging data.
Figure 12:
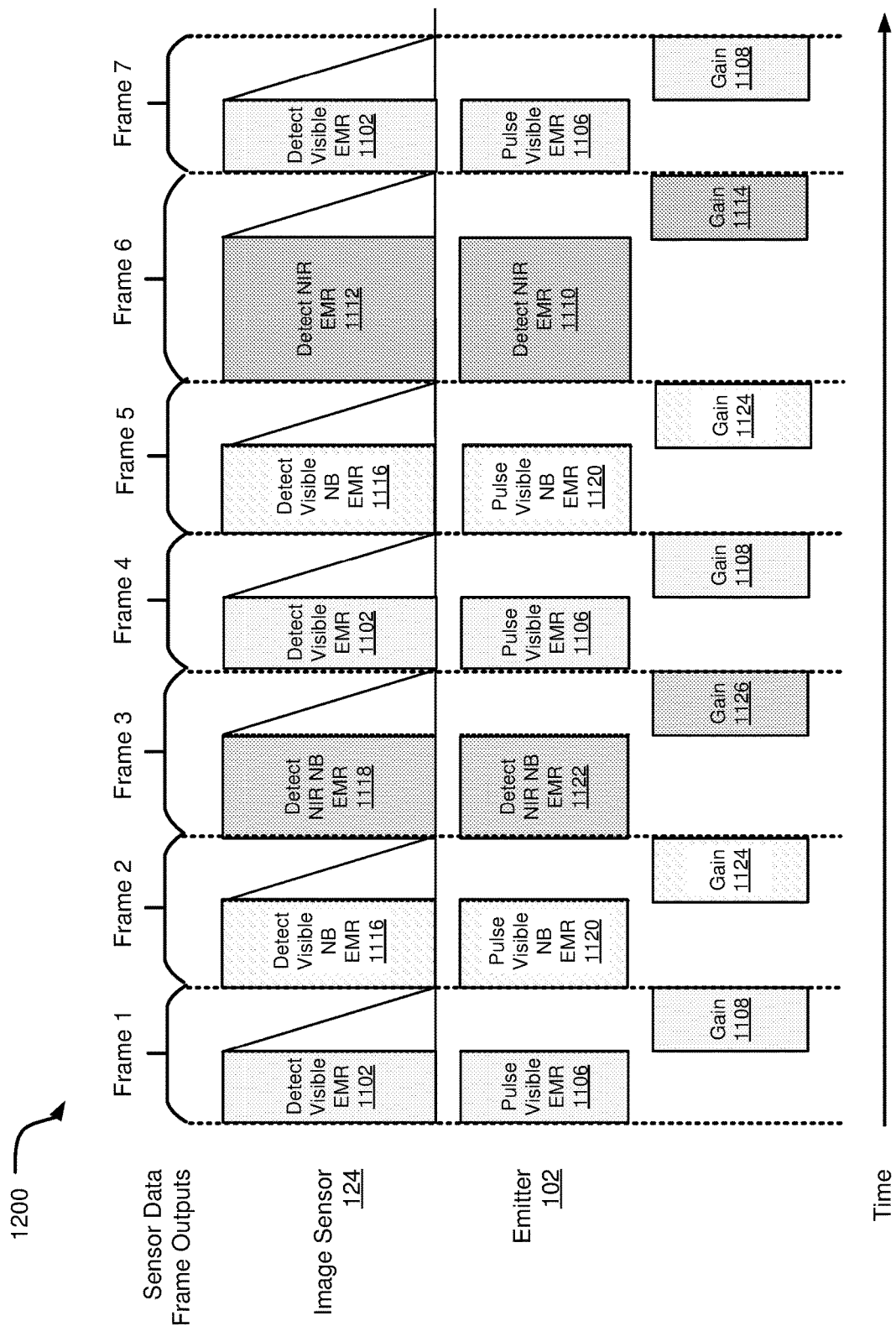
FIG. 12 is a schematic illustration of a synchronized operational cycle of an emitter and an image sensor for outputting a color video stream comprising multispectral imaging data and fluorescence imaging data.

The synchronized cycle 700 depicted in FIG. 7 is implemented for color visualization of a scene only. The synchronized cycle 800 depicted in FIG. 8 is implemented for color and fluorescence visualization of a scene. The synchronized cycle 900 depicted in FIG. 9 is implemented for color and fluorescence visualization of a scene. The synchronized cycle 1000 depicted in FIG. 10 is implemented for color and multispectral visualization of a scene. The synchronized cycle 1100 depicted in FIG. 11 is implemented for color, multispectral, and fluorescence visualization of a scene. The synchronized cycle 1200 depicted in FIG. 12 is implemented for color, multispectral, and fluorescence visualization of a scene.

The variable pulsing cycle is customizable and adjustable in real-time based on user input. The emitter 102 may instruct the individual EMR sources to pulse in any order. Additionally, the emitter 102 may adjust one or more of a duration or an intensity of each pulse of EMR. The variable pulse cycle may be optimized to sufficiently illuminate the light deficient environment 406 such that the resultant data frames read out by the pixel array 125 are within a desired exposure range (i.e., the frames are neither underexposed nor overexposed). The desired exposure range may be determined based on user input, requirements of the image signal processor 140, and/or requirements of a certain image processing algorithm (see 344, 346, 348, and 350 in FIG. 3B). The sufficient illumination of the light deficient environment 406 is dependent on the energy output of the individual EMR sources and is further dependent on the efficiency of the pixel array 125 for sensing different wavebands of EMR.

In a practical example, system 100 is collecting a sequential pattern of data frames consisting of: (i) fluorescence based on excitation light illumination (low intensity EMR, low pixel array sensitivity); (ii) color data based on white light illumination (high intensity EMR, high pixel array sensitivity); (iii) multispectral based on visible narrowband illumination (low intensity EMR, high pixel array sensitivity); and (iv) multispectral based on near infrared narrowband illumination (high intensity, low pixel array sensitivity). The image sensor specifications that are optimized for any of the aforementioned data frames will not be optimal for the other data frames.

Thus, the systems, methods, and devices described herein enable variable sensor settings on a per-frame basis to enable the system 100 to optimize the image sensor specifications for each video frame based on the anticipated illumination and image characteristics. While it is common in cameras for the electronic shutter of a sensor to be varied each frame, this solution involves changing other sensor settings that typically remain constant, specifically: analog gain, pixel binning, and frame duration (and by extension, frame rate). Some of the complexities of implementing variable sensor settings include reprogramming the image sensor each frame to desired settings, managing the data transmission in an irregular pattern, and sending the data through an image signal processing pipeline at regular intervals. The systems and methods described herein write the correct register values to the image sensor to adjust every single frame on a per-frame basis, as needed. Additionally, the systems and methods described herein implement the frame buffer 508 between the image sensor 124 and the image signal processing pipeline (see controller 104, including image processing 116 and image processing 120) to collect data at an irregular rate and release data at a regular rate.

In a practical example, the system 100 changes the image sensor specifications to optimize the image characteristics of each data frame collected. Because the system is collecting four diverse types of data frames, the system 100 sets the frame rate to 70 frames-per-second (fps) to avoid latency on any of the video modalities. This will result in an average frame rate of 14.3 ms rather than the more common 16.7 ms to support 60 fps. The system 100 further determines the optimal settings for each of the data frames based on an analysis of previously collected data frames. The controller 104 instructs the MCU 122 to reprogram the image sensor 124 before each data frame by rewriting correct register values to the image sensor 124 prior to each data frame.

By way of example, the controller 104 determines that the frame period for fluorescence data frames (sensed in response to the emitter 102 pulsing near infrared EMR) should be 20 ms, and the image sensor gain specification should be set to 12. The controller 104 determines that the frame period for color data frames (sensed in response to the emitter 102 pulsing white light) should be 10 ms, and the image sensor gain specification should be set to 6. The controller 104 determines that the frame period for the visible multispectral data frames (sensed in response to the emitter 102 pulsing visible narrowband EMR) should be 12 ms, and the image sensor gain specification should be set to 1. The controller 104 determines that the near infrared multispectral data frames (sensed in response to the emitter 102 pulsing near infrared narrowband EMR) should be 15.2 ms, and the gain should be set to 1. The aforementioned frame period durations would with a 70 fps frame rate for capturing each of the four imaging modalities. It should be understood that the image sensor gain specifications are mostly arbitrary, and the numbers are presented herein for illustrative purposes only.

The controller 104 optimizes the system performance for all video imaging modalities. Additionally, the image sensor 124 specifications are dynamically adjusted in real-time based on a feedback loop comprising previously captured data frames. For example, if the controller 104 determines that previously captured multispectral data frames are underexposed and/or cannot be successfully processed by the spectral processing 346 algorithm, then the controller 104 will automatically increase the gain on subsequent multispectral data frames and/or increase a duration of time the pixel array accumulates EMR for the multispectral data frames. The controller 104 has the ability to program more complex changes to the image sensor 124 for each data frame, and the controller 104 can analyze and determine the specifications needed for each type of illumination.

FIG. 7 is a schematic illustration of a synchronized cycle 700 for an image sensor 124 and an emitter 102, wherein the system outputs only a color video stream with no advanced imaging modalities (i.e., none of fluorescence, multispectral, or laser mapping imaging data). The image sensor 124 accumulates visible EMR 702 during its readout periods and executes a rolling readout 704 of the pixel array 125 during its blanking periods. The emitter 102 pulses broadband visible EMR 706 during the image sensor's 124 blanking periods and then cycles off during the readout periods. The gain 708 values on the image sensor 124 are optimized for color visualization and will be dependent on several factors, including, for example, the brightness of the emitter 102, the duration of the blanking periods, the pixel array's 125 natural sensitivity to the pulse of broadband visible EMR 706, and so forth. The gain 708 may remain constant, but in most cases, the gain 708 will be finetuned and optimized over time based on a feedback loop that adjusts image sensor 124 specifications based on previously output data frames.

In practical terms, the applied gain of the image sensor 124 is a means of amplifying the image sensor's 124 collection of light. In more technical terms, the applied gain in a digital image sensor represents the relationship between the number of electrons acquired on the image sensor 124 and the analog-to-digital units (ADUs) that are generated, representing the image signal. Increasing the applied gain amplifies the signal by increasing the ratio of ADUs to electrons acquired on the pixel array 125. The result is that increasing applied gain increases the apparent brightness of an image at a given blanking period duration.

FIGS. 8 and 9 are schematic illustrations of synchronized cycles 800, 900 for an image sensor 124 and an emitter 102, wherein the system outputs a color video stream that further comprises fluorescence imaging data. In the examples illustrated in FIGS. 8 and 9, the emitter 102 cycles a broadband light source (likely white light) and a fluorescence excitation source (typically near infrared EMR but may vary depending on the implementation) at a 1:1 ratio. This ratio may be adjusted such that the synchronized cycle 800 outputs more color data frames 205 or fluorescence data frames 209.

In the example illustrated in FIG. 8, the total frame duration (i.e., the summation of one blanking period and one readout period) remains constant. The emitter 102 emits the pulses of broadband visible EMR 706 and the pulses of near infrared EMR 810 for the same durations of time. Thus, in the synchronized cycle 800, the pixel array 125 accumulates the pulses of broadband visible EMR 706 for an equal duration that it accumulates the pulses of near infrared EMR 810. In many cases, the near infrared EMR 810 may be less intense than the broadband visible EMR 706. Additionally, most traditional pixel arrays 125 are less sensitive to EMR within the near infrared range when compared with white light. Thus, the controller 104 may adjust image sensor 124 registry values on a per-frame basis such that the broadband visible optimized gain 808 is different from the near infrared optimized gain 814. In most cases, the controller 104 will cause the image sensor 124 to increase its gain prior to accumulating the pulses of near infrared EMR 810 and reading out the fluorescence data frames 209.

In the synchronized cycle 900, the controller 104 instructs the emitter 102 to pulse the near infrared EMR 910 for a longer duration than it pulses the broadband visible EMR 706. As shown in FIG. 9, the pulses of the near infrared EMR 910 overlap the readout period for the preceding color data frame 205 and the readout period for the corresponding fluorescence data frame 209.

In the synchronized cycle 900, the emitter 102 pulses the near infrared EMR 910 for a longer duration to enable the pixel array 125 to accumulate the near infrared EMR 910 for a longer duration of time. This seeks to compensate for the brightness disparity between the broadband visible EMR 706 and the near infrared EMR 910 to ensure that each of the color data frames and the advanced data frames comprise sufficient data. The synchronized cycle 900 enables the pixel array 125 to accumulate the near infrared EMR 910 for a longer duration of time. This may be important if the pixel array 125 is inherently inefficient at accumulating the near infrared EMR 910 and/or if the near infrared EMR 910 is relatively dim when compared with the broadband visible EMR 706.

In the synchronized cycle 900, the color data frames are partially exposed to the near infrared EMR 910 where the data frames overlap. Thus, the resulting color data frames include the sum of the accumulated energy from the broadband visible EMR 706 and some of the near infrared EMR 910. However, this "overflow" of near infrared EMR 910 into the color data frame 603 does not impact integrity of the final overlay for several reasons. Namely, the near infrared EMR 910 signal is typically very weak when compared with the broadband visible EMR 706, and thus its contribution in the color data frame 603 is negligible in most cases. Additionally, where the near infrared EMR 910 signal is high or comparable to the broadband visible EMR 706 signal, the effect is masked by an overlay display when the color data frame 603 and the advanced data frame 605 are combined. Additionally, the two components (i.e., the reflectance signal from the broadband visible EMR 706 and the signal from the near infrared EMR 910) may be separated with additional image processing.

In both synchronized cycles 800, 900, the controller optimizes the applied gain settings for the image sensor 124 on a per-frame basis. Thus, the image sensor 124 reads out the color data frames 205 with an applied gain that is optimized for broadband visible illumination 808. Further, the image sensor 124 reads out fluorescence data frames 209 with an applied gain that is optimized for near infrared illumination 814. In most cases, the near infrared optimized gain 814 is higher than the broadband visible optimized gain 808. Thus, the image sensor 124 adjusts gain settings on a per-frame basis to compensate for relative intensities between the EMR sources, and further to compensate for the pixel array's 125 natural varying sensitivities to accumulate different wavebands of EMR.

The synchronized cycle 800 may result in the "cleanest" data frames, wherein all pixels within the pixel array 125 are exposed to EMR for the same duration of time, because the pixel array 125 accumulates EMR only during the blanking periods. The resultant data frames may be free from image artifacts resulting from some pixels accumulating EMR for a longer duration of time than other pixels. However, the synchronized cycle 800 may be insufficient if the pixel array 125 cannot accumulate sufficient advanced EMR during the blanking period. The synchronized cycle 800 leaves much of the image sensor's available exposure time unused.

FIG. 10 is a schematic diagram of a synchronized cycle 1000 for color and multispectral visualization. In the synchronized cycle 1000, the emitter 102 actuates at least three different EMR sources to pulse visible EMR 1006 (in most cases, this is broadband white light), visible narrowband EMR 1020, and near infrared narrowband EMR 1022. As shown in FIG. 10, the image sensor 124 may operate with different gain settings for each frame type, such that the image sensor 124 applies a gain 808 optimized for visible EMR 1006, a gain 1024 optimized for visible narrowband EMB 1020, and a gain 1026 optimized for near infrared narrowband 1022 depending on which type of EMR is being pulsed by the emitter 102. The gain settings for the image sensor 124 may be adjusted on a per-frame basis to correspond with the EMR being pulsed by the emitter 102.

FIGS. 11 and 12 are schematic illustrations of example synchronized cycles 1100, 1200 for color, multispectral, and fluorescence visualization. The synchronized cycles 1100, 1200 may be implemented when a user has selected four different imaging modalities, namely, white light video, multispectral imaging based on narrowband EMR within the visible range, multispectral imaging based on narrowband EMR within the near infrared range, and fluorescence imaging based on near infrared excitation EMR. Data representing each of the four imaging modalities may be displayed to the user simultaneously, but as shown in FIGS. 11-12, the data for the four separate imaging modalities is actually collected separately. In most cases, the user selects multiple tissue types to be highlighted within the scene. The controller 104 determines that the emitter 102 must pulse for each of the four imaging modalities to receive sufficient information for highlighting all selected tissue types. The resultant video stream outputs a high-definition color video stream that includes one or more false color overlays highlighting the locations and boundaries of the selected tissue types. The required frame rate for each of the imaging modalities will depend on how frequently that data must be captured to ensure accuracy in the output video stream.

As shown in FIGS. 11 and 12, the controller 102 can alter the blanking periods of the image sensor 124 on a per-frame basis to allow for longer exposure times and may additionally alter the applied gain on a per-frame basis to compensate for varying EMR intensity and the pixel array's varying sensitivities.

The controller 102 and/or MCU 122 adjusts the applied gain for the image sensor 124 on a per-frame basis by adjusting register values for the image sensor 124 prior to each frame period. In the examples shown in FIGS. 11 and 12, the image sensor 124 applies a gain 1108 optimized for capturing color imaging data in response to the emitter 102 pulsing visible EMR 1106; a gain 1124 optimized for capturing multispectral imaging data in response to the emitter 102 pulsing visible narrowband EMB 1120 selected for eliciting a spectral response from a tissue; a gain 1126 optimized for capturing multispectral imaging data in response to the emitter 102 pulsing near infrared narrowband EMR 1122 selected for eliciting a spectral response from a tissue; and a gain 1114 optimized for capturing fluorescence imaging data in response to the emitter 102 pulsing near infrared EMR 1110 selected for fluorescing a reagent.

As shown in FIGS. 11 and 12, the ordering for the four imaging modalities may be adjusted depending on how frequently each data type must be collected to output an accurate video stream to the user. Typically, the color data frames (broadband visible EMR 1106) is output at a rate of at least 30 fps. The other imaging modalities, including fluorescence, visible multispectral, and near infrared multispectral, may be output at less frequent rates.

Figure 13:
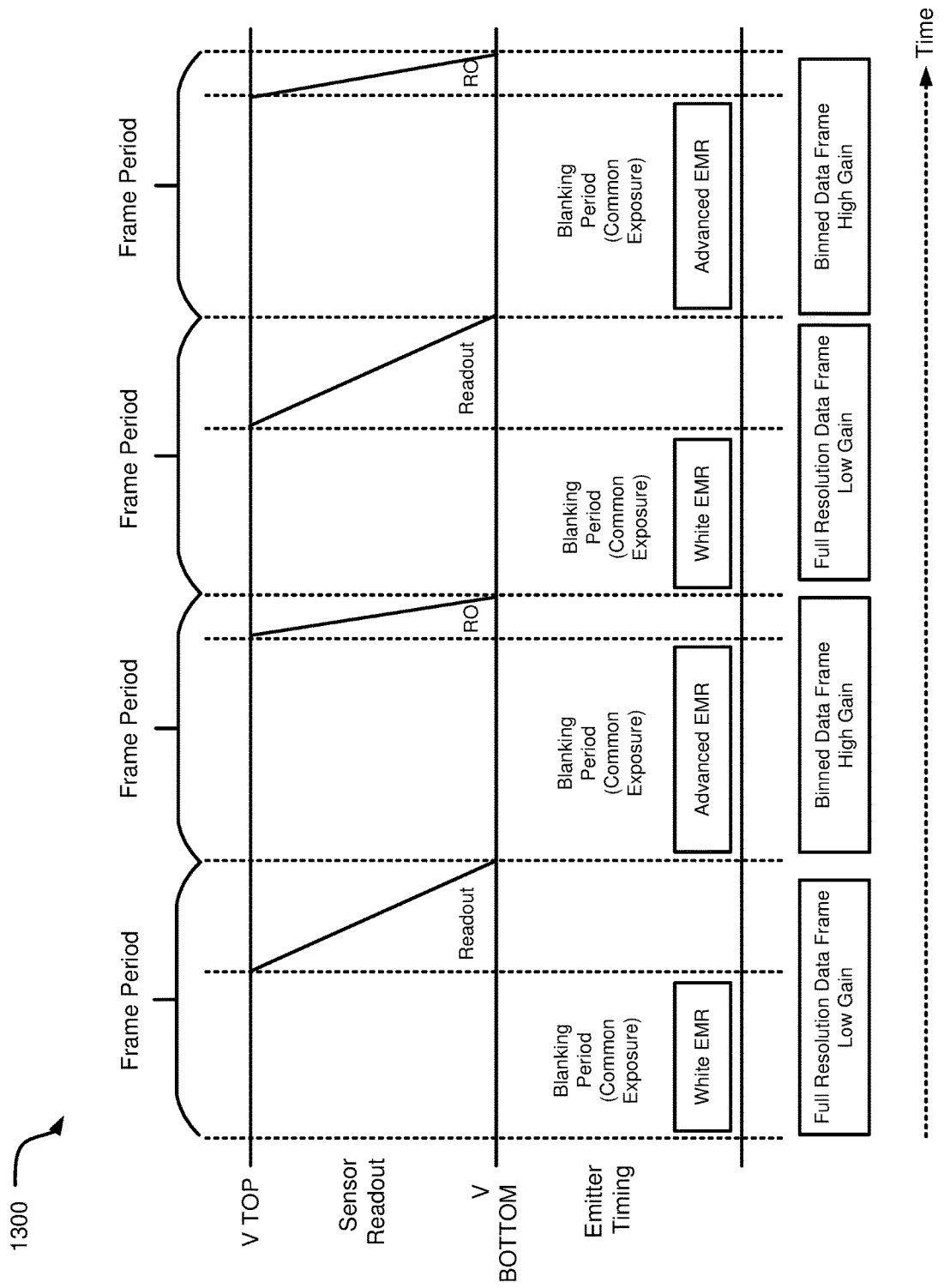
FIG. 13 is a schematic illustration of a synchronized operational cycle of an emitter and an image sensor for outputting a color video stream and advanced imaging data, wherein the image sensor bins the pixel array when reading out advanced data frames but does not bin the pixel array when reading out color data frames.

FIG. 13 illustrates a schematic diagram of an example synchronized cycle 1300 for the image sensor 124 and the emitter 102. The synchronized cycle 1300 may specifically be implemented when a user requests a color video stream and one or more types of advanced visualization at the same time. The user may request a display of a real-time color video stream that comprises additional information obtained through one or more of multispectral visualization, fluorescence visualization, topographical mapping, or anatomical measurement. The advanced visualization data may be processed by one or more algorithms, such as the algorithms 346, 348, 350 discussed in connection with FIG. 3B.

The controller 104 optimizes the pulse cycle of the emitter 102 and the sensor cycle of the image sensor 124 based on user input, pulse type (e.g., white light, multispectral waveband, fluorescence waveband, or EMR split into a mapping pattern), desired exposure of resultant data frames, desired frame rate, and acceptable resolution of resultant data frames. In some cases, the durations of the blanking periods/pulsing periods are adjusted on a per-frame basis while the durations of the readout periods/dark periods remain constant, such that the total frame period duration is adjustable on a per-frame basis. In other cases, the durations of the readout periods/dark periods are adjusted on a per-frame basis through pixel binning, and the durations of the blanking periods/pulsing periods are adjusted a corresponding amount to maximize the time the pixel array accumulates EMR without adjusting the total frame period duration on a per-frame basis (see, e.g., FIG. 13). In other cases, the durations of the readout periods/dark periods and the durations of the blanking periods/pulsing periods are adjusted on a per-frame basis without ensuring that the total frame period duration remains constant from frame to frame (see, e.g., FIGS. 11-12).

In most cases, it is desirable to ensure the user receives a high-definition color video stream depicting a scene. And in these cases, the controller 104 may ensure the image sensor 124 does not bin the pixel array 125 when reading out color data frames 205. However, the advanced visualization algorithms 346, 348, 350 may be successful with a lower resolution data input. Because the algorithms 346, 348, 350 may accept lower resolution than a user viewing a high-definition color video stream, it may be desirable to reduce the total readout time by binning the pixel array 125 when sensing a multispectral data frame 207, a fluorescence data frame 209, or a mapping data frame 211.

The systems, methods, and devices described herein interlace a color video data stream with one or more advanced visualization data streams. Each of these data streams may be sensed by a single image sensor 124 or multiple image sensors 124 acting in concert. The image sensor 124 is designed to process data frames at a constant and repetitive frame rate. For example, the image sensor 124 may be tuned to process data frames at a rate of 60 fps, or one frame every 16.67 ms. The color video stream requires 24-30 fps of white light video to ensure a medical practitioner receives a smooth and high-definition video stream. This leaves finite time for additional advanced visualization modalities. In some cases, the standard 16.67 ms frame period duration is too short for the pixel array 125 to accumulate sufficient EMR at certain wavelengths of the electromagnetic spectrum. In other cases, the same 16.67 ms frame period duration may be more than enough time for the pixel array 125 to accumulate sufficient EMR at other wavelengths of the electromagnetic spectrum.

A fixed frame period duration is standard operating mode for most video cameras. With a fixed frame period duration, the time required to read out data from the pixel array 125 remains constant and the data transmission timing remains constant. For example, for a 1080p resolution video stream, data from approximately 2 million pixels is offloaded from the image sensor 124 every frame period. In this example, readout period may take 8 ms, and if the total frame period is 16.67 ms, then there is 8.67 ms remaining for the pixel array 125 to accumulate EMR.

In an example, the pixel array 125 requires 14 ms to collect sufficient EMR at a 950 nm wavelength. The controller 104 may optimize and adjust each of the pulsing cycle of the emitter 102 and the sensor cycle of the image sensor 124 to compensate for the pixel array's 125 relative inefficiency at detecting the near infrared EMR. The controller 104 instructs the emitter 102 to pulse the near infrared EMR for 14 ms and instructs the image sensor 124 to account for a 14 ms blanking period duration. The controller 104 additionally instructs the image sensor 124 to bin the pixel array 125 after the emitter 102 pulses the near infrared EMR to reduce the total readout time for the near infrared data frame. The controller 104 may specifically ensure that the frame period corresponding with the near infrared wavelength remains at 16.67 ms total, with 14 ms devoted to the pixel array 125 accumulating EMR, and 2.67 ms devoted to the pixel array 125 reading out a binned data frame.

FIG. 13 illustrates a sensor readout cycle and an emitter timing cycle. The image sensor 124 undergoes a rolling readout, which is illustrated by the diagonal line for the readout (abbreviated RO in some cases in FIG. 13). The emitter 102 alternates pulsing the white EMR and the advanced EMR, which may include multispectral, fluorescence, or mapping emissions as described herein. The image sensor 124 reads out the pixel array 125 without binning in response to the emitter 102 pulsing the white EMR. This results in a full resolution data frame with low gain. The image sensor 124 bins the pixel array in response to the emitter 102 pulsing the advanced EMR. This results in a binned data frame with high gain.

As shown in FIG. 13, the controller 104 optimizes the sensor cycle and the pulsing cycle to ensure the durations of the frame periods remain constant even when the durations of the blanking periods are adjusted on a per-frame basis. The controller 104 compensates for a longer blanking period by reducing a duration of a subsequent readout period by a corresponding amount. The controller 104 reduces the duration of the readout period by instructing the image sensor 124 to read out the pixel array 125 according to a binning configuration. The controller 104 may write correct registers to the image sensor 124 to adjust each frame period as needed.

Pixel binning on a per-frame basis improves overall system performance by changing the resolution of certain data frames to reduce readout time and therefore increase the time available for the pixel array 125 to accumulate EMR. For example, when the approximately 2 million pixels on a pixel array 125 are read out in a 2×2 binning configuration, the pixel array 125 is reduced to 500,000 pixels to be read. The binned readout time is 0.25 the full resolution readout time because the effective number of pixels has been reduced to 0.25. If 2 million pixels can be read out in about 8 ms, then the 500,000 binned pixels can be read out in about 2 ms.

Pixel binning results in a reduced resolution data frame as a direct result of the multiple small pixels being combined into a single large pixel. The reduced resolution data frame is acceptable for some advanced visualization algorithms 346, 348, 350, but might not be acceptable for the high-definition color video stream output to a user. Pixel binning on a per-frame basis enables the system to output high-resolution color data frames to a user and lower resolution binned data frames to advanced visualization algorithms.

FIGS. 14A-14D are schematic illustrations of example pulsing and readout schemes for outputting different combinations of imaging modalities. FIG. 14A is a schematic illustration of an example scheme for outputting a high-definition color video stream only. FIG. 14B is a schematic illustration of an example scheme for outputting a color video stream that additionally includes fluorescence imaging data. FIG. 14C is a schematic illustration of an example scheme for outputting a color video stream that additionally includes multispectral imaging data. FIG. 14D is a schematic illustration of an example scheme for outputting a color video stream that additionally includes fluorescence imaging data and multispectral imaging data.

It should be appreciated that the timings for the example schemes illustrated in FIGS. 14A-14D are mostly arbitrary. These example timings are calculated based on current common image sensor 124 capabilities and further based on users' expectations. It should be understood that these timings can be adjusted to accommodate different user expectations and to capitalize on increased efficiencies and capabilities in image sensor 124 technology.

In FIG. 14A, the system outputs a high-definition color video stream at 60 fps, wherein each frame period last for 16.67 ms. The duration of the readout period is determined by the capabilities and size of the image sensor 124, and in the example illustrated in FIG. 14, the readout period (abbreviated RP) has a duration of 8.0 ms, while the blanking period (abbreviated BP) has a duration of 8.67 ms.

In FIG. 14B, the system outputs a color video stream that additionally includes fluorescence visualization data. Common pixel array 125 are relatively inefficient at accumulating a fluorescence relaxation wavelength, which is required to output a fluorescence data frame. Additionally, the fluorescence relaxation emissions emitted by a tissue or reagent are relatively weak when compared with other emissions, such as the reflection of broadband visible light emitted into a scene. Thus, the system compensates for the relative weakness of the fluorescing imaging data by increasing the duration of blanking period when capturing fluorescence data frames. Thus, the overall frame rate remains 60 fps (like in FIG. 14A), but 11.1 ms is devoted to the color data frames and 22.2 ms is devoted to the fluorescence data frames. The durations of the readout periods remain 8.0 ms because this is controlled by the capabilities of the example image sensor 124. The remaining time within each frame period is devoted to the blanking periods, with the color data frames having a relatively short blanking period of 3.1 ms and the fluorescence data frames having a longer blanking period of 14.2 ms.

In FIG. 14C, the system outputs a color video stream that additionally includes multispectral imaging data that is selected for visualizing certain tissues within a scene. The spectral illumination may include visible EMR within a narrowband selected for eliciting a spectral response and may additionally include near infrared EMR within a narrowband selected for eliciting a spectral response. These two EMR wavebands will result in two different data frame types, as shown in FIG. 14C. Like the example illustrated in FIG. 14B, the frame periods are adjusted on a per-frame basis to compensate for the relative strengths of different wavebands of EMR, and to further compensate for the pixel array's varying efficiencies at detecting different wavebands of EMR. The overall frame rate is 70 fps, but the different frame types are allocated different overall frame durations. In the example illustrated in FIG. 14C, color data frames are allocated 12.0 ms, narrowband visible spectral data frames are allocated 14.0 ms, and narrowband near infrared spectral data frames are allocated 16.9 ms. Again, the durations of the blanking periods are determined by the capabilities of the image sensor 124, and the remaining time within each frame period is allocated to the blanking period.

In FIG. 14D, the system outputs a color video stream that additionally includes fluorescence and multispectral data. The data is captured at an overall frame rate of 70 fps, but different frame types are allocated different overall frame durations. In the example illustrated in FIG. 14D, the pixel array 125 is binned such that the readout periods are only 2.0 ms in duration. The color data frames are allocated 10.0 ms, the narrowband visible spectral data frames are allocated 12.0 ms, the narrowband near infrared spectral data frames are allocated 15.2 ms, and the fluorescence data frames are allocated 20.0 ms as shown.

Figure 15B:
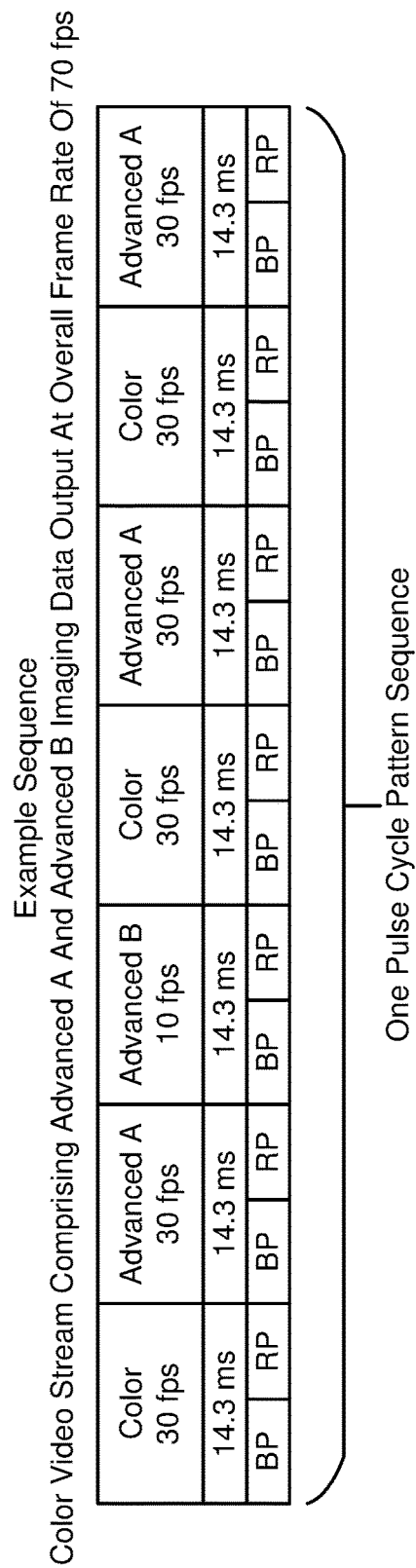
FIG. 15B is a schematic diagram of an example frame cycle sequence for generating a color video stream additionally comprising two advanced imaging modalities.

FIGS. 15A-15C are schematic illustrations of example pulsing and readout sequences for outputting different combinations of imaging modalities. The systems described herein are designed such that users can request different imaging modalities and cause the output video stream to adjust in real-time. Users may request a combination of "advanced" imaging modalities to simultaneously highlight different types of tissue. For example, a user may initially request only a color video stream output. Later, the user may request that one or more tissue types be highlighted with a false color overlay. For example, the user may request that one or more of venous tissue, arterial tissue, ureter tissue, nervous tissue, cancerous tissue, and so forth be highlighted with false color overlays while simultaneously viewing a high-definition color video stream. Additionally, the user may request that dimensional information be supplied in real-time in addition to the color video stream and the one or more false color overlays. The systems described herein will attempt to satisfy all user requests while working within the operational constraints of the image sensor 124 and the emitter 102.

In most implementations, the user will not request a certain imaging modality, such as visible multispectral imaging or near infrared multispectral imaging. The user is more likely to request that certain target tissue types be highlighted in the resultant video stream. The controller 104 cross-references the user's requested target tissue types against a database to determine which wavelengths of EMR should be pulsed to identify the requested target tissue types. Additionally, the user may indicate that a certain reagent has been supplied to the patient, and that the video stream should be updated to highlight the administered reagent. Again, the controller 104 cross-references the reagent type against the database to determine which wavelengths of EMR should be pulsed to fluoresce the administered reagent. Thus, the controller 104 generates the synchronized cycles of the emitter 102 and the image sensor 124 based on what type of information the user wishes to receive.

The minimum required frame rate for the different imaging modalities is determined based on how frequently that type of data must be captured to provide satisfactory performance. This is dependent on several factors, including the level of importance the user assigns to that data type. The system 100 enables a user to indicate that certain amounts of latency are permissible or impermissible for each of the requested imaging modalities. For example, a user may allow latency in a false color overlay highlighting a target tissue type if the user feels confident in the locations of the target tissue type without the assistance of the false color overlay. In this example, the user may benefit from the false color overlay as an added confirmation regarding the location of the target tissue type. However, in other cases, the user may allow virtually no latency in the false color overlay for the target tissue type. In this scenario, the user may find it critical to receive real-time and accurate predictions about where the target tissue type is located in this scene. This might occur if the user is approaching a sensitive region in the patient's body or if the user is attempting to ensure all of the target tissue type has been excised from the body.

The minimum required frame rate is further determined based on the requirements and capabilities of various machine learning algorithms configured to process the advanced imaging data. Some algorithms require a longer processing time and are incapable of processing data at a higher frame rate. Other algorithms output predictions with a lower level of confidence and therefore cannot accept higher latency in the frame rate. Further, the minimum required frame rate is determined based on user preferences. For example, the system 100 may ensure that all color video data streams are output at a frame rate of at least 24 fps, and preferably at 30 fps or more. The system 100 may allow some advanced imaging modalities to be output at a less frequent frame rate, depending on the implementation.

In FIG. 15A, the system outputs a color video stream that additionally includes information from one advanced imaging modality, which is generically referred to as the Advanced A imaging modality for purposes of illustration. The cycle illustrated in FIG. 14A operates at a frame rate of 60 fps, or one frame every 16.67 ms. In this example, the system outputs color frames at a frame rate of 30 fps, and additionally outputs the advanced imaging modality at a frame rate of 30 fps. The cycle alternates between outputting color frames and advanced frames, similar to the synchronized cycles shown in FIGS. 8-9. Thus, in FIG. 15A a single pulse cycle pattern sequence includes one color data frame and one Advanced A data frame. The single iteration of the pulse cycle pattern is 33.34 ms and consists of two separate 16.67 ms frame periods.

In FIG. 15B, the system outputs a color video stream that additionally includes information from two different advanced imaging modalities, namely Advanced A and Advanced B. In this example, the Advanced A imaging modality requires a frame rate of 30 fps, and the Advanced B imaging modality requires a frame rate of only 10 fps. Thus, across the total 70 fps, the system allocates 30 fps to the color data frames, 30 fps to the Advanced A data frames, and 10 fps to the Advanced B data frames. A single iteration of the pulse cycle pattern sequence includes a color data frame, followed by an Advanced A data frame, followed by an Advanced B data frame, followed by a color data frame, followed by an Advanced A data frame, followed by a color data frame, and then followed by an Advanced A data frame. This pulse cycle pattern results in a 3:3:1 frequency ration between the color, Advanced A, and Advanced B data frames. This follows the minimum required frame rate for each of the imaging modalities, namely, a 30 fps frame rate for color, 30 fps frame rate for Advanced A, and a 10 fps frame rate for Advanced B.

In FIG. 15C, the system outputs a color video stream that additionally includes information from three different advanced imaging modalities, namely Advanced A, Advanced B, and Advanced C. The image sensor is cycled at a frame rate of 90 fps, with 30 fps allocated to color data frames, 30 fps allocated to Advanced A data frames, 10 fps allocated to Advanced B data frames, and 20 fps allocated to Advanced C data frames. In the example illustrated in FIG. 15C, a single iteration of the pulse cycle pattern includes a color data frame, followed by an Advanced A data frame, followed by an Advanced C data frame, followed by a color data frame, followed by an Advanced A data frame, followed by an Advanced B data frame, followed by a color data frame, followed by an Advanced A data frame, and followed by an Advanced C data frame. This outputs a 3:3:1:2 ratio between the color, Advanced A, Advanced B, and Advanced C data frames, which is consistent with the frame rates for each of the four imaging modalities.

The example sequences illustrated in FIGS. 15A-15C seek to maintain a high-quality color video stream while additionally interlacing advanced imaging modalities. The required frame rates for the advanced imaging modalities will be determined based on user preference (e.g., the user may indicate a criticality for each imaging modality), the requirements of a machine learning algorithm (see 346, 348, 350), and the requirements for refreshing the advanced imaging data. In some cases, the system 100 must compromise performance either by restricting the user from accessing all imaging modalities simultaneously or operating two or three of the imaging modalities with unwanted latency.

A variable frame based on system efficiencies and use-case requirements can improve overall system performance. Variable frame rates allow the system 100 to increase or decrease the number of frames per second to better match the system needs. The main limitation on maximum sensor frame rate is the readout time of the image sensor 124. An image sensor that reads out the desired pixel array in 8.0 ms, for example, would be limited to capturing 125 fps (1 s divided by 0.008 s). The system 100 requires additional time during each frame period for the blanking period, wherein the pixel array 125 accumulates EMR. The time multiplexed scheme described herein for alternating pulses of different wavelengths prevents light collection during sensor readout. The system 100 thus balances the reduced light collection time against the increased number of frames available for different imaging modalities.

As discussed herein, higher framerates may be achieved by binning the pixel array 125 such that fewer pixels need to be read out. The controller 104 may instruct the image sensor 124 to alternate between binning the pixel array and not binning the pixel array, from frame to frame. The binned readout results in reduced resolution, which is not desirable but may be acceptable if the advantages of the enabled advanced imaging modalities are significant.

In an implementation, the controller 104 dynamically adjusts the frame rate in real-time to optimize performance. In other implementations, which are typically simpler to execute, the controller 104 selects a frame rate such as 50 fps, 60 fps, 70 fps, 80 fps, 90 fps, and so forth.

FIGS. 16A-16B illustrate two implementations for binning a pixel array 125 comprising a color filter array (CFA), and specifically including a version of a Bayer pattern array. FIG. 16A is a schematic illustration of a binned readout 1604 for a traditional Bayer pattern array 1602. FIG. 16B is a schematic illustration of a binned readout 1614 for a quad Bayer pattern array 1612.

Pixel binning is a function of image sensors 124 and generally refers to a process wherein the output from multiple physical pixels is combined into a single output value. An image sensor 124 may execute various binning configurations depending on the desired readout duration and the desired resolution. A binning configuration may combine any number of pixels, but is most commonly blocks, or squares, of pixels. An example binning configuration includes a 2×2 binning configuration wherein four physical pixels are combined into a single output value. Another example is a 3×3 binning configuration wherein nine physical pixels are combined into a single output value. Another example is a 4×4 binning configuration wherein 16 physical pixels are combined into a single output value.

Binning on a monochrome sensor typically combines physical blocks of adjacent pixels. Binning on a color sensor combines pixels that share a common filter, and therefore may not be physically adjacent. FIG. 16A is a schematic illustration of a traditional Bayer pattern array 1602, which includes individual pixels that each include a blue color filter, a green color filter, or a red color filter. The example Bayer pattern array 1602 is an 8×8 square that includes 16 pixels with a blue color filter, 16 pixels with a red color filter, and 32 pixels with a green color filter. It should be understood that a traditional pixel array will have many more pixels than the schematic illustration shown in FIGS. 16A-16B, and a traditional high-definition pixel array may include at least 2 Million pixels.

The Bayer pattern array 1602 may be binned with a 2×2 binning configuration, such that four individual pixels having the same color filter are combined to a single readout. When the example 8×8, 64-pixel Bayer pattern array 1602 is binned according to a 2×2 binning configuration as shown in FIG. 16A, the resulting binned readout 1604 includes a 4×4, 16-pixel data output. The information for the 16 binned pixels in the binned readout 1604 is obtained from the corresponding physical pixels in the Bayer pattern array 1602. For example, the B1, B2, B3, B4 pixel within the binned readout 1604 is combining data outputs from each of the individual B1, B2, B3, and B4 physical pixels within the Bayer pattern array 1602. The binned readout 1604 takes only one-fourth of the time that would be required to read out the entire Bayer pattern array 1602, but the binned readout 1604 only has one-fourth the resolution of the entire Bayer pattern array 1602.

The binned readout 1604 combines pixels having the same color filter, even when those pixels are not adjacent to one another. The output values from individual pixels may be combined in two ways, namely, averaging the individual pixel values or summing the individual pixel values. When averaging the individual pixel values, the average outputs from each of the individual pixels (in the case of FIG. 16A, there are four individual pixel values) is averaged and output as a new binned pixel. For example, if R1=96, R2=96, R3=100, and R4=120, then the red binned pixel ((R1, R2, R3, R4) will equal 103. The benefit of averaging binning is a reduction in overall noise in the binned image. In the example, R4 has a significantly higher value than R1, R2, or R3 due to noise in the specific pixel, and this will be noticeable as a bright spot in the resultant image. The red binned value will be closer to the value of the surrounding pixels and thus will not appear as a bright spot.

When summing the individual pixel values, the outputs from each of the individual pixels (in the case of FIG. 16A, there are four individual pixel values) is summed and output as the new binned pixel. For example, if R1=96, R2=96, R3=100, and R4=120, then the red binned pixel (R1, R2, R3, R4) will equal 412. The benefit of summation binning is an increase in effective sensitivity. In the example, the red binned pixel has a higher output (representing more EMR accumulated) than R1, R2, R3, or R4 individually.

Functionally, binning can be implemented in analog or digital. Analog binning in the pixel readout circuitry of an imaging sensor enables a faster readout of a data frame because the image sensor 124 treats the group of individual pixels as a single pixel. Digital binning occurs after the analog-to-digital conversion and thus the readout time of the video frame is not faster. Digital binning may occur in the digital circuitry of an image sensor 124, system hardware, or system software.

Because binning combines multiples pixels into a single pixel, it results in a smaller output data frame having fewer pixels and a loss of resolution. For example, an input data frame size of 1920×1080 pixels (2,073,600 total pixels) that is binned with a 2×2 binning configuration will output a data frame having a size of 960×540 pixels (518,400 total pixels). The smaller data frame size can be beneficial because it contains less pixel data that must be processed.

However, the optical resolution loss can be greater than the number of pixels would indicate. As seen in FIG. 16A, in the standard Bayer pattern array 1602, the colored filters being binned are not physically adjacent to one another. If the image sensor having a Bayer pattern array 1602 has a pixel pitch of 2 μm, then this will limit the size of an object that can be resolved. The 2×2 binning pixel is represented as a 4 μm pitch, but the individual pixels are spread out in a 3×3 grid. This results in the binned pixel having an effective size of a 6 μm pitch when considering the size of an object that can be resolved. In this example, despite the digital vertical resolution being reduced to one-half the original, the optical vertical resolution is reduced to one-third the original (i.e., from 2 μm pitch to 6 μm pitch).

If binning is an intended operating mode, then the optical resolution may be improved by using an image sensor 124 with a modified quad Bayer pattern array 1612 such as the one shown in FIG. 16B. The quad Bayer pattern array 1612 covers a block of four individual adjacent pixels, and these same pixels are combined during a 2×2 binning operation. This results in a binned readout 1614 data frame with equivalent digital and optical resolution. This principle can be applied to larger blocks of pixels as needed, including a 3×3 Bayer, 4×4 Bayer, and so forth. This filter configuration may specifically be chosen when analog summation binning is the intended use because the binned image approximates the performance of an image sensor 124 with a larger (more sensitive) pixel.

Figure 17A:
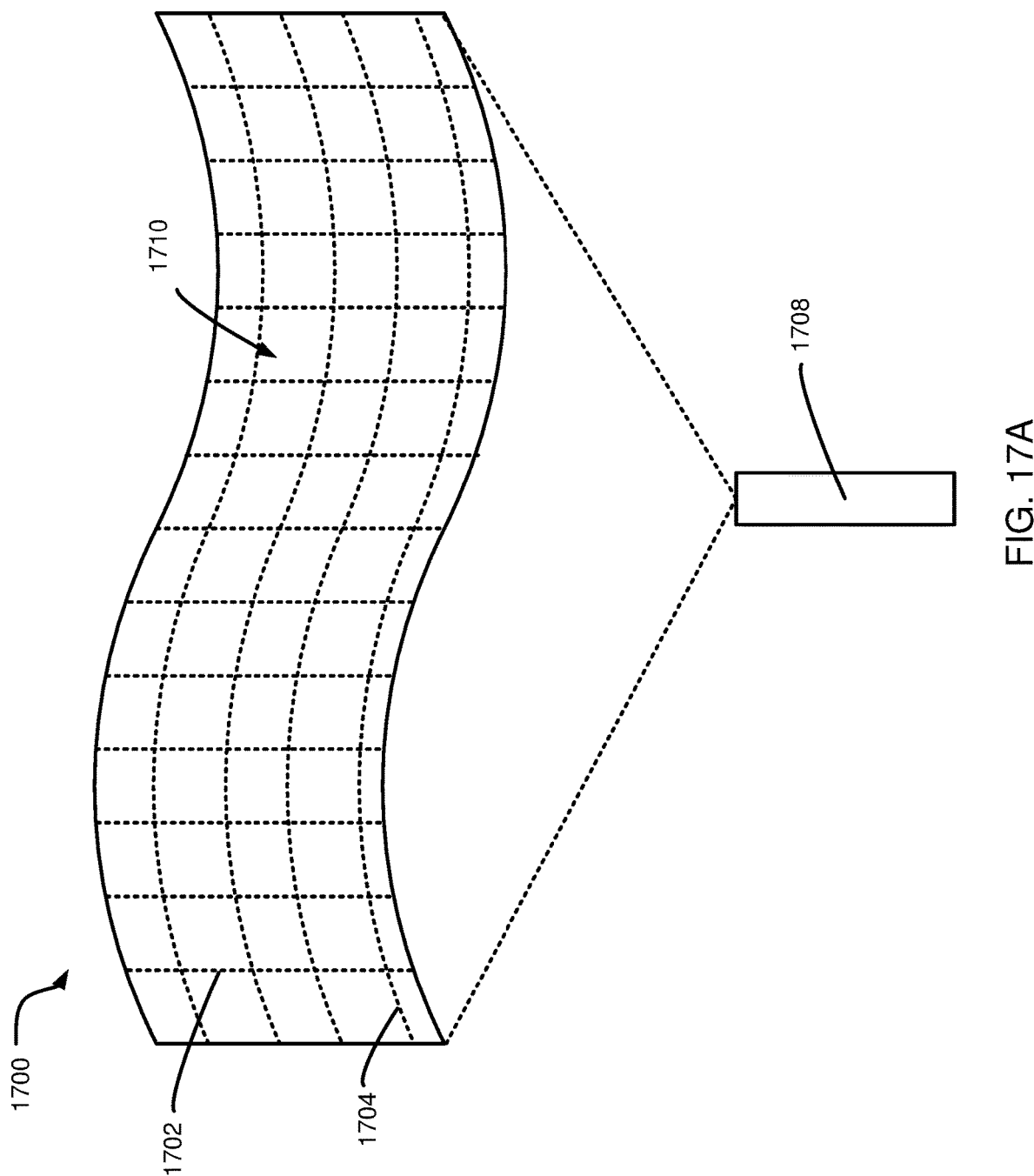
FIG. 17A is a schematic illustration of an example mapping pattern comprising a grid array.
Figure 17B:
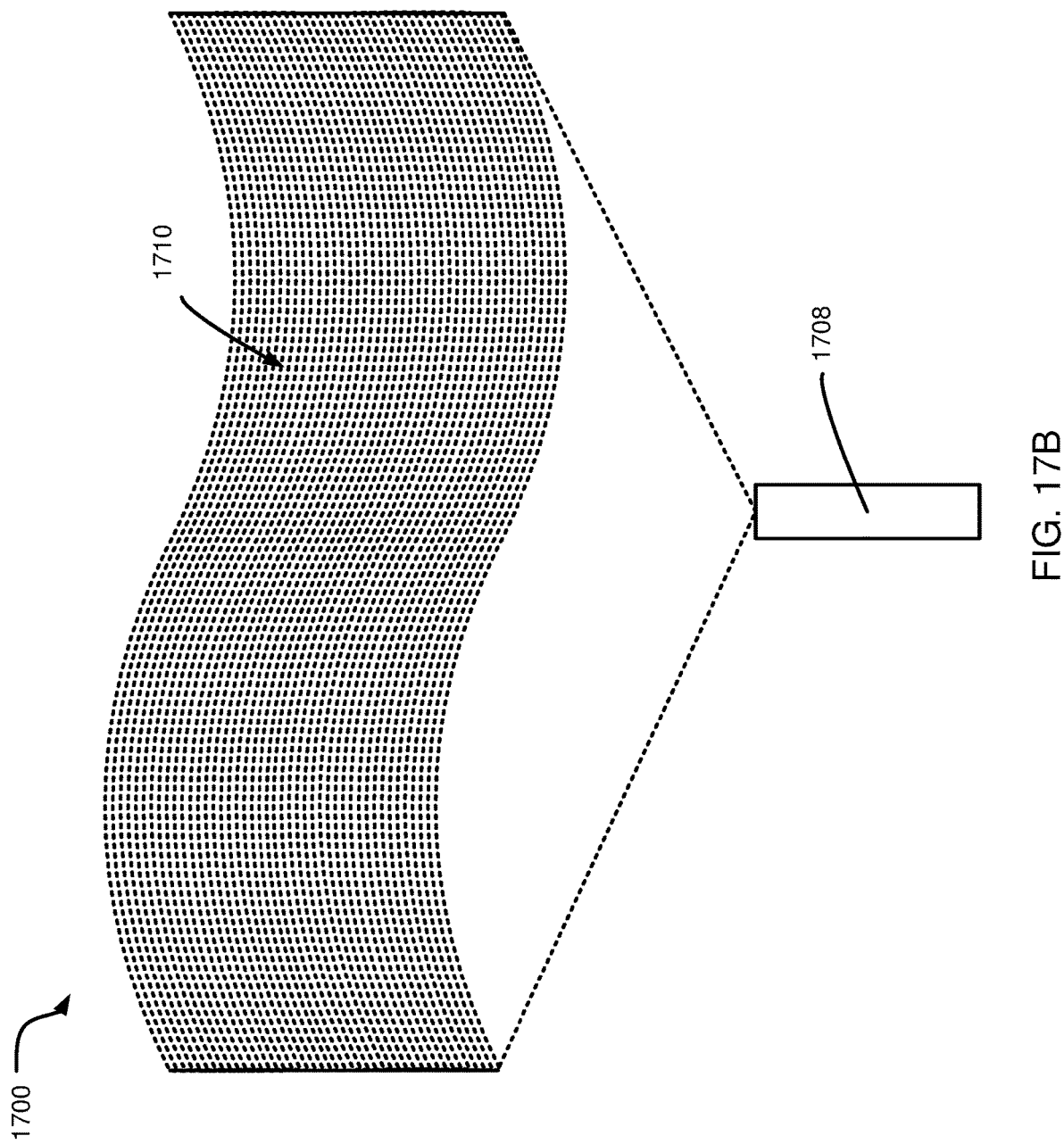
FIG. 17B is a schematic illustration of an example mapping pattern comprising a dot array.

FIGS. 17A and 17B illustrate schematic diagrams of a system 1700 for emitting EMR in a mapping pattern 210. The emitter 102 may pulse the mapping pattern 210 using a low mode laser light that is diffracted to generate the applicable mapping pattern 210. The mapping pattern 210 reflects off tissue in a way that depends on the wavelength of the EMR and the specific anatomical features of the tissue.

The example mapping pattern 210 illustrated in FIG. 17A is a grid array comprising vertical hashing 1702 and horizontal hashing 1704. The example mapping pattern 210 illustrated in FIG. 17B is a dot array. The mapping pattern 210 may include any suitable array for mapping a surface, including, for example, a raster grid of discrete points, an occupancy grid map, a dot array, vertical hashing, horizontal hashing, and so forth. The mapping pattern 210 is emitted by an illumination source 1708, which may originate with an EMR source within the emitter 102 and terminate with an endoscope 110 or tool 108.

As discussed in connection with FIGS. 1A-1C, the distal end of an endoscope 110 may include one or more waveguides 130 that emit EMR that originated at the emitter 102. The mapping pattern 210 may be emitted from these waveguides 130 and projected on to a surface of a tissue. Additionally, one or more tools 108 within a scene may include a waveguide 131 that terminates at a distal end of the tool 108 and/or a side of the tool 108 as shown in FIG. 1A. This waveguide 131 may also emit the mapping pattern 210 on to a surface of a tissue within a scene. In some cases, the tool 108 and the endoscope 110 emit the mapping pattern 210 in concert, and the resultant data frames captured by the image sensor 124 comprise data for tracking the location of the tool 108 within the scene relative to the endoscope 110 or other tools 108.

The emitter 102 may pulse the mapping pattern 210 at any suitable wavelength of EMR, including, for example, ultraviolet light, visible, light, and/or infrared or near infrared light. The surface and/or objects within the environment may be mapped and tracked at very high resolution and with very high accuracy and precision.

The mapping pattern 210 is selected for the desired anatomical measurement scheme, such as three-dimensional topographical mapping, measuring distances and dimensions within a scene, tracking a relative position of a tool 108 within a scene, and so forth. The image sensor 124 detects reflected EMR and outputs a mapping data frame 211 in response to the emitter 102 pulsing the mapping pattern 210. The resultant mapping data frame 211 is provided to a topographical processing 350 algorithm that is trained to calculate one or more of a three-dimensional topographical map of a scene, a distance between two or more objects within the scene, a dimension of an object within the scene, a relative distance between a tool and another object within the scene, and so forth.

The emitter 102 may pulse the mapping pattern 210 at a sufficient speed such that the mapping pattern 210 is not visible to a user. In various implementations, it may be distracting to a user to see the mapping pattern 210 during an endoscopic visualization procedure. In some cases, a rendering of the mapping pattern 210 may be overlaid on a color video stream to provide further context to a user visualizing the scene. The user may further request to view real-time measurements of objects within the scene and real-time proximity alerts when a tool approaches a critical structure such as a blood vessel, nerve fiber, cancer tissue, and so forth. The accuracy of the measurements may be accurate to less than one millimeter.

Figure 18:
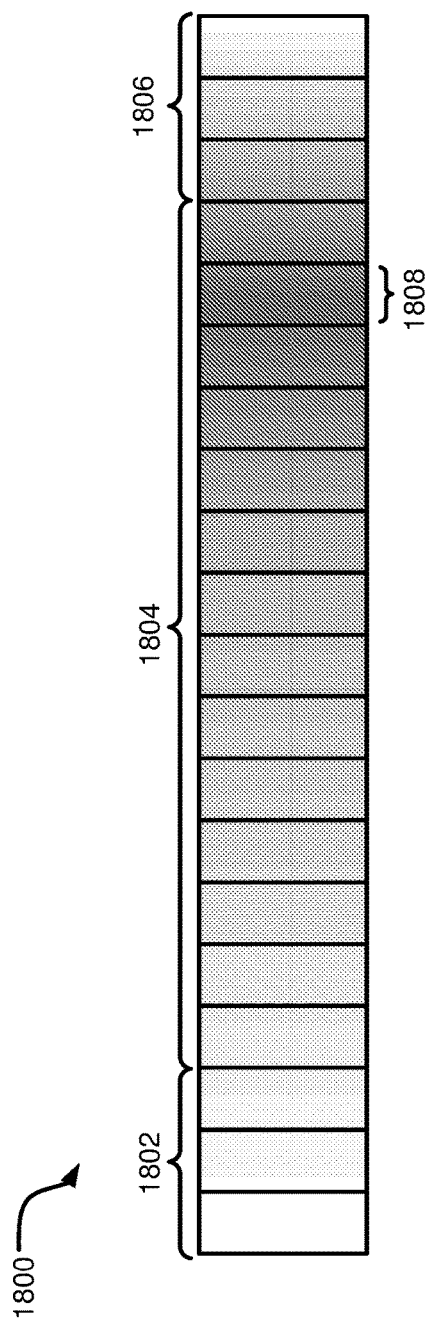
FIG. 18 illustrates a portion of the electromagnetic spectrum divided into a plurality of different wavebands which may be pulsed by sources of electromagnetic radiation of an emitter.

FIG. 18 illustrates a portion of the electromagnetic spectrum 1800 divided into twenty different wavebands. The number of wavebands is illustrative only. In at least one embodiment, the spectrum 1800 may be divided into hundreds of wavebands. The spectrum 1800 may extend from the infrared spectrum 1802, through the visible spectrum 1804, and into the ultraviolet spectrum 1806. Each waveband may be defined by an upper wavelength and a lower wavelength.

Multispectral imaging incudes imaging information from across the electromagnetic spectrum 1800. A multispectral pulse of EMR may include a plurality of sub-pulses spanning one or more portions of the electromagnetic spectrum 1800 or the entirety of the electromagnetic spectrum 1800. A multispectral pulse of EMR may include a single partition of wavelengths of EMR. A resulting multispectral data frame includes information sensed by the pixel array subsequent to a multispectral pulse of EMR. Therefore, a multispectral data frame may include data for any suitable partition of the electromagnetic spectrum 1800 and may include multiple data frames for multiple partitions of the electromagnetic spectrum 1800.

The emitter 102 may include any number of multispectral EMR sources as needed depending on the implementation. In one embodiment, each multispectral EMR source covers a spectrum covering 40 nanometers. For example, one multispectral EMR source may emit EMR within a waveband from 500 nm to 540 nm while another multispectral EMR source may emit EMR within a waveband from 540 nm to 580 nm. In another embodiment, multispectral EMR sources may cover other sizes of wavebands, depending on the types of EMR sources available or the imaging needs. Each multispectral EMR source may cover a different slice of the electromagnetic spectrum 1800 ranging from far infrared, mid infrared, near infrared, visible light, near ultraviolet and/or extreme ultraviolet. In some cases, a plurality of multispectral EMR sources of the same type or wavelength may be included to provide sufficient output power for imaging. The number of multispectral EMR sources needed for a specific waveband may depend on the sensitivity of a pixel array 125 to the waveband and/or the power output capability of EMR sources in that waveband.

The waveband widths and coverage provided by the EMR sources may be selected to provide any desired combination of spectrums. For example, contiguous coverage of a spectrum 1800 using very small waveband widths (e.g., 10 nm or less) may allow for highly selective multispectral and/or fluorescence imaging. The waveband widths allow for selectively emitting the excitation wavelength(s) for one or more particular fluorescent reagents. Additionally, the waveband widths may allow for selectively emitting certain partitions of multispectral EMR for identifying specific structures, chemical processes, tissues, biological processes, and so forth. Because the wavelengths come from EMR sources which can be selectively activated, extreme flexibility for fluorescing one or more specific fluorescent reagents during an examination can be achieved. Additionally, extreme flexibility for identifying one or more objects or processes by way of multispectral imaging can be achieved. Thus, much more fluorescence and/or multispectral information may be achieved in less time and within a single examination which would have required multiple examinations, delays because of the administration of dyes or stains, or the like.

Figure 19:
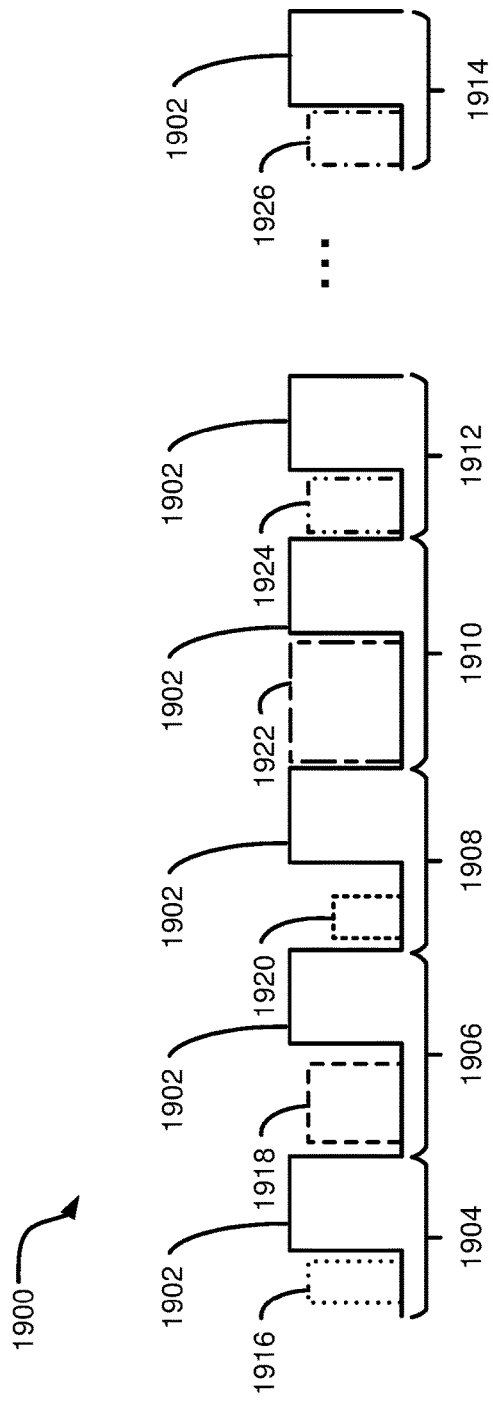
FIG. 19 is a schematic diagram illustrating a timing sequence for emission and readout for generating data frames in response to pulses of electromagnetic radiation.

FIG. 19 is a schematic diagram illustrating a timing diagram 1900 for emission and readout for generating an image. The solid line represents readout (peaks 1902) and blanking periods (valleys) for capturing a series of data frames 1904-1914. The series of data frames 1904-1914 may include a repeating series of data frames which may be used for generating mapping, multispectral, and/or fluorescence data that may be overlaid on an RGB video stream. The series of data frames include a first data frame 1904, a second data frame 1906, a third data frame 1908, a fourth data frame 1910, a fifth data frame 1912, and an Nth data frame 1926.

In one embodiment, each data frame is generated based on at least one pulse of EMR. The pulse of EMR is reflected and detected by the pixel array 125 and then read out in a subsequent readout (1902). Thus, each blanking period and readout results in a data frame for a specific waveband of EMR. For example, the first data frame 1904 may be generated based on a waveband of a first one or more pulses 1916, a second data frame 1906 may be generated based on a waveband of a second one or more pulses 1918, a third data frame 1908 may be generated based on a waveband of a third one or more pulses 1920, a fourth data frame 1910 may be generated based on a waveband of a fourth one or more pulses 1922, a fifth data frame 1912 may be generated based on a waveband of a fifth one or more pulses 1924, and an Nth data frame 1926 may be generated based on a waveband of an Nth one or more pulses 1926.

The pulses 1916-1926 may include energy from a single EMR source or from a combination of two or more EMR sources. For example, the waveband included in a single readout period or within the plurality of data frames 1904-1914 may be selected for a desired examination or detection of a specific tissue or condition. According to one embodiment, one or more pulses may include visible spectrum light for generating an RGB or black and white image while one or more additional pulses are emitted to sense a spectral response to a multispectral wavelength of EMR.

The pulses 1916-1926 are emitted according to a variable pulse cycle determined by the controller 104. For example, pulse 1916 may include a white light, pulse 1918 may include a multispectral waveband, pulse 1920 may include a white light, pulse 1922 may include a fluorescence waveband, pulse 1924 may include white light, and so forth.

The plurality of frames 1904-1914 are shown having varying lengths in readout periods and pulses having different lengths or intensities. The blanking period, pulse length or intensity, or the like may be selected based on the sensitivity of a monochromatic sensor to the specific wavelength, the power output capability of the EMR source(s), and/or the carrying capacity of the waveguide.

In one embodiment, dual image sensors may be used to obtain three-dimensional images or video feeds. A three-dimensional examination may allow for improved understanding of a three-dimensional structure of the examined region as well as a mapping of the different tissue or material types within the region.

In an example implementation, a patient is imaged with an endoscopic imaging system to identify quantitative diagnostic information about the patient's tissue pathology. In the example, the patient is suspected or known to suffer from a disease that can be tracked with multispectral imaging to observe the progression of the disease in the patient's tissue. The endoscopic imaging system pulses white light to generate an RGB video stream of the interior of the patient's body. Additionally, the endoscopic imaging system pulses one or more multispectral wavebands of light that permit the system to "see through" some tissues and generate imaging of the tissue affected by the disease. The endoscopic imaging system senses the reflected multispectral EMR to generate multispectral imaging data of the diseased tissue, and thereby identifies the location of the diseased tissue within the patient's body. The endoscopic imaging system may further emit a mapping pulsing scheme for generating a three-dimensional topographical map of the scene and calculating dimensions of objects within the scene. The location of the diseased tissue (as identified by the multispectral imaging data) may be combined with the topographical map and dimensions information that is calculated with the mapping data. Therefore, the precise location, size, dimensions, and topology of the diseased tissue can be identified. This information may be provided to a medical practitioner to aid in excising, imaging, or studying the diseased tissue. Additionally, this information may be provided to a robotic surgical system to enable the surgical system to excise the diseased tissue.

Figure 20:
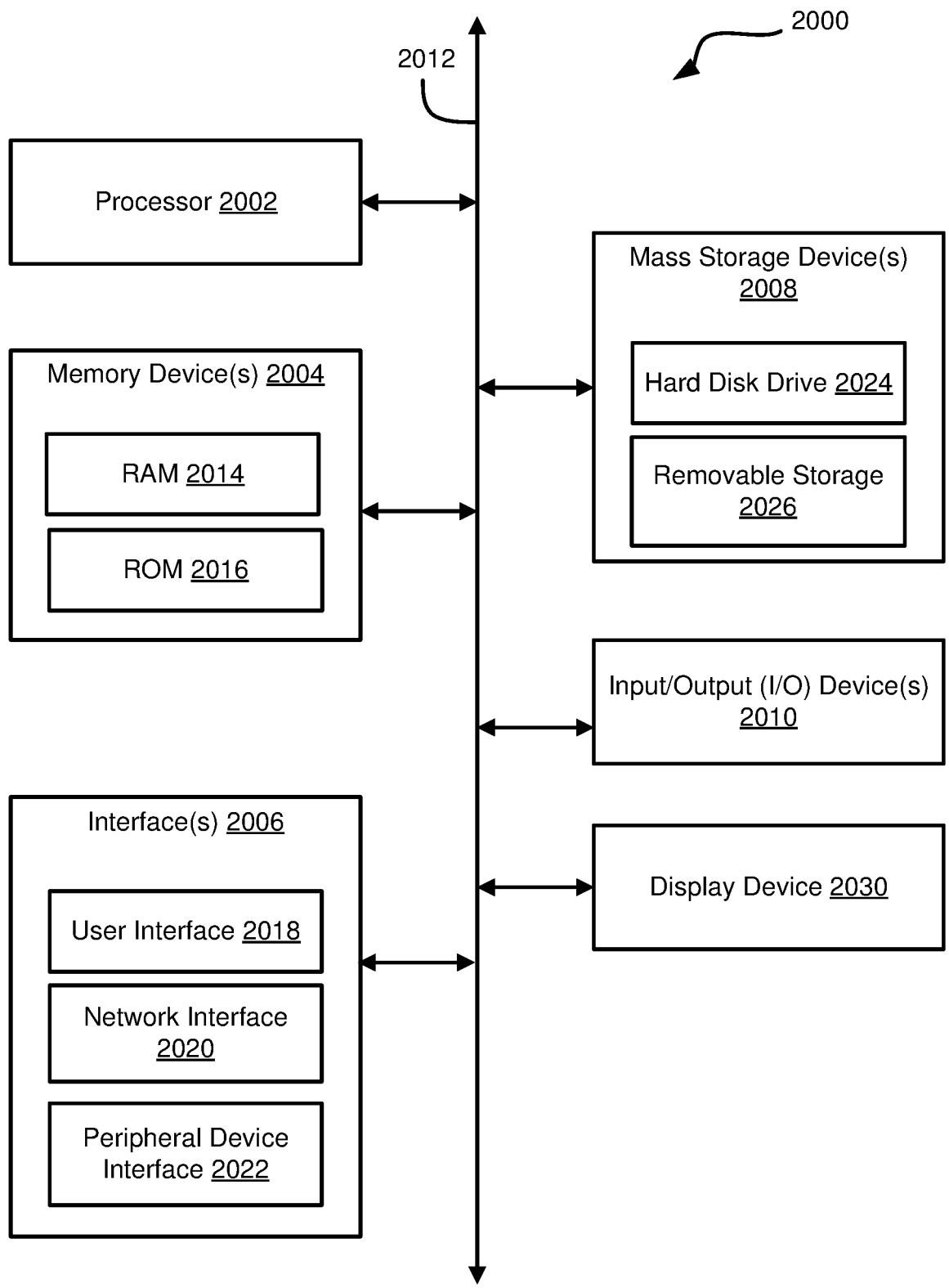
FIG. 20 is a schematic block diagram of an example computing device.

FIG. 20 illustrates a schematic block diagram of an example computing device 2000.

The computing device 2000 may be used to perform various procedures, such as those discussed herein. The computing device 2000 can perform various monitoring functions as discussed herein, and can execute one or more application programs, such as the application programs or functionality described herein. The computing device 2000 can be any of a wide variety of computing devices, such as a desktop computer, in-dash computer, vehicle control system, a notebook computer, a server computer, a handheld computer, tablet computer and the like.

The computing device 2000 includes one or more processor(s) 2004, one or more memory device(s) 2004, one or more interface(s) 2006, one or more mass storage device(s) 2008, one or more Input/output (I/O) device(s) 2010, and a display device 2030 all of which are coupled to a bus 2012. Processor(s) 2004 include one or more processors or controllers that execute instructions stored in memory device(s) 2004 and/or mass storage device(s) 2008. Processor(s) 2004 may also include several types of computer-readable media, such as cache memory.

Memory device(s) 2004 include various computer-readable media, such as volatile memory (e.g., random access memory (RAM) 2014) and/or nonvolatile memory (e.g., read-only memory (ROM) 2016). Memory device(s) 2004 may also include rewritable ROM, such as Flash memory.

Mass storage device(s) 2008 include various computer readable media, such as magnetic tapes, magnetic disks, optical disks, solid-state memory (e.g., Flash memory), and so forth. As shown in FIG. 20, a particular mass storage device 2008 is a hard disk drive 2024. Various drives may also be included in mass storage device(s) 2008 to enable reading from and/or writing to the various computer readable media. Mass storage device(s) 2008 include removable media 2026 and/or non-removable media.

I/O device(s) 2010 include various devices that allow data and/or other information to be input to or retrieved from computing device 2000. Example I/O device(s) 2010 include cursor control devices, keyboards, keypads, microphones, monitors or other display devices, speakers, printers, network interface cards, modems, and the like.

Display device 2030 includes any type of device capable of displaying information to one or more users of computing device 2000. Examples of display device 2030 include a monitor, display terminal, video projection device, and the like.

Interface(s) 2006 include various interfaces that allow computing device 2000 to interact with other systems, devices, or computing environments. Example interface(s) 2006 may include any number of different network interfaces 2020, such as interfaces to local area networks (LANs), wide area networks (WANs), wireless networks, and the Internet. Other interface(s) include user interface 2018 and peripheral device interface 2022. The interface(s) 2006 may also include one or more user interface elements 2018. The interface(s) 2006 may also include one or more peripheral interfaces such as interfaces for printers, pointing devices (mice, track pad, or any suitable user interface now known to those of ordinary skill in the field, or later discovered), keyboards, and the like.

Bus 2012 allows processor(s) 2004, memory device(s) 2004, interface(s) 2006, mass storage device(s) 2008, and I/O device(s) 2010 to communicate with one another, as well as other devices or components coupled to bus 2012. Bus 2012 represents one or more of several types of bus structures, such as a system bus, PCI bus, IEEE bus, USB bus, and so forth.

For purposes of illustration, programs and other executable program components are shown herein as discrete blocks, such as block 302 for example, although it is understood that such programs and components may reside at various times in different storage components of computing device 2000 and are executed by processor(s) 2002. Alternatively, the systems and procedures described herein, including programs or other executable program components, can be implemented in hardware, or a combination of hardware, software, and/or firmware. For example, one or more application specific integrated circuits (ASICs) can be programmed to conduct one or more of the systems and procedures described herein.

EXAMPLES

The following examples pertain to preferred features of further embodiments:

Example 1 is a system for endoscopic visualization of a light deficient environment. The system includes an image sensor comprising a pixel array that reads out a plurality of data frames over a plurality of frame periods, wherein each of the plurality of frame periods comprises a blanking period and a readout period. The system includes a controller that synchronizes operations of the image sensor with a variable pulse cycle of an emitter. The controller calculates register values for an applied gain for the image sensor on a per-frame basis. The controller calculates a duration of each of the plurality of frame periods on a per-frame basis.

Example 2 is a system as in Example 1, wherein the controller calculates the register values for the applied analog gain for the image sensor on the per-frame basis to ensure each of the plurality of data frames comprises sufficient pixel values to be assessed by a machine learning algorithm or rendered on a display for viewing by a user.

Example 3 is a system as in any of Examples 1-2, wherein the controller calculates the register values for the applied gain for the image sensor such that image sensor specifications correspond with the variable pulse cycle of the emitter, and wherein the variable pulse cycle comprises: a plurality of emissions of broadband visible electromagnetic radiation; and a plurality of emissions selected for advanced visualization, which comprises one or more of fluorescence visualization or multispectral visualization.

Example 4 is a system as in any of Examples 1-3, wherein the controller calculates the image sensor settings on the per-frame basis to compensate for one or more of: variations in intensity between the plurality of emissions of the broadband visible electromagnetic radiation and the plurality of emissions selected for advanced visualization; or the pixel array comprising varying sensitivity to accumulating electromagnetic radiation resulting from the plurality of emissions of the broadband visible electromagnetic radiation or the plurality of emissions selected for advanced visualization.

Example 5 is a system as in any of Examples 1-4, wherein the plurality of emissions selected for advanced visualization comprises an excitation emission selected for fluorescing a tissue or reagent, wherein the excitation emission comprises a narrowband of electromagnetic radiation within a near infrared waveband of the electromagnetic spectrum.

Example 6 is a system as in any of Examples 1-5, wherein the plurality of emissions selected for advanced visualization comprises: a visible multispectral emission selected to elicit a spectral response from a tissue, wherein the visible multispectral emission comprises a narrowband of electromagnetic radiation within a visible waveband of the electromagnetic spectrum; and a near infrared multispectral emission selected to elicit spectral response from a tissue, wherein the near infrared multispectral emission comprises a narrowband of electromagnetic radiation within a visible waveband of the electromagnetic spectrum.

Example 7 is a system as in any of Examples 1-6, wherein the controller calculates the duration of each of the plurality of frame periods on the per-frame basis to correspond with the variable pulse cycle of the emitter and to compensate for one or more of: variations in intensity between the plurality of emissions of the broadband visible electromagnetic radiation and the plurality of emissions selected for advanced visualization; or the pixel array comprising varying sensitivity to accumulating electromagnetic radiation resulting from the plurality of emissions of the broadband visible electromagnetic radiation or the plurality of emissions selected for advanced visualization.

Example 8 is a system as in any of Examples 1-7, wherein the variable pulse cycle of the emitter comprises: a broadband visible emission; and a near infrared narrowband emission selected to excite a tissue or reagent, wherein the near infrared narrowband emission comprises electromagnetic radiation within a waveband having a width of 20 nm or less within a near infrared waveband of the electromagnetic spectrum; and wherein a duration of a frame period corresponding with the near infrared narrowband emission is from about 1.8 to about 2.5 times a duration of a frame period corresponding with the broadband visible emission.

Example 9 is a system as in any of Examples 1-8, wherein the variable pulse cycle of the emitter comprises: a broadband visible emission; a near infrared narrowband emission selected to elicit a spectral response from a tissue, wherein the near infrared narrowband emission comprises electromagnetic radiation within a waveband having a width of 20 nm or less within a near infrared waveband of the electromagnetic spectrum; and a visible narrowband emission selected to elicit a spectral response from a tissue, wherein the visible narrowband emission comprises electromagnetic radiation within a waveband having a width of 20 nm or less within a visible waveband of the electromagnetic spectrum; and wherein a duration of a frame period corresponding with the near infrared narrowband emission is from about 1.4 to about 2.0 a duration of a frame period corresponding with the broadband visible emission; and wherein a duration of a frame period corresponding with the visible narrowband emission is from about 1.0 to about 1.6 a duration of a frame period corresponding with the broadband visible emission.

Example 10 is a system as in any of Examples 1-9, wherein one or more of the plurality of data frames comprises fluorescence data frames read out by the image sensor in response to the pixel array accumulating a fluorescence relaxation emission emitted by a tissue or reagent; wherein one or more of the plurality of data frames comprises color data frames read out by the image sensor in response to the emitter pulsing white light; and wherein the applied gain for the fluorescence data frames is greater than the applied gain for the color data frame.

Example 11 is a system as in any of Examples 1-10, wherein a duration of the readout period of each of the plurality of data frames is determined based on a readout speed of the image sensor and further based on whether the controller instructs the image sensor to bin the pixel array.

Example 12 is a system as in any of Examples 1-11, wherein the controller instructs the image sensor whether to bin the pixel array on a per-frame basis such that: a portion of the plurality of data frames comprises full resolution read out with a non-binned pixel array; and a portion of the plurality of data frames comprises reduced resolution read out with a binned pixel array.

Example 13 is a system as in any of Examples 1-12, wherein a duration of the blanking period for each of the plurality of data frames is determined based on: a total duration allocated to a corresponding data frame; and the duration of the readout period for the corresponding data frame.

Example 14 is a system as in any of Examples 1-13, wherein the controller determines whether the duration of the blanking period for the corresponding data frame is sufficiently long for the pixel array to accumulate electromagnetic radiation to output a data frame comprising sufficient exposure to be assessed by a machine learning algorithm or rendered on a display for viewing by a user.

Example 15 is a system as in any of Examples 1-14, wherein at least a portion of the plurality of data frames comprises a fluorescence data frame to be assessed by a machine learning algorithm trained to identify a tissue structure based on fluorescence response data gathered in response to the emitter pulsing an excitation emission; and wherein the controller optimizes the applied gain for the image sensor and the duration for a corresponding blanking period to ensure that exposure levels for the fluorescence data frame are within a threshold range accepted by the machine learning algorithm.

Example 16 is a system as in any of Examples 1-15, wherein at least a portion of the plurality of data frames comprises a multispectral data frame to be assessed by a machine learning algorithm trained to identify a tissue structure based on spectral response data gathered in response to the emitter pulsing a spectral emission; and wherein the controller optimizes the applied gain for the image sensor and the duration for a corresponding blanking period to ensure that exposure levels for the multispectral data frame are within a threshold range accepted by the machine learning algorithm.

Example 17 is a system as in any of Examples 1-16, wherein the plurality of data frames comprises: a color data frame sensed in response to the emitter pulsing a white light emission; a fluorescence data frame sensed in response to the emitter pulsing an excitation emission comprising electromagnetic radiation within a near infrared waveband of the electromagnetic spectrum; a first multispectral data frame sensed in response to the emitter puling a spectral emission comprising electromagnetic radiation within a near infrared waveband of the electromagnetic spectrum; and a second multispectral data frame sensed in response to the emitter pulsing a spectral emission comprising electromagnetic radiation within a visible waveband of the electromagnetic spectrum.

Example 18 is a system as in any of Examples 1-17, wherein the controller optimizes the applied gain for the image sensor in reading out each of the color data frame, the fluorescence data frame, the first multispectral data frame, and the second multispectral data frame such that: the controller instructs the image sensor to read out the fluorescence data frame with a greatest applied gain; the controller instructs the image sensor to read out the first multispectral data frame and the second multispectral data frame with a least applied gain.

Example 19 is a system as in any of Examples 1-18, wherein the controller optimizes a duration of the blanking period corresponding to each of the color data frame, the fluorescence data frame, the first multispectral data frame, and the second multispectral data frame such that: the controller instructs the image sensor to accumulate electromagnetic radiation for the fluorescence data frame for a longest blanking period duration; and the controller instructs the image sensor to accumulate electromagnetic radiation for the color data frame for a shortest blanking period duration.

Example 20 is a system as in any of Examples 1-19, wherein the controller synchronizes the operations of the image sensor the variable pulse cycle of the emitter such that: the image sensor reads out the pixel array during the readout period of each of the plurality of frame periods; and the image sensor accumulates electromagnetic radiation during the blanking period of each of the plurality of frame periods; wherein the emitter pulses electromagnetic radiation during the blanking period of each of the plurality of frame periods; and wherein the emitter cycles off during the readout period of each of the plurality of frame periods.

It will be appreciated that various features disclosed herein provide significant advantages and advancements in the art. The following claims are exemplary of some of those features.

In the foregoing Detailed Description of the Disclosure, various features of the disclosure are grouped together in a single embodiment for the purpose of streamlining the disclosure. This method of disclosure is not to be interpreted as reflecting an intention that the claimed disclosure requires more features than are expressly recited in each claim. Rather, inventive aspects lie in less than all features of a single foregoing disclosed embodiment.

It is to be understood that any features of the above-described arrangements, examples, and embodiments may be combined in a single embodiment comprising a combination of features taken from any of the disclosed arrangements, examples, and embodiments.

It is to be understood that the above-described arrangements are only illustrative of the application of the principles of the disclosure. Numerous modifications and alternative arrangements may be devised by those skilled in the art without departing from the spirit and scope of the disclosure and the appended claims are intended to cover such modifications and arrangements.

Thus, while the disclosure has been shown in the drawings and described above with particularity and detail, it will be apparent to those of ordinary skill in the art that numerous modifications, including, but not limited to, variations in size, materials, shape, form, function and manner of operation, assembly and use may be made without departing from the principles and concepts set forth herein.

Further, where appropriate, functions described herein can be performed in one or more of: hardware, software, firmware, digital components, or analog components. For example, one or more application specific integrated circuits (ASICs) or field programmable gate arrays (FPGAs) can be programmed to carry out one or more of the systems and procedures described herein. Certain terms are used throughout the following description and claims to refer to particular system components. As one skilled in the art will appreciate, components may be referred to by different names. This document does not intend to distinguish between components that differ in name, but not function.

The foregoing description has been presented for the purposes of illustration and description. It is not intended to be exhaustive or to limit the disclosure to the precise form disclosed. Many modifications and variations are possible in light of the above teaching. Further, it should be noted that any or all the aforementioned alternate implementations may be used in any combination desired to form additional hybrid implementations of the disclosure.

Further, although specific implementations of the disclosure have been described and illustrated, the disclosure is not to be limited to the specific forms or arrangements of parts so described and illustrated. The scope of the disclosure is to be defined by the claims appended hereto, any future claims submitted here and in different applications, and their equivalents.

What is claimed is:

1. A system for endoscopic visualization in a light deficient environment, the system comprising:
   an image sensor comprising a pixel array that reads out a plurality of data frames over a plurality of frame periods, wherein each of the plurality of frame periods comprises a blanking period and a readout period; and
   a controller that synchronizes operations of the image sensor with a variable pulse cycle of an emitter;
   wherein the controller calculates register values for an applied gain for the image sensor on a per-frame basis;
   wherein the calculation of the register values for the applied gain is based at least in part on a type of a data frame of the plurality of data frames; and
   wherein the controller calculates a duration of each of the plurality of frame periods on a per-frame basis.

2. The system of claim 1, wherein the controller calculates the register values for the applied gain for the image sensor on the per-frame basis to ensure each of the plurality of data frames comprises sufficient exposure to be assessed by a machine learning algorithm or rendered on a display for viewing by a user.

3. The system of claim 1, wherein the controller calculates the register values for the applied gain for the image sensor such that image sensor settings correspond with the variable pulse cycle of the emitter, and wherein the variable pulse cycle comprises:
   a plurality of emissions of broadband visible electromagnetic radiation; and
   a plurality of emissions selected for advanced visualization, which comprises one or more of fluorescence visualization or multispectral visualization.

4. The system of claim 3, wherein the controller calculates the image sensor settings on the per-frame basis to compensate for one or more of:
   variations in intensity between the plurality of emissions of the broadband visible electromagnetic radiation and the plurality of emissions selected for advanced visualization; or
   the pixel array comprising varying sensitivity to accumulating electromagnetic radiation resulting from the plurality of emissions of the broadband visible electromagnetic radiation or the plurality of emissions selected for advanced visualization.

5. The system of claim 4, wherein the plurality of emissions selected for advanced visualization comprises an excitation emission selected for fluorescing a tissue or reagent, wherein the excitation emission comprises a narrowband of electromagnetic radiation within a near infrared waveband of the electromagnetic spectrum.

6. The system of claim 4, wherein the plurality of emissions selected for advanced visualization comprises:
   a visible multispectral emission selected to elicit a spectral response from a tissue, wherein the visible multispectral emission comprises a narrowband of electromagnetic radiation within a visible waveband of the electromagnetic spectrum; and
   a near infrared multispectral emission selected to elicit spectral response from a tissue, wherein the near infrared multispectral emission comprises a narrowband of electromagnetic radiation within a visible waveband of the electromagnetic spectrum.

7. The system of claim 1, wherein the controller calculates the duration of each of the plurality of frame periods on the per-frame basis to correspond with the variable pulse cycle of the emitter and to compensate for one or more of:
   variations in intensity between the plurality of emissions of the broadband visible electromagnetic radiation and the plurality of emissions selected for advanced visualization; or
   the pixel array comprising varying sensitivity to accumulating electromagnetic radiation resulting from the plurality of emissions of the broadband visible electromagnetic radiation or the plurality of emissions selected for advanced visualization.

8. The system of claim 7, wherein the variable pulse cycle of the emitter comprises:
   a broadband visible emission; and
   a near infrared narrowband emission selected to excite a tissue or reagent, wherein the near infrared narrowband emission comprises electromagnetic radiation within a waveband having a width of 20 nm or less within a near infrared waveband of the electromagnetic spectrum; and
   wherein a duration of a frame period corresponding with the near infrared narrowband emission is from about 1.8 to about 2.5 times a duration of a frame period corresponding with the broadband visible emission.

9. The system of claim 7, wherein the variable pulse cycle of the emitter comprises:
   a broadband visible emission;
   a near infrared narrowband emission selected to elicit a spectral response from a tissue, wherein the near infrared narrowband emission comprises electromagnetic radiation within a waveband having a width of 20 nm or less within a near infrared waveband of the electromagnetic spectrum; and
   a visible narrowband emission selected to elicit a spectral response from a tissue, wherein the visible narrowband emission comprises electromagnetic radiation within a waveband having a width of 20 nm or less within a visible waveband of the electromagnetic spectrum; and
   wherein a duration of a frame period corresponding with the near infrared narrowband emission is from about 1.4 to about 2.0 a duration of a frame period corresponding with the broadband visible emission; and
   wherein a duration of a frame period corresponding with the visible narrowband emission is from about 1.0 to about 1.6 a duration of a frame period corresponding with the broadband visible emission.

10. The system of claim 1, wherein the type of one or more of the plurality of data frames is that of fluorescence data frames read out by the image sensor in response to the pixel array accumulating a fluorescence relaxation emission emitted by a tissue or reagent;

wherein the type of one or more of the plurality of data frames is that of color data frames read out by the image sensor in response to the emitter pulsing white light; and wherein the applied gain for the fluorescence data frames is greater than the applied gain for the color data frame.

11. The system of claim 1, wherein a duration of the readout period of each of the plurality of data frames is determined based on a readout speed of the image sensor and further based on whether the controller instructs the image sensor to bin the pixel array.

12. The system of claim 11, wherein the controller instructs the image sensor whether to bin the pixel array on a per-frame basis such that:

a portion of the plurality of data frames comprises full resolution read out with a non-binned pixel array; and a portion of the plurality of data frames comprises reduced resolution read out with a binned pixel array.

13. The system of claim 12, wherein a duration of the blanking period for each of the plurality of data frames is determined based on:

a total duration allocated to a corresponding data frame; and the duration of the readout period for the corresponding data frame.

14. The system of claim 13, wherein the controller determines whether the duration of the blanking period for the corresponding data frame is sufficiently long for the pixel array to accumulate electromagnetic radiation to output a data frame comprising sufficient exposure to be assessed by a machine learning algorithm or rendered on a display for viewing by a user.

15. The system of claim 1, wherein the type of at least a portion of the plurality of data frames is that of a fluorescence data frame to be assessed by a machine learning algorithm trained to identify a tissue structure based on fluorescence response data gathered in response to the emitter pulsing an excitation emission; and wherein the controller optimizes the applied gain for the image sensor and the duration for a corresponding blanking period to ensure that exposure levels for the fluorescence data frame are within a threshold range accepted by the machine learning algorithm.

16. The system of claim 1 wherein the type of at least a portion of the plurality of data frames is that of a multispectral data frame to be assessed by a machine learning algorithm trained to identify a tissue structure based on spectral response data gathered in response to the emitter pulsing a spectral emission; and wherein the controller optimizes the applied gain for the image sensor and the duration for a corresponding blanking period to ensure that exposure levels for the multispectral data frame are within a threshold range accepted by the machine learning algorithm.

17. The system of claim 1, wherein the plurality of data frames comprises:

a color data frame sensed in response to the emitter pulsing a white light emission;

a fluorescence data frame sensed in response to the emitter pulsing an excitation emission comprising electromagnetic radiation within a near infrared waveband of the electromagnetic spectrum;

a first multispectral data frame sensed in response to the emitter puling a spectral emission comprising electromagnetic radiation within a near infrared waveband of the electromagnetic spectrum; and a second multispectral data frame sensed in response to the emitter pulsing a spectral emission comprising electromagnetic radiation within a visible waveband of the electromagnetic spectrum.

18. The system of claim 17, wherein the controller optimizes the applied gain for the image sensor in reading out each of the color data frame, the fluorescence data frame, the first multispectral data frame, and the second multispectral data frame such that:

the controller instructs the image sensor to read out the fluorescence data frame with a greatest applied gain;

the controller instructs the image sensor to read out the first multispectral data frame and the second multispectral data frame with a least applied gain.

19. The system of claim 17, wherein the controller optimizes a duration of the blanking period corresponding to each of the color data frame, the fluorescence data frame, the first multispectral data frame, and the second multispectral data frame such that:

the controller instructs the image sensor to accumulate electromagnetic radiation for the fluorescence data frame for a longest blanking period duration; and the controller instructs the image sensor to accumulate electromagnetic radiation for the color data frame for a shortest blanking period duration.

20. The system of claim 1, wherein the controller synchronizes the operations of the image sensor the variable pulse cycle of the emitter such that:

the image sensor reads out the pixel array during the readout period of each of the plurality of frame periods; and the image sensor accumulates electromagnetic radiation during the blanking period of each of the plurality of frame periods;

wherein the emitter pulses electromagnetic radiation during the blanking period of each of the plurality of frame periods; and wherein the emitter cycles off during the readout period of each of the plurality of frame periods.

* * * * *